US012047962B2

United States Patent
Abedini et al.

(10) Patent No.: US 12,047,962 B2
(45) Date of Patent: Jul. 23, 2024

(54) REMAINING MINIMUM SYSTEM INFORMATION TRANSMISSION, SYNCHRONIZATION SIGNAL BLOCK FORWARDING, AND DEMODULATION REFERENCE SIGNAL MANAGEMENT BY WIRELESS FORWARDING NODE

(71) Applicant: QUALCOMM Incorporated, San Diego, CA (US)

(72) Inventors: Navid Abedini, Basking Ridge, NJ (US); Ashwin Sampath, Skillman, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 17/446,781

(22) Filed: Sep. 2, 2021

(65) Prior Publication Data

US 2022/0078838 A1 Mar. 10, 2022

Related U.S. Application Data

(60) Provisional application No. 62/706,754, filed on Sep. 9, 2020, provisional application No. 62/706,766, filed (Continued)

(51) Int. Cl.
*H04W 72/12* (2023.01)
*H04L 5/00* (2006.01)
(Continued)

(52) U.S. Cl.
CPC .......... *H04W 72/23* (2023.01); *H04L 5/0051* (2013.01); *H04W 56/001* (2013.01);
(Continued)

(58) Field of Classification Search
CPC .............. H04W 72/23; H04W 56/001; H04W 72/0446; H04W 72/0453; H04W 72/1273;
(Continued)

(56) References Cited

U.S. PATENT DOCUMENTS 10,356,690 B2 * 7/2019 Liu ..................... H04W 40/125
10,925,023 B2 * 2/2021 Park ..................... H04L 5/0051
(Continued)

FOREIGN PATENT DOCUMENTS

CA 3070072 A1 * 1/2019 .......... H04J 11/0069
CA 3070072 C * 10/2022 .......... H04J 11/0069
(Continued)

*Primary Examiner* — Jay P Patel
(74) *Attorney, Agent, or Firm* — Sevan Savsa; Harrity & Harrity, LLP

(57) ABSTRACT

Various aspects of the present disclosure generally relate to wireless communication. In some aspects, a wireless forwarding node may receive, from a control node via a fronthaul control interface, semi-static configuration information indicating one or more parameters for forwarding a remaining minimum system information (RMSI) physical downlink control channel (PDCCH). The wireless node may receive, from a transmitter node, information associated with an RMSI PDCCH that schedules transmission of an RMSI physical downlink shared channel (PDSCH) that carries RMSI associated with an access procedure. The wireless node may transmit an RMSI PDCCH to one or more receiver nodes based at least in part on the received information and the semi-static configuration information. Numerous other aspects are provided.

30 Claims, 23 Drawing Sheets

Related U.S. Application Data on Sep. 9, 2020, provisional application No. 62/706,755, filed on Sep. 9, 2020.

(51) Int. Cl.
| | |
|---|---|
| *H04W 56/00* | (2009.01) |
| *H04W 72/0446* | (2023.01) |
| *H04W 72/0453* | (2023.01) |
| *H04W 72/1273* | (2023.01) |
| *H04W 72/23* | (2023.01) |

(52) U.S. Cl.
CPC ... *H04W 72/0446* (2013.01); *H04W 72/0453* (2013.01); *H04W 72/1273* (2013.01)

(58) Field of Classification Search
CPC .... H04W 48/12; H04L 5/0051; H04L 5/0053; H04L 5/0094
See application file for complete search history.

(56) References Cited

U.S. PATENT DOCUMENTS

| | | | | |
|---|---|---|---|---|
| 10,952,196 | B2* | 3/2021 | Nam | H04L 5/0051 |
| 10,999,118 | B2* | 5/2021 | Park | H04L 27/2657 |
| 11,076,421 | B2* | 7/2021 | Chande | H04W 72/044 |
| 11,121,744 | B2* | 9/2021 | Park | H04L 5/001 |
| 11,140,613 | B2* | 10/2021 | Chen | H04W 48/12 |
| 11,206,624 | B2* | 12/2021 | Ko | H04J 11/0069 |
| 11,375,527 | B1* | 6/2022 | Eyuboglu | H04B 7/15528 |
| 11,438,854 | B2* | 9/2022 | Ly | H04W 56/001 |
| 11,477,820 | B2* | 10/2022 | Park | H04L 5/0094 |
| 11,528,740 | B2* | 12/2022 | Lee | H04L 5/001 |
| 11,546,828 | B2* | 1/2023 | Abedini | H04B 7/15528 |
| 11,546,878 | B1* | 1/2023 | Xu | H04W 68/025 |
| 11,617,155 | B2* | 3/2023 | Lin | H04L 5/005 370/329 |
| 11,924,785 | B2* | 3/2024 | Sun | H04L 5/0051 |
| 11,924,790 | B2* | 3/2024 | Park | H04L 5/00 |
| 2017/0105164 | A1* | 4/2017 | Liu | H04W 40/22 |
| 2018/0324732 | A1* | 11/2018 | Park | H04L 27/2613 |
| 2018/0376454 | A1* | 12/2018 | Åström | H04W 72/0446 |
| 2019/0028315 | A1* | 1/2019 | Park | H04L 5/0048 |
| 2019/0223163 | A1* | 7/2019 | Ko | H04W 72/23 |
| 2019/0246395 | A1* | 8/2019 | Huang | H04W 72/12 |
| 2019/0253308 | A1* | 8/2019 | Huang | H04L 43/0823 |
| 2019/0261324 | A1* | 8/2019 | Nam | H04L 5/0048 |
| 2019/0306827 | A1* | 10/2019 | Agiwal | H04L 5/001 |
| 2019/0313350 | A1* | 10/2019 | Zhang | H04W 16/14 |
| 2019/0313401 | A1* | 10/2019 | Wang | H04W 72/20 |
| 2020/0045655 | A1* | 2/2020 | Joseph | H04W 24/10 |
| 2020/0053670 | A1* | 2/2020 | Jung | H04W 56/00 |
| 2020/0236704 | A1* | 7/2020 | Chande | H04W 72/21 |
| 2020/0366398 | A1* | 11/2020 | Takeda | H04L 5/0094 |
| 2020/0396744 | A1* | 12/2020 | Xiong | H04L 5/0051 |
| 2020/0404600 | A1* | 12/2020 | Ly | H04L 1/1614 |
| 2021/0007065 | A1* | 1/2021 | Ko | H04W 56/00 |
| 2021/0007068 | A1* | 1/2021 | Kim | H04L 5/0048 |
| 2021/0014893 | A1* | 1/2021 | Park | H04W 80/08 |
| 2021/0036762 | A1* | 2/2021 | Abedini | H04W 48/08 |
| 2021/0037445 | A1* | 2/2021 | Abedini | H04L 5/0048 |
| 2021/0083730 | A1* | 3/2021 | Hwang | H04L 5/0092 |
| 2021/0092696 | A1* | 3/2021 | Ko | H04W 72/30 |
| 2021/0104224 | A1* | 4/2021 | Chae | G06F 18/213 |
| 2021/0105739 | A1* | 4/2021 | Lin | H04L 5/0098 |
| 2021/0111817 | A1* | 4/2021 | Khoshnevisan | H04W 24/10 |
| 2021/0136800 | A1* | 5/2021 | Li | H04L 27/0006 |
| 2021/0176687 | A1* | 6/2021 | Ko | H04W 56/001 |
| 2021/0243706 | A1* | 8/2021 | Liu | H04L 5/0007 |
| 2021/0258065 | A1* | 8/2021 | Wang | H04W 56/001 |
| 2021/0331312 | A1* | 10/2021 | Kim | G06F 18/2431 |
| 2021/0409096 | A1* | 12/2021 | Liou | H04W 56/001 |
| 2022/0029764 | A1* | 1/2022 | Liou | H04L 5/0094 |
| 2022/0046635 | A1* | 2/2022 | Liou | H04W 72/21 |
| 2022/0046695 | A1* | 2/2022 | Abedini | H04B 7/155 |
| 2022/0053433 | A1* | 2/2022 | Abedini | H04W 16/28 |
| 2022/0053486 | A1* | 2/2022 | Abedini | H04B 7/15542 |
| 2022/0069893 | A1* | 3/2022 | Abedini | H04W 48/10 |
| 2022/0103227 | A1* | 3/2022 | Lee | H04W 72/046 |
| 2022/0104152 | A1* | 3/2022 | Wu | H04L 5/0046 |
| 2022/0123836 | A1* | 4/2022 | Asimakopoulos | H04L 5/0094 |
| 2022/0124664 | A1* | 4/2022 | Cha | G01S 5/02 |
| 2022/0132463 | A1* | 4/2022 | Cha | H04B 17/27 |
| 2022/0132583 | A1* | 4/2022 | Ko | H04W 74/0833 |
| 2022/0140880 | A1* | 5/2022 | Cha | H04B 7/0695 375/262 |
| 2022/0166485 | A1* | 5/2022 | Lee | H04W 76/19 |
| 2022/0166576 | A1* | 5/2022 | Harada | H04L 27/0006 |
| 2022/0167279 | A1* | 5/2022 | Zhou | H04W 52/146 |
| 2022/0174620 | A1* | 6/2022 | Cha | H04L 5/0023 |
| 2022/0174685 | A1* | 6/2022 | Lee | H04W 72/542 |
| 2022/0200773 | A1* | 6/2022 | Alriksson | H04L 5/005 |
| 2022/0210754 | A1* | 6/2022 | Harada | H04W 56/0015 |
| 2022/0236366 | A1* | 7/2022 | Cha | H04W 72/0453 |
| 2022/0239438 | A1* | 7/2022 | Cha | H04J 13/0029 |
| 2022/0248385 | A1* | 8/2022 | Cha | H04W 72/044 |
| 2022/0264491 | A1* | 8/2022 | Cha | H04W 56/001 |
| 2022/0271817 | A1* | 8/2022 | Lee | H04B 17/382 |
| 2022/0272731 | A1* | 8/2022 | Cha | H04J 13/0025 |
| 2022/0295531 | A1* | 9/2022 | Lee | H04L 27/2602 |
| 2022/0338140 | A1* | 10/2022 | Zhang | H04L 5/0092 |
| 2022/0352967 | A1* | 11/2022 | Yang | H04W 24/10 |
| 2022/0377705 | A1* | 11/2022 | Wang | H04L 5/0091 |
| 2023/0006798 | A1* | 1/2023 | Lee | H04L 1/1607 |
| 2023/0292267 | A1* | 9/2023 | He | H04W 56/001 |

FOREIGN PATENT DOCUMENTS

| | | | | |
|---|---|---|---|---|
| CN | 110621073 A | * | 12/2019 | |
| CN | 111034284 B | * | 8/2022 | ......... H04J 11/0073 |
| KR | 20200107860 A | * | 3/2020 | |
| KR | 20220030247 A | * | 7/2020 | |
| KR | 20200107860 A | * | 9/2020 | ............ H04W 16/26 |
| WO | WO-2019022574 A1 | * | 1/2019 | ......... H04J 11/0069 |
| WO | WO-2019092942 A1 | * | 5/2019 | ........... H04B 7/0626 |
| WO | WO-2019160777 A1 | * | 8/2019 | ............ H04L 5/0007 |
| WO | WO-2020022755 A1 | * | 1/2020 | ............ H04B 7/155 |
| WO | WO-2020149989 A1 | * | 7/2020 | ......... H04W 72/005 |
| WO | WO-2021054935 A1 | * | 3/2021 | ............ H04B 7/024 |
| WO | WO-2021137346 A1 | * | 7/2021 | ............ H04B 7/155 |
| WO | WO-2023081569 A1 | * | 5/2023 | ............ H04W 24/08 |

* cited by examiner

REMAINING MINIMUM SYSTEM INFORMATION TRANSMISSION, SYNCHRONIZATION SIGNAL BLOCK FORWARDING, AND DEMODULATION REFERENCE SIGNAL MANAGEMENT BY WIRELESS FORWARDING NODE

CROSS-REFERENCE TO RELATED APPLICATIONS

This Patent application claims priority to U.S. Provisional Patent Application No. 62/706,754, filed on Sep. 9, 2020, entitled "REMAINING MINIMUM SYSTEM INFORMATION TRANSMISSION BY WIRELESS REMOTE UNIT," U.S. Provisional Patent Application No. 62/706,755, filed on Sep. 9, 2020, entitled "DEMODULATION REFERENCE SIGNAL MANAGEMENT BY DIGITAL REPEATERS," and U.S. Provisional Patent Application No. 62/706,766, filed on Sep. 9, 2020, entitled "SYNCHRONIZATION SIGNAL BLOCK FORWARDING," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for remaining minimum system information (RMSI) transmission, synchronization signal block (SSB) forwarding, and demodulation reference signal (DMRS) management by a wireless forwarding node.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless forwarding node includes receiving, from a control node via a fronthaul control interface, semi-static configuration information indicating one or more parameters for forwarding a remaining minimum system information (RMSI) physical downlink control channel (PDCCH); receiving information associated with an RMSI PDCCH from a transmitter node, wherein the RMSI PDCCH schedules transmission of an RMSI physical downlink shared channel (PDSCH) that carries RMSI associated with an access procedure; and transmitting an RMSI PDCCH to one or more receiver nodes based at least in part on the received information and the semi-static configuration information.

In some aspects, a wireless forwarding node for wireless communication includes a memory; and one or more processors, coupled to the memory, configured to: receive, from a control node via a fronthaul control interface, semi-static configuration information indicating one or more parameters for forwarding an RMSI PDCCH; receive information associated with an RMSI PDCCH from a transmitter node, wherein the RMSI PDCCH schedules transmission of an RMSI PDSCH that carries RMSI associated with an access procedure; and transmit an RMSI PDCCH to one or more receiver nodes based at least in part on the received information and the semi-static configuration information.

In some aspects, a non-transitory computer-readable medium stores one or more instructions for wireless communication that, when executed by one or more processors of a wireless forwarding node, cause the wireless forwarding node to: receive, from a control node via a fronthaul control interface, semi-static configuration information indicating one or more parameters for forwarding an RMSI PDCCH; receive information associated with an RMSI PDCCH from a transmitter node, wherein the RMSI PDCCH schedules transmission of an RMSI PDSCH that carries RMSI associated with an access procedure; and transmit an RMSI PDCCH to one or more receiver nodes based at least in part on the received information and the semi-static configuration information.

In some aspects, an apparatus for wireless communication includes means for receiving, from a control node via a fronthaul control interface, semi-static configuration information indicating one or more parameters for forwarding an RMSI PDCCH; means for receiving information associated with an RMSI PDCCH from a transmitter node, wherein the RMSI PDCCH schedules transmission of an RMSI PDSCH that carries RMSI associated with an access procedure; and means for transmitting an RMSI PDCCH to one or more receiver nodes based at least in part on the received information and the semi-static configuration information.

In some aspects, a method of wireless communication performed by a forwarding node includes receiving information for use in generating one or more synchronization signal block (SSB) communications that are to be transmitted in an SSB period; storing the information; and transmitting the one or more SSB communications, based at least in part on the information, in the SSB period.

In some aspects, a method of wireless communication performed by a control node includes determining information for use by a forwarding node in generating one or more SSB communications that are to be transmitted by the forwarding node in an SSB period; and transmitting the information to the forwarding node.

In some aspects, a forwarding node for wireless communication includes a memory; and one or more processors, coupled to the memory, configured to: receive information for use in generating one or more SSB communications that are to be transmitted in an SSB period; store the information; and transmit the one or more SSB communications, based at least in part on the information, in the SSB period.

In some aspects, a control node for wireless communication includes a memory; and one or more processors, coupled to the memory, configured to: determine information for use by a forwarding node in generating one or more SSB communications that are to be transmitted by the forwarding node in an SSB period; and transmit the information to the forwarding node.

In some aspects, a non-transitory computer-readable medium stores a set of instructions for wireless communication includes one or more instructions that, when executed by one or more processors of a forwarding node, cause the forwarding node to: receive information for use in generating one or more SSB communications that are to be transmitted in an SSB period; store the information; and transmit the one or more SSB communications, based at least in part on the information, in the SSB period.

In some aspects, a non-transitory computer-readable medium stores a set of instructions for wireless communication includes one or more instructions that, when executed by one or more processors of a control node, cause the control node to: determine information for use by a forwarding node in generating one or more SSB communications that are to be transmitted by the forwarding node in an SSB period; and transmit the information to the forwarding node.

In some aspects, an apparatus for wireless communication includes means for receiving information for use in generating one or more SSB communications that are to be transmitted in an SSB period; means for storing the information; and means for transmitting the one or more SSB communications, based at least in part on the information, in the SSB period.

In some aspects, an apparatus for wireless communication includes means for determining information for use by a forwarding node in generating one or more SSB communications that are to be transmitted by the forwarding node in an SSB period; and means for transmitting the information to the forwarding node.

In some aspects, a method of wireless communication performed by a repeater node includes receiving, from a transmitter node in a first time interval, a first signal including a first demodulation reference signal (DMRS) sequence that is based at least in part on one or more time resources associated with the first time interval; and transmitting, to a receiver node in a second time interval, a second signal including a second DMRS sequence that is based at least in part on one or more time resources associated with the second time interval, wherein the second signal is a regenerated version of the first signal.

In some aspects, a method of wireless communication performed by a control node includes receiving, from a repeater node, information indicating that the repeater node has a capability to change a DMRS sequence in a forwarded signal; and transmitting, to the repeater node, configuration information enabling the repeater node to regenerate an incoming signal that includes a first DMRS sequence as an outgoing signal that includes a second DMRS sequence replacing the first DMRS sequence.

In some aspects, a repeater node for wireless communication includes a memory; and one or more processors, coupled to the memory, configured to: receive, from a transmitter node in a first time interval, a first signal including a first DMRS sequence that is based at least in part on one or more time resources associated with the first time interval; and transmit, to a receiver node in a second time interval, a second signal including a second DMRS sequence that is based at least in part on one or more time resources associated with the second time interval, wherein the second signal is a regenerated version of the first signal.

In some aspects, a control node for wireless communication includes a memory; and one or more processors, coupled to the memory, configured to: receive, from a repeater node, information indicating that the repeater node has a capability to change a DMRS sequence in a forwarded signal; and transmit, to the repeater node, configuration information enabling the repeater node to regenerate an incoming signal that includes a first DMRS sequence as an outgoing signal that includes a second DMRS sequence replacing the first DMRS sequence.

In some aspects, a non-transitory computer-readable medium stores a set of instructions for wireless communication includes one or more instructions that, when executed by one or more processors of a repeater node, cause the repeater node to: receive, from a transmitter node in a first time interval, a first signal including a first DMRS sequence that is based at least in part on one or more time resources associated with the first time interval; and transmit, to a receiver node in a second time interval, a second signal including a second DMRS sequence that is based at least in part on one or more time resources associated with the second time interval, wherein the second signal is a regenerated version of the first signal.

In some aspects, a non-transitory computer-readable medium stores a set of instructions for wireless communication includes one or more instructions that, when executed by one or more processors of a control node, cause the control node to: receive, from a repeater node, information indicating that the repeater node has a capability to change a DMRS sequence in a forwarded signal; and transmit, to the repeater node, configuration information enabling the repeater node to regenerate an incoming signal that includes a first DMRS sequence as an outgoing signal that includes a second DMRS sequence replacing the first DMRS sequence.

In some aspects, an apparatus for wireless communication includes means for receiving, from a transmitter node in a first time interval, a first signal including a first DMRS sequence that is based at least in part on one or more time resources associated with the first time interval; and means for transmitting, to a receiver node in a second time interval, a second signal including a second DMRS sequence that is based at least in part on one or more time resources associated with the second time interval, wherein the second signal is a regenerated version of the first signal.

In some aspects, an apparatus for wireless communication includes means for receiving, from a repeater node, information indicating that the repeater node has a capability to change a DMRS sequence in a forwarded signal; and means for transmitting, to the repeater node, configuration information enabling the repeater node to regenerate an incoming signal that includes a first DMRS sequence as an outgoing signal that includes a second DMRS sequence replacing the first DMRS sequence.

Aspects generally include a method, apparatus, system, computer program product, non-transitory computer-readable medium, user equipment, base station, wireless node, forwarding node, repeater node, relay node, control node, transmitter node, receiver node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
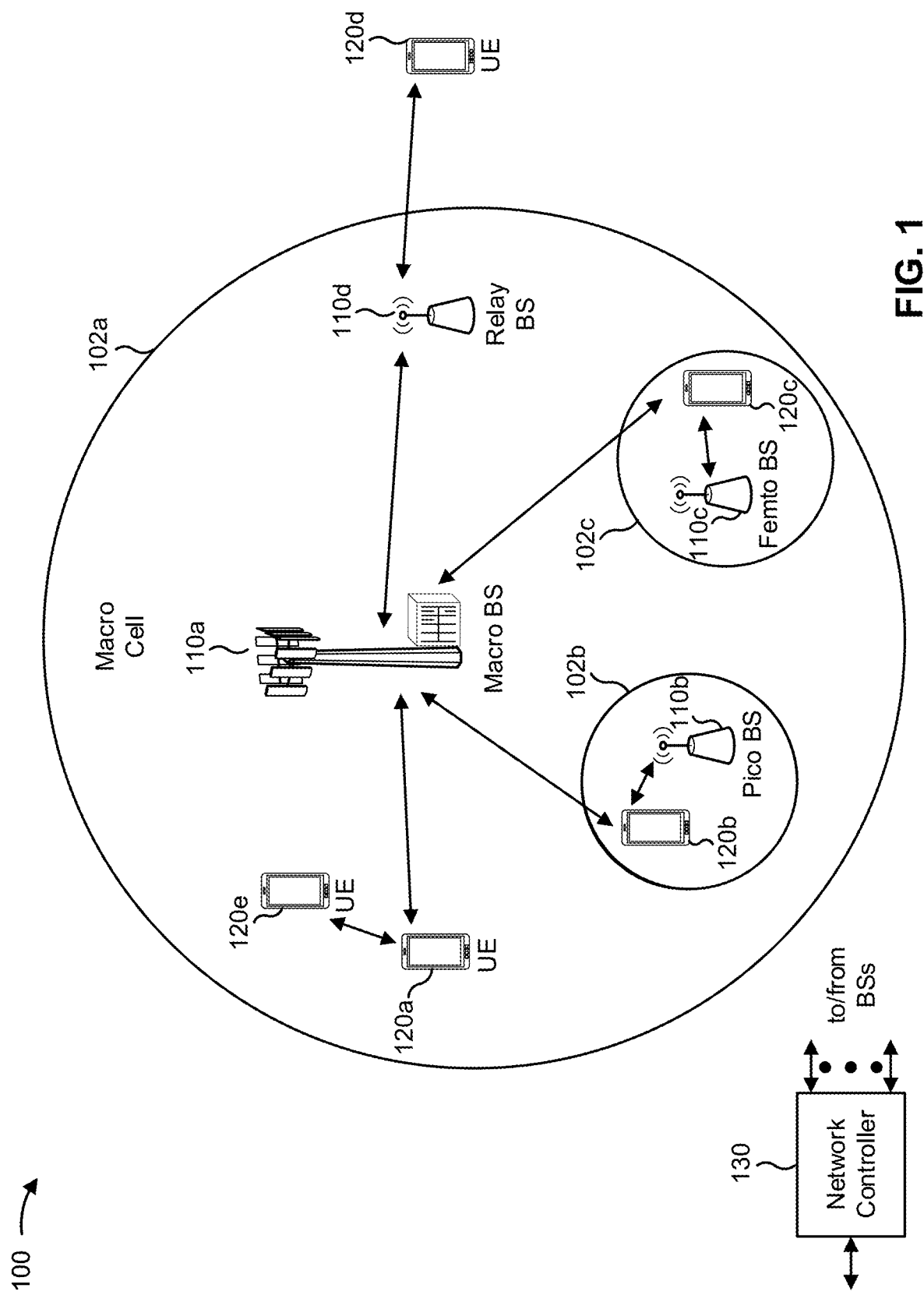
FIG. 1 is a diagram illustrating an example of a wireless network, in accordance with the present disclosure.

Analog repeaters may be used to forward transmissions of a base station, such as synchronization signal block (SSB) transmissions and/or remaining minimum system information (RMSI) transmissions, thereby improving a coverage of transmissions that enable initial network access. However, the use of analog repeaters to forward access procedure transmissions may result in scalability and/or efficiency issues. In particular, an analog repeater cannot store information associated with an SSB, an RMSI physical downlink control channel (PDCCH) that schedules an RMSI physical downlink shared channel (PDSCH), and/or an RMSI PDSCH that includes system information required for initial network access (e.g., random access parameters). Accordingly, an analog repeater must receive and forward RMSI PDCCH and RMSI PDSCH signals in real time (e.g., in a full duplex mode).

Accordingly, for each repeater that is to forward an SSB, an RMSI PDCCH, and/or an RMSI PDSCH, the base station must perform multiple transmissions of the SSB and/or RMSI transmission(s) to be forwarded. Furthermore, even though the system information included in the RMSI PDSCH and at least some of the forwarding (e.g., reception and/or transmission) parameters for the RMSI PDCCH change relatively infrequently, the base station has to repeatedly transmit the RMSI PDSCH content and/or information configuring the forwarding parameters for the RMSI PDCCH because analog repeaters perform processing only in an analog domain (e.g., lack capabilities to store information associated with the RMSI PDCCH and/or RMSI PDSCH). This consumes significant network resources and/or consumes significant computing resources of the base station and the repeater(s), among other examples.

Some techniques and apparatuses described herein provide for efficient RMSI transmission in a wireless network. In some aspects, a forwarding node may receive, in advance from a control node, semi-static configuration information indicating one or more parameters for forwarding an RMSI PDCCH. Accordingly, when the forwarding node receives an RMSI PDCCH that schedules an RMSI PDSCH from a transmitter node, the forwarding node may forward the RMSI PDCCH to a receiver node based at least in part on the semi-static configuration information. Furthermore, in some aspects, the forwarding node may store content of the RMSI PDSCH such that the stored content can be received, and multiple instances of the RMSI PDSCH can be transmitted, without the transmitter node having to repeatedly send a copy of the content of the RMSI PDSCH to the forwarding node. In this way, RMSI transmission by the base station may be reduced, thereby conserving network resources and/or conserving computing resources at the base station, among other examples.

Some techniques and apparatuses described herein further provide for efficient forwarding of SSBs. In some aspects, a forwarding node may receive, in advance, information associated with SSBs that are to be forwarded by the forwarding node. The forwarding node may store the information for subsequent use. The forwarding node may transmit the SSBs based at least in part on the stored information. For example, the forwarding node may generate the SSBs based at least in part on the information. In some aspects, the forwarding node may forward the SSBs in parallel with SSBs transmitted by a base station. For example, the forwarding node may forward the SSBs in the same SSB period in which the base station transmits SSBs. In this way, SSB transmission at the base station may be reduced, thereby conserving network resources and/or conserving computing resources at the base station, among other examples.

In a wireless network, a transmitted signal typically arrives at a receiver with impairments that depend on variations in a wireless channel between a transmitter and the receiver. For example, wireless channel impairments may include noise, path loss, shadowing, fading, phase drift, and/or the like. Accordingly, the transmitter may transmit a reference signal to the receiver to enable the receiver to perform channel estimation of one or more properties of the wireless channel in order to process the received signal. For example, a demodulation reference signal (DMRS) may carry information that a receiver can use to estimate a radio channel in order to demodulate an associated physical channel. To enable channel estimation using a DMRS, the receiver may need to determine a resource configuration associated with the DMRS. For example, the resource configuration may include a DMRS sequence (sometimes referred to as a DMRS scrambling sequence) based at least in part on one or more time resources associated with a time interval in which the DMRS is transmitted. This may create inefficiencies, however, when a forwarding node, such as a digital repeater, is used to forward a transmitted signal that includes a time-dependent DMRS sequence.

Some aspects described herein relate to techniques and apparatuses to manage DMRS scrambling sequences at a repeater node that is configured to receive a signal from a transmitter node in a first time interval, regenerate the received signal based on one or more digital processing operations, and forward the regenerated signal to a receiver node in a second time interval. For example, in some aspects, an incoming signal received from the transmitter node may include a first DMRS sequence associated with the first time interval in which the incoming signal is transmitted, and the repeater node may replace the first DMRS sequence with a second DMRS sequence in an outgoing signal that is a regenerated version of the incoming signal. In particular, the second DMRS sequence associated with the outgoing signal may be based on time resources associated with a second time interval in which the outgoing signal is scheduled to be transmitted to a receiver node. Accordingly, the repeater node may forward the outgoing signal that is a regenerated version of the incoming signal to the receiver node in the second time interval. In this way, the receiver node may potentially receive two copies of the signal, including the original signal transmitted in the first time interval and the regenerated signal transmitted in the second time interval. In this way, because the original signal includes a DMRS sequence associated with the first time interval and the regenerated signal includes a DMRS sequence associated with the second time interval, the receiver node may correctly receive and process (e.g., demodulate) both copies of the signal and achieve a signal processing gain. Furthermore, in cases where the original signal includes content to be transmitted to the receiver node multiple times in multiple occasions, the transmitter node may send a single copy of the signal to the repeater node, and the repeater node may repeat the signal at different time resources using DMRS sequences that are associated with the corresponding time resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
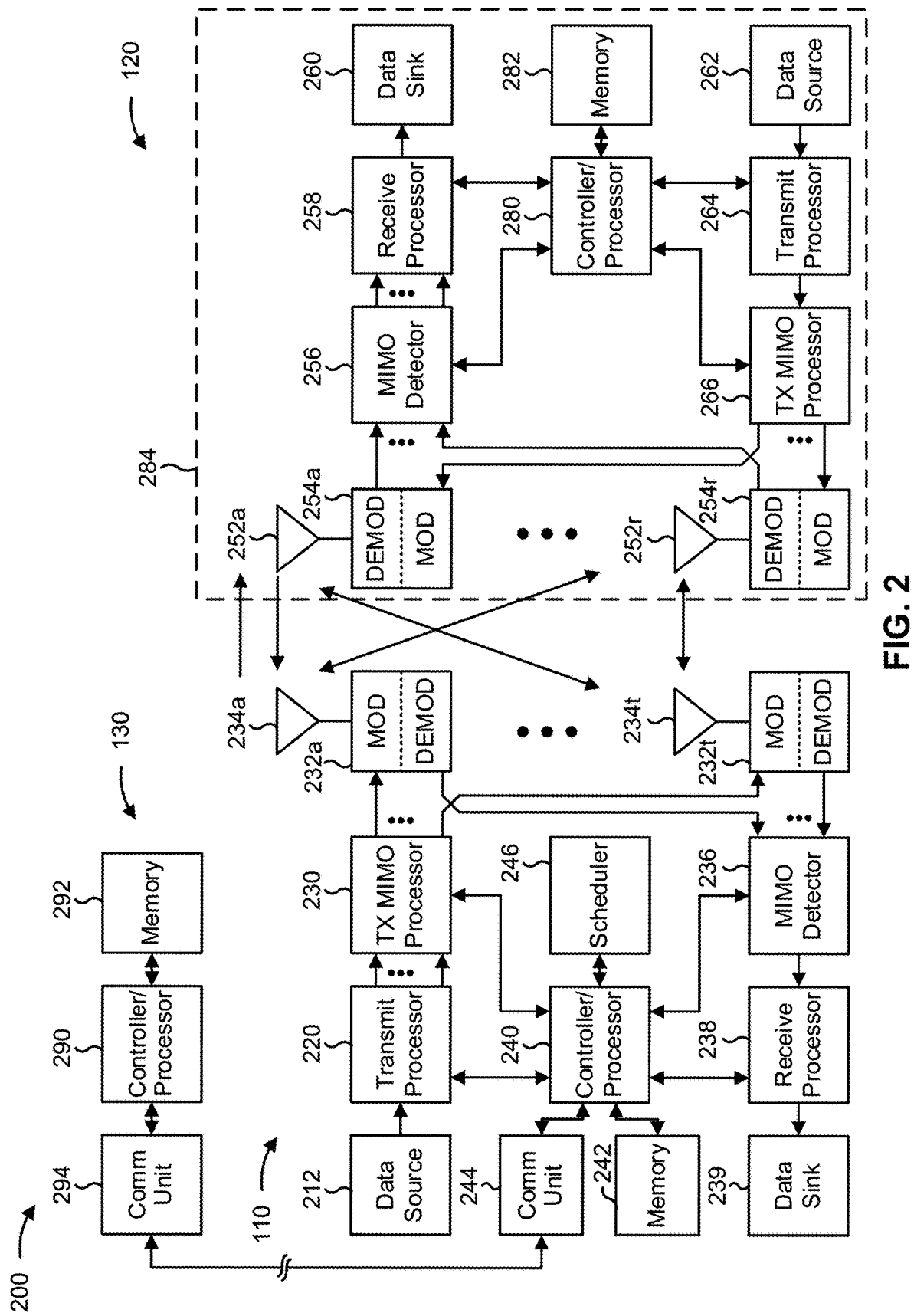
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a DMRS) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine an RSRP parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 9-21).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 9-21).

Controller/processor 240 of base station 110, controller/processor 280 of UE 120, and/or any other component(s) of FIG. 2 may perform one or more techniques associated with RMSI transmission, SSB forwarding, and DMRS management by a wireless forwarding node, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, process 1400 of FIG. 14, process 1500 of FIG. 15, process 1600 of FIG. 16, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, process 1400 of FIG. 14, process 1500 of FIG. 15, process 1600 of FIG. 16, and/or other processes as described herein. In some aspects, executing instructions may include running the instructions, converting the instructions, compiling the instructions, and/or interpreting the instructions, among other examples.

In some aspects, a wireless forwarding node (e.g., a wireless node, a base station 110, a UE 120, and/or an integrated access and backhaul (IAB) node, among other examples) includes means for receiving, from a control node via a fronthaul control interface, semi-static configuration information indicating one or more parameters for forwarding an RMSI PDCCH; means for receiving information associated with an RMSI PDCCH from a transmitter node, wherein the RMSI PDCCH schedules transmission of an RMSI PDSCH that carries RMSI associated with an access procedure; and/or means for transmitting an RMSI PDCCH to one or more receiver nodes based at least in part on the received information and the semi-static configuration information. The means for the wireless forwarding node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the wireless forwarding node to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the wireless forwarding node includes means for storing content of the RMSI associated with the access procedure; and/or means for transmitting, to the one or more receiver nodes, in multiple transmission occasions associated with the access procedure, the content of the RMSI associated with the access procedure in multiple instances of the RMSI PDSCH.

In some aspects, the wireless forwarding node includes means for decoding a single received instance of the RMSI PDSCH, based at least in part on a first DMRS sequence associated with the RMSI PDSCH, to obtain a transport block that includes the RMSI associated with the access procedure; means for encoding the transport block to generate a codeword of the multiple instances of the RMSI PDSCH that are transmitted in the multiple transmission occasions; and/or means for inserting the codeword and a new DMRS sequence into each instance of the RMSI PDSCH based at least in part on the one or more time resources associated with the transmission occasion in which the respective RMSI PDSCH is transmitted.

In some aspects, the wireless forwarding node includes means for extracting one or more tones in a single received instance of the RMSI PDSCH that are occupied by a first DMRS sequence associated with the RMSI PDSCH; means for descrambling the one or more tones extracted from the single received instance of the RMSI PDSCH, based at least in part on a conjugate of the first DMRS sequence, to obtain one or more tones associated with the multiple instances of the RMSI PDSCH that are transmitted in the multiple transmission occasions; and/or means for scrambling, for each instance of the RMSI PDSCH, the one or more tones with a new DMRS sequence, based at least in part on the one or more time resources associated with the transmission occasion in which the instance of the RMSI PDSCH is transmitted.

In some aspects, the wireless forwarding node includes means for obtaining a payload that includes the RMSI associated with the access procedure; and/or means for inserting the payload and a new DMRS sequence into each instance of the RMSI PDSCH based at least in part on the one or more time resources associated with the transmission occasion in which the instance of the RMSI PDSCH is transmitted.

In some aspects, the wireless forwarding node includes means for receiving, at the mobile termination (MT) unit associated with the wireless node, information updating the content of the RMSI in a fronthaul PDSCH.

In some aspects, a forwarding node includes means for receiving information for use in generating one or more SSB communications that are to be transmitted in an SSB period; means for storing the information; and/or means for transmitting the one or more SSB communications, based at least in part on the information, in the SSB period. The means for the forwarding node to perform operations described herein may include, for example transmit processor 220, TX MIMO processor 230, modulator 232, antenna 234, demodulator 232, MIMO detector 236, receive processor 238, controller/processor 240, memory 242, and/or scheduler 246; and/or antenna 252, demodulator 254, MIMO detector 256, receive processor 258, transmit processor 264, TX MIMO processor 266, modulator 254, controller/processor 280, and/or memory 282.

In some aspects, the forwarding node includes means for receiving additional information for use in generating a physical broadcast channel or a demodulation reference signal for the one or more SSB communications.

In some aspects, the forwarding node includes means for generating a primary synchronization signal or a secondary synchronization signal based at least in part on SSBs received at a mobile termination of the forwarding node.

In some aspects, the forwarding node includes means for generating a primary synchronization signal or a secondary synchronization signal based at least in part on a physical cell identifier associated with a base station.

In some aspects, the forwarding node includes means for generating a physical broadcast channel based at least in part on a content of a master information block and a transmission time for the master information block.

In some aspects, the forwarding node includes means for generating the one or more SSB communications based at least in part on the information.

In some aspects, the forwarding node includes means for transmitting the one or more SSB communications in the SSB period with one or more additional SSB communications transmitted by a base station.

In some aspects, the forwarding node includes means for performing digital processing of the information.

In some aspects, the forwarding node includes means for forwarding one or more non-SSB communications between a first wireless node and a second wireless node.

In some aspects, a control node (e.g., a wireless node, a base station 110, an IAB donor node, and/or an IAB node, among other examples) includes means for determining information for use by a forwarding node in generating one or more SSB communications that are to be transmitted by the forwarding node in an SSB period; and/or means for transmitting the information to the forwarding node. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the control node includes means for transmitting additional information for use in generating a physical broadcast channel or a demodulation reference signal for the one or more SSB communications.

In some aspects, the control node includes means for transmitting SSBs to a mobile termination of the forwarding node.

In some aspects, the control node includes means for transmitting one or more additional SSB communications in the SSB period with the one or more SSB communications.

In some aspects, a repeater node includes means for receiving, from a transmitter node in a first time interval, a first signal including a first DMRS sequence that is based at least in part on one or more time resources associated with the first time interval and/or means for transmitting, to a receiver node in a second time interval, a second signal including a second DMRS sequence that is based at least in part on one or more time resources associated with the second time interval, wherein the second signal is a regenerated version of the first signal. The means for the repeater node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the repeater node to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the repeater node includes means for performing one or more digital processing operations on the first signal to generate the second signal.

In some aspects, the repeater node includes means for decoding the first signal based at least in part on the first DMRS sequence to obtain a transport block from the first signal, means for encoding the transport block to generate a codeword of the second signal, and/or means for inserting the second DMRS sequence into a channel of the second signal.

In some aspects, the repeater node includes means for extracting one or more tones in the first signal that are occupied by the first DMRS sequence, means for descrambling the one or more tones extracted from the first signal based at least in part on a conjugate of the first DMRS sequence to obtain one or more tones of the second signal, and/or means for scrambling the one or more tones of the second signal based at least in part on the second DMRS sequence.

In some aspects, the repeater node includes means for transmitting one or more repetitions of the second signal to the receiver node in one or more time intervals subsequent to the second time interval, where the one or more repetitions of the second signal each include a DMRS sequence associated with a time interval in which the respective repetition is transmitted.

In some aspects, the repeater node includes means for receiving, from a control node, configuration information enabling the repeater node to regenerate the first signal as the second signal with the second DMRS sequence replacing the first DMRS sequence.

In some aspects, the repeater node includes means for determining a scrambling identifier associated with the second DMRS sequence based at least in part on the scrambling identifier of the first DMRS sequence and the one or more time resources associated with the second DMRS sequence.

In some aspects, a control node includes means for receiving, from a repeater node, information indicating that the repeater node has a capability to change a DMRS sequence in a forwarded signal and/or means for transmitting, to the repeater node, configuration information enabling the repeater node to regenerate an incoming signal that includes a first DMRS sequence as an outgoing signal that includes a second DMRS sequence replacing the first DMRS sequence. The means for the control node to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246. Additionally, or alternatively, the means for the control node to perform operations described herein may include, for example, antenna 252, demodulator 254, MIMO detector 256, receive processor 258, transmit processor 264, TX MIMO processor 266, modulator 254, controller/processor 280, and/or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
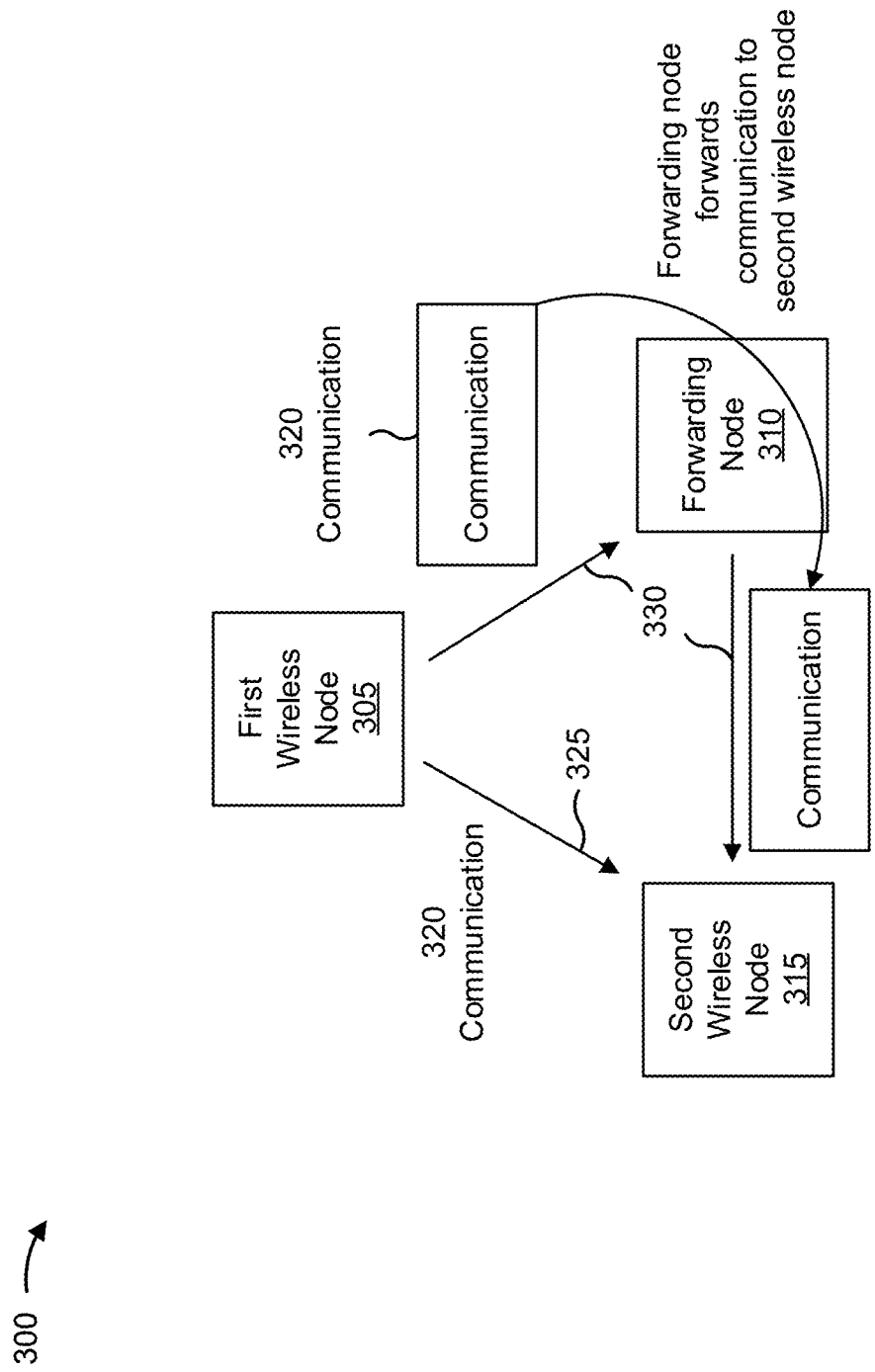
FIG. 3 is a diagram illustrating an example of a forwarding node that forwards communications between a first wireless node and a second wireless node, in accordance with the present disclosure.

FIG. 3 is a diagram illustrating an example 300 of a forwarding node (e.g., a repeater node or a relay node) that forwards communications between a first wireless node and a second wireless node, in accordance with the present disclosure. As shown, example 300 includes a first wireless node 305 (e.g., an IAB node, an IAB donor, a base station 110, a UE 120, and/or the like), a forwarding node 310 (e.g., a repeater device, a relay device, a base station 110, a UE 120, a millimeter wave (mmWave) repeater, a mmWave relay, a digital repeater, an analog repeater, a digital relay, an analog relay, and/or the like), and a second wireless node 315 (e.g., an IAB node, an IAB donor, a base station 110, a UE 120, another forwarding node 310, and/or the like). In some aspects, the first wireless node 305 and/or the second wireless node 315 may be aware of the forwarding node 310. In some aspects, the first wireless node 305 and/or the second wireless node 315 may be unaware of the forwarding node 310.

As shown in FIG. 3, the first wireless node 305 may have a communication 320 (e.g., a data communication, a control communication, and/or the like) to transmit to the second wireless node 315 using a direct link 325 (e.g., an access link and/or the like) between the first wireless node 305 and the second wireless node 315. However, the first wireless node 305 may be unable to transmit the communication 320 to the second wireless node 315 using the direct link 325. For example, the second wireless node 315 may be outside of a transmit range of the first wireless node 305, the direct link 325 may be blocked, and/or the like.

Therefore, the first wireless node 305 may communicate with the second wireless node 315 using an indirect link 330. For example, the first wireless node 305 may transmit the communication 320 to the forwarding node 310. In some aspects, the first wireless node 305 may transmit the communication 320 directly to the forwarding node 310 (e.g., in a case where the first wireless node 305 is aware of the forwarding node 310). In some aspects, the forwarding node 310 may be configured (e.g., by a control node, by the second wireless node 315, and/or the like) to receive the communication 320 from the first wireless node 305 (e.g., in a case where the first wireless node 305 is unaware of the forwarding node 310).

As shown in FIG. 3, the communication 320 may arrive at the forwarding node 310 and be forwarded by the forwarding node 310. In some aspects, the forwarding node 310 is a repeater node (or repeater unit), and the repeater node may regenerate a signal of the communication 320. For example, the repeater node may receive a signal of the communication 320, extract tones from the signal, regenerate the signal based at least in part on the extracted tones, and transmit the regenerated signal. In some aspects, the forwarding node 310 is a relay node (or relay unit), and the relay node may generate a new signal based at least in part on a signal of the communication 320. For example, the relay node may receive a downlink signal that carries information associated with a communication (e.g., in-phase and quadrature (IQ) samples), generate a new signal based at least in part on the information, and transmit the new signal. As another example, the relay node may receive an uplink signal, generate a new signal that carries information associated with the uplink signal (e.g., IQ samples), and transmit the new signal.

In some cases, the indirect link 330 may be an access link, a side link, or a fronthaul link. For example, if the first wireless node 305 is a base station 110 and the second wireless node 315 is a UE 120, the indirect link 330 between the first wireless node 305 and the forwarding node 310 may be a fronthaul link. The indirect link 330 between the forwarding node 310 and the second wireless node 315 may be an access link. Using the communication scheme shown in FIG. 3 may improve network performance and increase reliability by providing the first wireless node 305 and/or the second wireless node 315 with link diversity for communications, by extending a communication coverage area of the first wireless node 305 and/or the second wireless node 315, and/or the like.

As indicated above, FIG. 3 is provided as an example. Other examples may differ from what is described with respect to FIG. 3.

Figure 4:
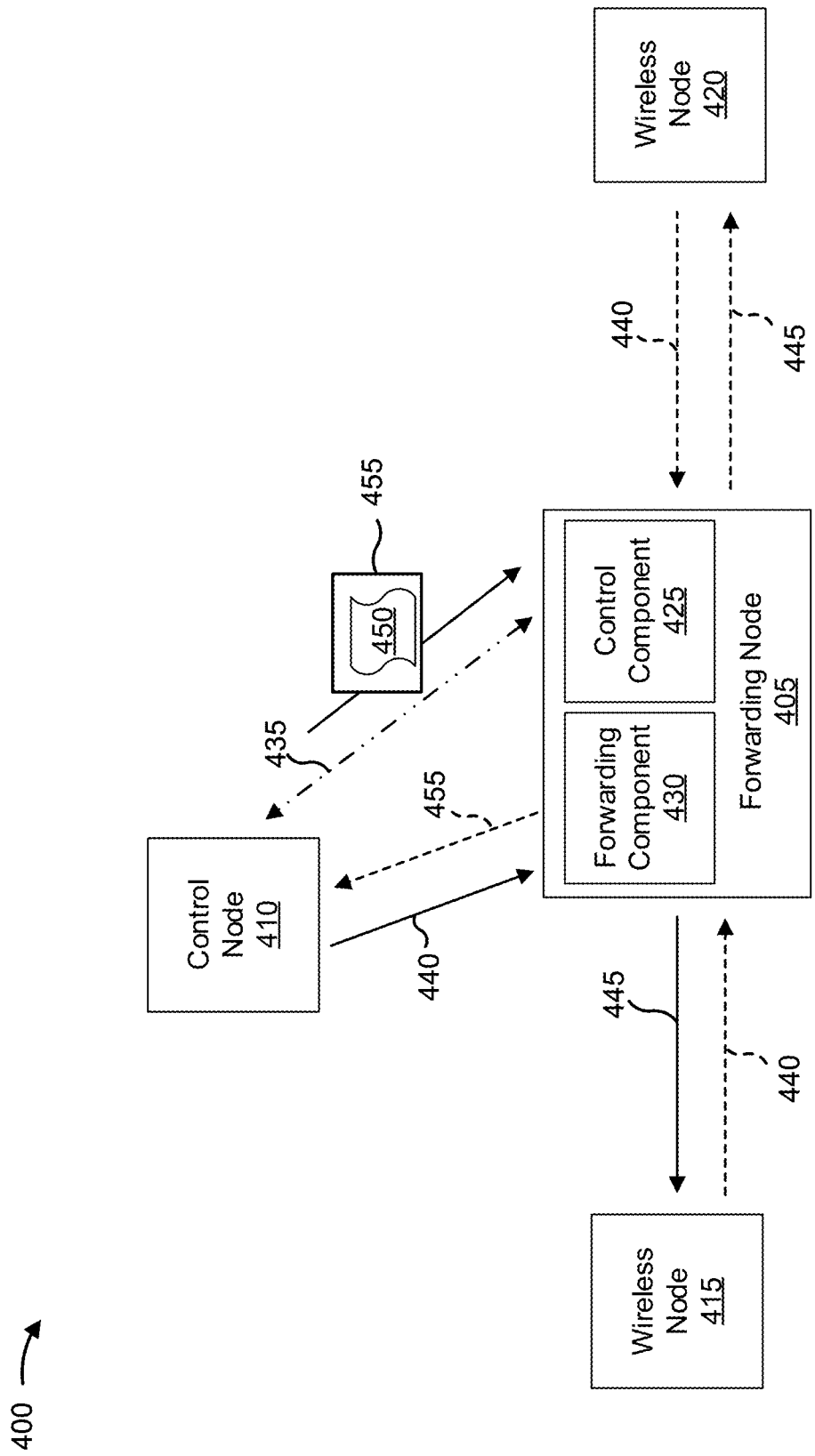
FIG. 4 is a diagram illustrating an example of forwarding a wireless signal using a forwarding node, in accordance with the present disclosure.

FIG. 4 is a diagram illustrating an example 400 of forwarding a wireless signal using a forwarding node 405, in accordance with the present disclosure. In some aspects, as shown, the forwarding node 405 may communicate with a control node 410 and one or more wireless nodes 415, 420 in a wireless network. In some aspects, the forwarding node 405 may include the forwarding node 310 shown in FIG. 3. In some aspects, the control node 410, the wireless node 415, and/or the wireless node 420 may be a wireless node such as, for example, the first wireless node 305 shown in FIG. 3, the second wireless node 315 shown in FIG. 3, an IAB node, an IAB donor, a base station 110 shown in FIG. 1, a UE 120 shown in FIG. 1, and/or the like.

In some aspects, the forwarding node 405 may be a digital repeater node (or repeater unit) configured to receive an incoming signal and to transmit a regenerated version of the incoming signal. For example, when implemented or otherwise configured as a digital repeater node, the forwarding node 405 may receive an incoming signal, extract tones from the incoming signal, regenerate the incoming signal based at least in part on the extracted tones, and transmit the regenerated signal as an outgoing signal. Additionally, or alternatively, the forwarding node 405 may be a digital relay node (or relay unit) configured to generate a new signal based at least in part on an incoming signal. For example, when implemented or otherwise configured as a digital relay node, the forwarding node 405 may receive a downlink signal (e.g., a fronthaul PDSCH (FH-PDSCH)) that carries information (e.g., IQ samples), generate a new downlink signal (e.g., a legacy PDSCH) that carries information about and/or from the downlink signal (e.g., the IQ samples), and transmit the new downlink signal to a receiver. As another example, when implemented or otherwise configured as a digital relay node, the forwarding node 405 may receive an uplink signal (e.g., a legacy physical uplink shared channel (PUSCH)), generate a new uplink signal (e.g., an FH-PUSCH) that carries information associated with the uplink signal (e.g., IQ samples), and transmit the new uplink signal to a receiver.

As shown in FIG. 4, the forwarding node 405 may include a control component 425 and a forwarding component 430. In some aspects, the control component 425 may facilitate establishing a wireless control interface 435 between the forwarding node 405 and the control node 410. In some aspects, the control component 425 may include one or more components and/or functions that are, or are similar to, one or more components of a base station (e.g., the base station 110 shown in FIGS. 1 and 2), a UE (e.g., the UE 120 shown in FIGS. 1 and 2), and/or the like. In some aspects, the forwarding component 430 may perform one or more forwarding (e.g., repeating and/or relaying) operations based at least in part on information received by the control component over the wireless control interface 435. For example, a forwarding operation may include receiving a first signal 440, performing one or more digital processing operations on the first signal 440 to generate a second signal 445, and transmitting the second signal 445. The second signal 445 may be the result of the forwarding node 405 performing a repeating operation to regenerate the first signal 440 (e.g., through the one or more digital processing operations) such that $X' \approx X$, where X is the first signal 440 and X' is the second signal 445. Additionally, or alternatively, the second signal 445 may be the result of the forwarding node 405 performing a relaying operation to generate a new signal that carries information about and/or from the first signal 440 (e.g., through the one or more digital processing operations) such that $Y=f(X)$, where X is the first signal 440, Y is the second signal 445, and f is a function based at least in part on one or more digital processing operations that the forwarding node 405 performs to generate the new signal.

In some aspects, the first signal 440 may include a communication (e.g., the communication 320 shown in FIG. 3) that is transmitted from the control node 410 and addressed to the wireless node 415. In some aspects, as shown, the first signal 440 may be transmitted from the control node 410 and addressed to the wireless node 415. In some aspects, the first signal 440 may be transmitted from the wireless node 415 or the wireless node 420 and addressed to the control node 410, addressed to the other wireless node 415 or wireless node 420, and/or the like. In some aspects, the first signal 440 may be addressed to a plurality of wireless nodes (e.g., wireless node 415, wireless node 420, control node 410, and/or the like). In some aspects, the first signal 440 may include an SSB and/or RMSI communication, information associated with an SSB or RMSI communication, a PDCCH transmission, a PDSCH transmission, a physical uplink control channel (PUCCH) transmission, a PUSCH transmission, a physical sidelink control channel (PSCCH) transmission, a physical sidelink shared channel (PSSCH) transmission, an acknowledgement or negative acknowledgement (ACK/NACK) feedback message, and/or the like.

In some aspects, the forwarding component 430 may perform the one or more forwarding operations based at least in part on a configuration established using the control component 425. For example, in some aspects, the control node 410 may transmit configuration information 450 using a control message 455, and the forwarding node 405 may receive the control message 455 using the control component 425.

In some aspects, the control node 410 may transmit the configuration information 450 in the control message 455 via the wireless control interface 435. The configuration information 450 may be carried in at least one control message 455. In some aspects, control messages may be used to control communication between the forwarding node 405 and the control node 410 in accordance with a specification of the wireless control interface 435. In some aspects, the configuration information 450 may be carried in a lower-layer control message (e.g., a control message associated with physical layers and/or medium access control (MAC) layers), an upper-layer control message (e.g., a control message associated with network layers), an application-layer control message (e.g., a control message associated with an application layer), and/or the like. For example, a control message may be carried using a radio resource control (RRC) message, downlink control information (DCI), a MAC control element (MAC-CE), and/or the like.

In some aspects, a control message may be included within the first signal 440. In some aspects, the configuration information 450 may be carried in a fronthaul PDCCH (FH-PDCCH) control message. In some aspects, the FH-PDCCH control message may include DCI scrambled by a fronthaul radio network temporary identifier (FH-RNTI). The FH-RNTI may be associated with the control component 425.

In some aspects, the control message 455 may configure any number of different types of settings, configurations, digital processing operations, receiving operations, buffering operations, forwarding (transmitting) operations, and/or the like. In some aspects, the forwarding node 405 may transmit, and the control node 410 may receive, one or more control messages. For example, in some aspects, the forwarding node 405 may, using the control component 425, transmit a control message via the wireless control interface 435 to the control node 410. The control message transmitted by the forwarding node 405 may indicate a configuration, a capability, a status, and/or other information related to the forwarding node 405.

As indicated above, in some aspects, the control node 410 may configure the forwarding node 405 for a particular forwarding (e.g., repeating and/or relaying) operation by transmitting configuration information 450 to the forwarding node 405. In some aspects, the configuration information 450 may indicate a digital processing operation. The digital processing operation may include a digital processing option selected from a plurality of digital processing options (e.g., as described below in connection with FIG. 5 and FIGS. 6A-6B). In some aspects, the configuration information 450 may include one or more information elements (IEs) that indicate a reception configuration, a buffering configuration, a forwarding configuration, an information request, and/or the like.

In some aspects, the reception configuration may configure one or more receiving operations of the forwarding component 430 with respect to receiving the first signal 440. The reception configuration may indicate, for example, a receiving analog beamforming configuration, a time domain resource associated with the first signal 440, a frequency domain resource associated with the first signal 440, a numerology associated with the first signal 440, a digital receiver beamforming configuration, resource element (RE) mapping information associated with the first signal 440, a channel estimation configuration, a scrambling identifier associated with the first signal 440, a coding configuration associated with the first signal 440, and/or the like.

In some aspects, the buffering configuration may configure one or more buffering operations of the forwarding component 430 with respect to buffering a digitized form of the first signal 440. In some aspects, the buffering configuration may indicate an analog-to-digital converter (ADC) setting, a digital-to-analog converter (DAC) setting, an IQ sample compression setting, an IQ sample decompression setting, and/or the like.

In some aspects, the forwarding configuration may configure one or more forwarding operations of the forwarding component 430 with respect to transmitting the second signal 445, which may be a regenerated form of the first signal 440 or a new signal that carries information about and/or from the first signal 440. In some aspects, the forwarding configuration may include a transmission beamforming configuration, a time domain resource associated with transmitting the second signal, a transmission power setting, a transmission amplification setting, a transmission center frequency, a numerology associated with transmitting the second signal, a digital transmitter beamforming configuration, RE mapping information associated with transmitting the second signal, a layer mapping configuration, a precoding configuration, a scrambling identifier associated with transmitting the second signal, a coding configuration associated with transmitting the second signal, and/or the like.

In some aspects, the information request may configure one or more reporting operations of the forwarding component 430 with respect to providing information to the control node 410. The information may include information about the operation of the forwarding node 405, the configuration of the forwarding node 405, settings of the forwarding node 405, a channel, a communication, and/or the like. In some aspects, the information request may include a request for a buffer status, a power status, a measurement report, a capability of the digital repeater, a configuration of the forwarding node 405, and/or the like.

As indicated above, FIG. 4 is provided as an example. Other examples may differ from what is described with respect to FIG. 4.

Figure 5:
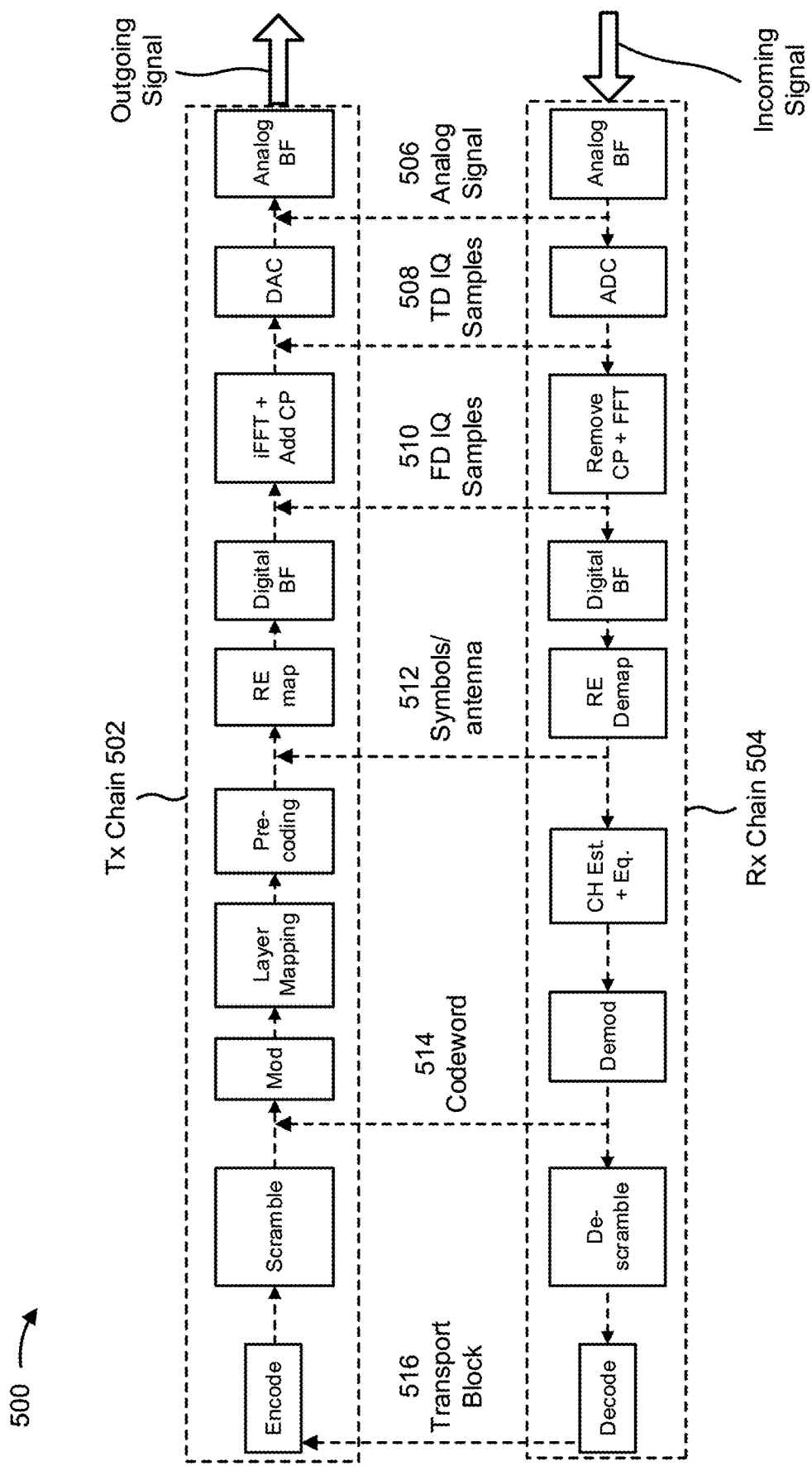
FIG. 5 is a diagram illustrating an example of a transmit (Tx) chain and a receive (Rx) chain of a forwarding node implemented as a repeater node, in accordance with the present disclosure.

FIG. 5 is a diagram illustrating an example 500 of a transmit (Tx) chain 502 and a receive (Rx) chain 504 of a forwarding node implemented as a repeater node, in accordance with the present disclosure.

In some aspects, one or more components of Tx chain 502 may be implemented in transmit processor 220, TX MIMO processor 230, MOD/DEMOD 232, controller/processor 240, and/or the like, as described above in connection with FIG. 2. In some aspects, Tx chain 502 may be implemented in a repeater node for transmitting an outgoing signal (e.g., uplink data, downlink data, an uplink reference signal, a downlink reference signal, uplink control information, downlink control information, and/or the like) associated with a repeating operation performed by the repeater node.

In some aspects, one or more components of Rx chain 504 may be implemented in receive processor 238, MIMO detector 236, MOD/DEMOD 232, controller/processor 240, and/or the like, as described above in connection with FIG. 2. In some aspects, Rx chain 504 may be implemented in a repeater node for receiving an incoming signal (e.g., downlink data, uplink data, a downlink reference signal, an uplink reference signal, downlink control information, uplink control information, and/or the like) associated with a repeating operation performed by the repeater node.

As shown in FIG. 5 and example 500, the incoming signal may be a downlink signal that is received over a fronthaul link from a distributed unit (DU) of an IAB node, a base station 110, and/or the like, and the outgoing signal may be a regenerated version of the downlink signal that is transmitted over an access link to an MT unit of an IAB node, a UE 120, and/or the like. Additionally, or alternatively, the incoming signal may be an uplink signal that is received over an access link from an MT unit of an IAB node, a UE 120, and/or the like, and the outgoing signal may be a regenerated version of the uplink signal that is transmitted over a fronthaul link to a DU of an IAB node, a base station 110, and/or the like. Accordingly, as described herein, repeating operations performed by the repeater node may be symmetric for downlink and uplink signals. Furthermore, in some aspects, the device transmitting the incoming signal and/or the device receiving the outgoing signal may be unaware of the repeater node (e.g., the repeating operations may be transparent to the transmitting device and/or the receiving device).

As shown in FIG. 5, the incoming signal may be processed by the Rx chain 504. For example, as described herein, the repeater node may perform different levels of analog and/or digital processing to regenerate the incoming signal as the outgoing signal. The level of processing performed by the repeater node may be based at least in part on a configuration received by the repeater node (e.g., from a control node and/or the like). For example, as shown by reference number 506 (which shows what may be referred to as Split Option 9), the repeater node may perform analog beamforming on the incoming signal and may provide an analog signal to the Tx chain 502. The repeater node may then perform analog beamforming on the analog signal to transmit the outgoing signal to the receiving device. In this case, the repeater node may be configured as an analog repeater.

Additionally, or alternatively, the repeater node may be configured as a digital repeater, in which case the repeater node may further process the incoming signal. For example, as shown by reference number 508 (which shows what may be referred to as Split Option 8), the repeater node may process the analog signal by converting the incoming signal from the analog domain to the digital domain using an ADC to determine time domain IQ samples associated with the incoming signal. Accordingly, in some aspects, the repeater node may process the time domain IQ samples using a DAC to regenerate the analog signal, which is then transmitted using analog beamforming.

Additionally, or alternatively, as shown by reference number 510 (which shows what may be referred to as Split Option 7-1), the repeater node may further process the incoming signal to determine frequency domain IQ samples associated with the incoming signal by removing a cyclic prefix (CP) from the time domain IQ samples and performing a fast Fourier transform (FFT). In this case, the repeater node may generate the outgoing signal by then performing an inverse FFT (iFFT) on the frequency domain IQ samples and adding a CP to obtain time domain IQ samples, converting the time domain IQ samples to an analog signal using a DAC, and transmitting the analog signal using analog beamforming.

Additionally, or alternatively, as shown by reference number 512 (which shows what may be referred to as Split Option 7-2), the repeater node may further process the incoming signal to determine symbols per antenna (e.g., IQ symbols of occupied tones) associated with the incoming signal. For example, the repeater node may perform a digital beamforming process on the frequency domain IQ samples (e.g., based at least in part on a digital Tx beamforming configuration), and may further perform an RE demapping based at least in part on an RE mapping configuration received by the repeater node to identify REs of the incoming signal and/or occupied tones. The repeater node may generate the outgoing signal by processing the symbols per antenna (e.g., IQ symbols of occupied tones) using an RE mapping and digital beamforming information.

Additionally, or alternatively, as shown by reference number 514 (which shows what may be referred to as Split Option 7-3), the repeater node may further process the incoming signal to determine a codeword (e.g., log likelihood ratio (LLR) values and/or the like) associated with the incoming signal. For example, the repeater node may determine the codeword by performing channel estimation and channel equalization on the IQ symbols of occupied tones (e.g., to identify and/or remove noise associated with the incoming signal) and by performing a demodulation procedure on the incoming signal. In this case, the repeater node may generate the outgoing signal by modulating the codeword, performing a layer mapping, applying pre-coding, performing an RE mapping, performing digital Tx beamforming, applying an iFFT and/or adding a CP, converting the signal from the digital domain to the analog domain using a DAC, and performing analog beamforming to transmit the outgoing signal.

Additionally, or alternatively, as shown by reference number 516 (which shows what may be referred to as Split Option 6), the repeater node may further process the incoming signal to obtain a transport block associated with the incoming signal (e.g., the repeater node may fully decode the incoming signal). For example, the repeater node may obtain the transport block by descrambling the codeword (e.g., using a scrambling identifier associated with the incoming signal) and decoding the descrambled codeword (e.g., based at least in part on an MCS associated with the incoming signal). In this case, the repeater node may generate the outgoing signal by encoding the transport block according to a Tx MCS, scrambling the encoded transport block to regenerate the codeword, modulating the codeword and performing a layer mapping and pre-coding to regenerate the symbols per antenna, performing an RE mapping and digital Tx beamforming to regenerate the frequency domain IQ samples, applying an iFFT and/or adding a CP to the frequency domain IQ samples to regenerate the time domain IQ samples, converting the time domain IQ samples from the digital domain to the analog domain with a DAC, and performing analog beamforming on the analog signal in the analog domain to transmit the outgoing signal.

In some aspects, the level of processing that the repeater node performs on the incoming signal may be configured by a control node or another wireless node. The outgoing signal may be a regenerated version of the incoming signal that is based at least in part on the level of processing performed by the repeater node.

The number and arrangement of components shown in FIG. 5 is provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

Figure 6A:
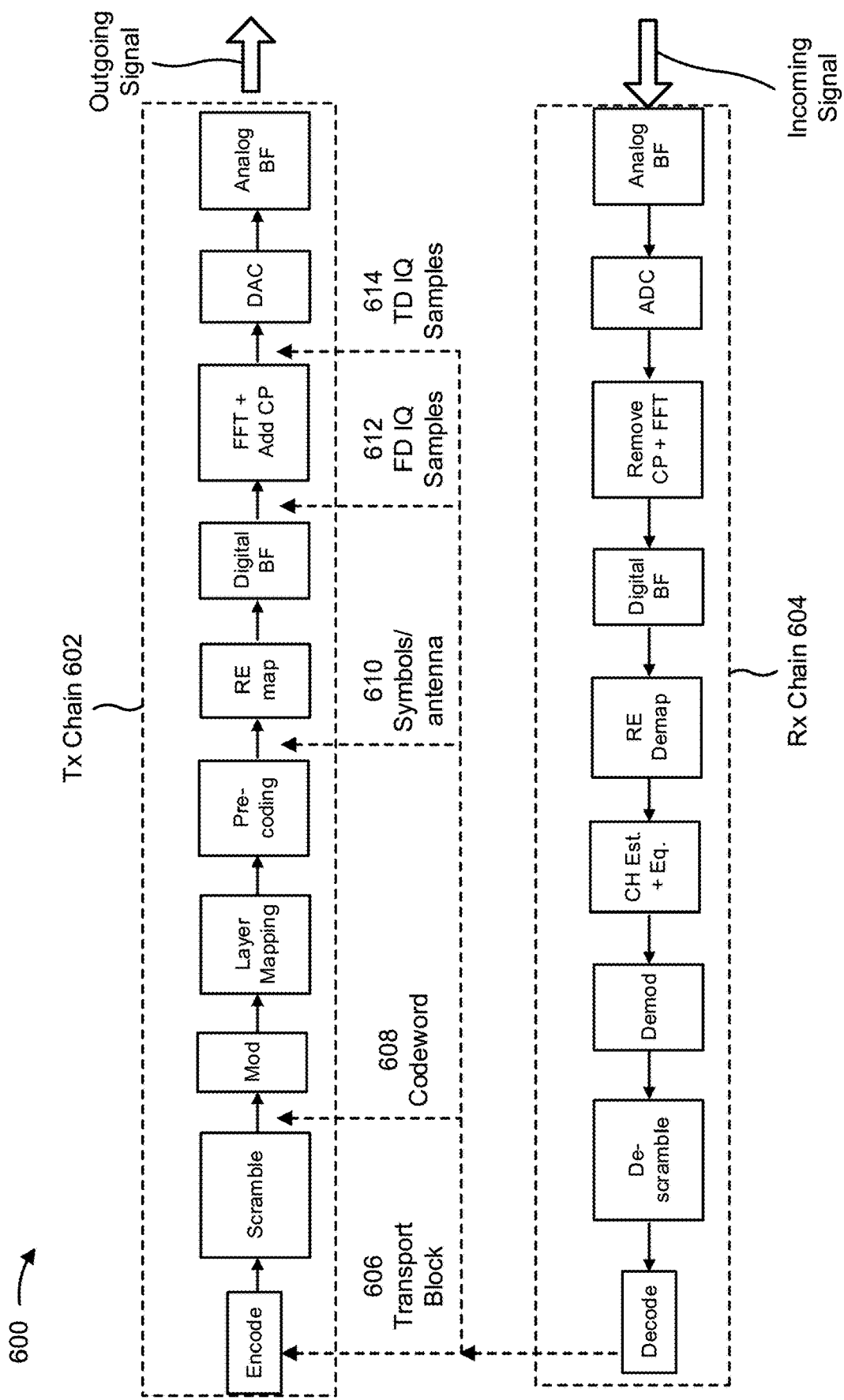
FIGS. 6A-6B are diagrams illustrating examples of a Tx chain and an Rx chain of a forwarding node implemented as a relay node, in accordance with the present disclosure.
Figure 6B:
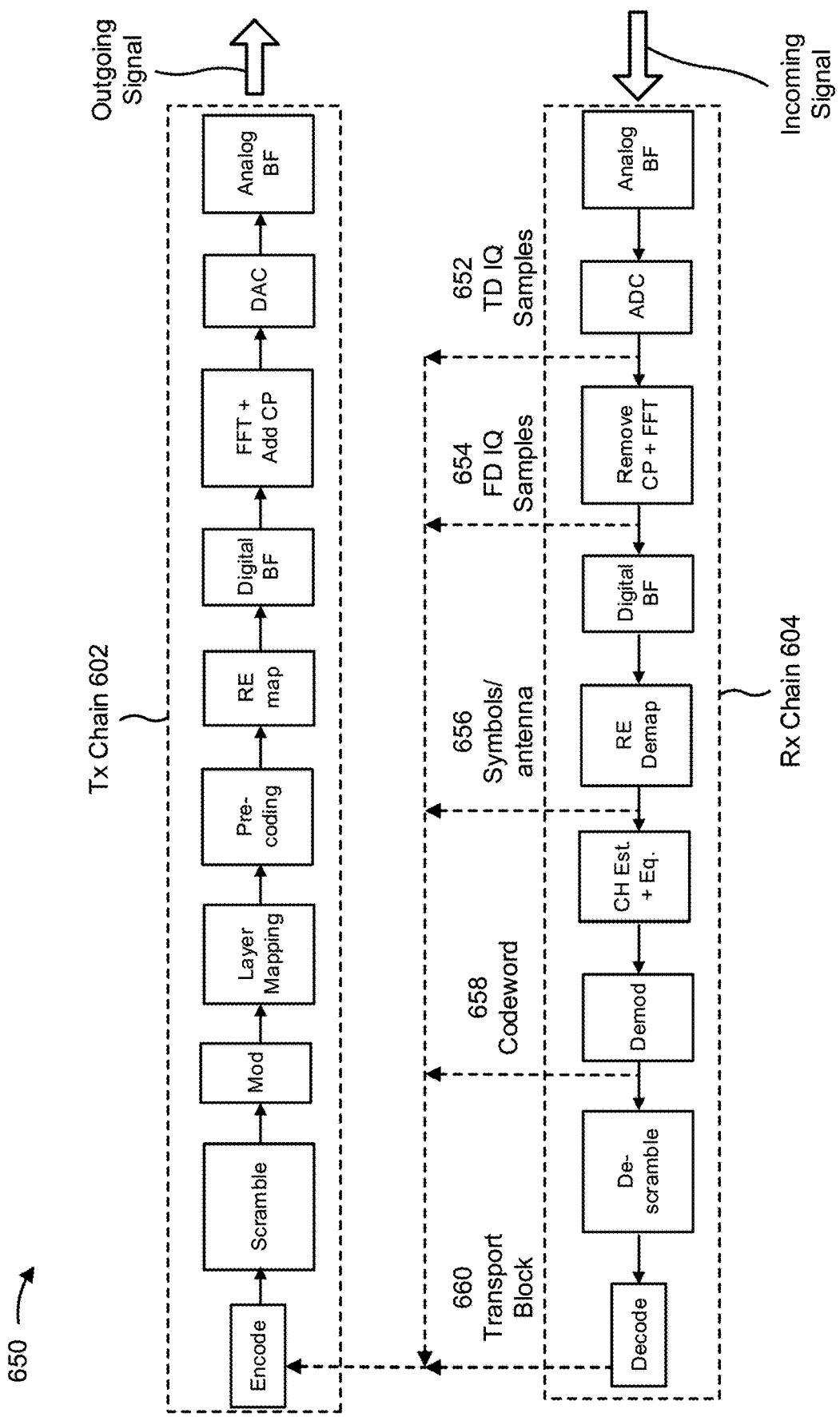

FIGS. 6A-6B are diagrams illustrating examples 600 and 650 of a Tx chain 602 and an Rx chain 604 of a forwarding node implemented as a relay node, in accordance with the present disclosure.

In some aspects, one or more components of Tx chain 602 may be implemented in transmit processor 220, TX MIMO processor 230, MOD/DEMOD 232, controller/processor 240, and/or the like, as described above in connection with FIG. 2. In some aspects, Tx chain 602 may be implemented in a relay node for transmitting an outgoing signal (e.g., uplink data, downlink data, an uplink reference signal, a downlink reference signal, uplink control information, downlink control information, and/or the like) associated with a relaying operation performed by the relay node.

In some aspects, one or more components of Rx chain 604 may be implemented in receive processor 238, MIMO detector 236, MOD/DEMOD 232, controller/processor 240, and/or the like, as described above in connection with FIG. 2. In some aspects, Rx chain 604 may be implemented in a relay node for receiving an incoming signal (e.g., downlink data, uplink data, a downlink reference signal, an uplink reference signal, downlink control information, uplink control information, and/or the like) associated with a relaying operation performed by the relay node.

As shown in FIG. 6A and example 600, the incoming signal may be received by the relay node over a fronthaul link. For example, the incoming signal may be a downlink signal received from a DU of an IAB node, a base station 110, and/or the like. As shown in FIG. 6A, the incoming signal may be processed by the Rx chain 604. For example, the relay node may fully decode the incoming signal to obtain information (e.g., a payload) carried in the incoming signal. The relay node may perform analog beamforming on the incoming signal. The relay node may convert the incoming signal from the analog domain to the digital domain using an ADC. The relay node may remove a CP and/or an FFT associated with the incoming signal. The relay node may perform a digital beamforming process on the incoming signal (e.g., based at least in part on a digital Tx beamforming configuration). The relay node may perform an RE de-mapping procedure based at least in part on an RE mapping configuration received by the relay node to identify REs of the signal and/or occupied tones. The relay node may perform channel estimation and channel equalization on the incoming signal (e.g., to identify and/or remove noise associated with the incoming signal). The relay node may perform a demodulation procedure on the incoming signal. The relay node may de-scramble the incoming signal (e.g., using scrambling IDs associated with the incoming signal). The relay node may decode the incoming signal (e.g., based at least in part on an MCS associated with the incoming signal).

After decoding the incoming signal, the relay node may identify information carried by the incoming signal. For example, a payload of the incoming signal may include time domain IQ samples, frequency domain IQ samples, symbols per antenna (e.g., IQ symbols of occupied tones), a codeword, a transport block, and/or the like. The relay node may generate an outgoing signal using the Tx chain 602. An amount or level of processing performed by the relay node associated with the Tx chain 602 may be based at least in part on the information carried by the incoming signal, a configuration received by the relay node (e.g., from a control node and/or the like), and/or the like.

As shown by reference number 606 (which shows Split Option 6), if the incoming signal is carrying a transport block, the relay node may generate the outgoing signal by fully encoding the transport block to form the outgoing signal (e.g., by encoding the transport block according to a Tx MCS, scrambling the encoded transport block, modulating the scrambled transport block, performing layer mapping, pre-coding, performing digital Rx beamforming, applying an FFT and/or adding a CP, converting the signal from the digital domain to the analog domain with a DAC, performing analog beamforming, and transmitting the outgoing signal).

As shown by reference number 608 (which shows Split Option 7-3), if the incoming signal is carrying a codeword, the relay node may not perform encoding or scrambling to generate the outgoing signal. That is, the relay node may modulate the codeword, perform layer mapping, perform pre-coding, perform digital Tx beamforming, apply an FFT and/or add a CP, convert the signal from the digital domain to the analog domain with a DAC, perform analog beamforming, and transmit the outgoing signal.

As shown by reference number 610 (which shows Split Option 7-2), if the incoming signal is carrying an indication of symbols per antenna (e.g., IQ symbols of occupied tones), the relay node may not perform encoding, scrambling, modulating, layer mapping, and/or pre-coding. That is, the relay node may perform digital Rx beamforming to the IQ symbols of occupied tones, apply an FFT and/or add a CP, convert the signal from the digital domain to the analog domain with a DAC, perform analog beamforming, and transmit the outgoing signal.

As shown by reference number 612 (which shows Split Option 7-1), if the incoming signal is carrying frequency domain IQ samples, the relay node may not perform encoding, scrambling, modulating, layer mapping, pre-coding, and/or digital beamforming. That is, the relay node may apply an FFT and/or add a CP to the frequency domain IQ samples, convert the signal from the digital domain to the analog domain with a DAC, perform analog beamforming, and transmit the outgoing signal.

As shown by reference number 614 (which shows Split Option 8), if the incoming signal is carrying time domain IQ samples, the relay node may not perform encoding, scrambling, modulating, layer mapping, pre-coding, digital beamforming, and/or applying an FFT and/or adding a CP. That is, the relay node may convert the time domain IQ samples from the digital domain to the analog domain with a DAC, perform analog beamforming, and transmit the outgoing signal.

As a result, the level of digital processing used to generate the outgoing signal may vary based at least in part on information carried by the incoming signal. As described above, the relay node may process the incoming signal to identify information included in a payload of the incoming signal. The relay node may generate an outgoing signal that includes information about and/or from the incoming signal based at least in part on the information carried by the incoming signal. In some aspects, a device receiving the outgoing signal may be unaware of the relay node (e.g., the relaying operations may be transparent to the receiving device).

As shown in FIG. 6B and example 650, the incoming signal may be received by the relay node over an access link. For example, the incoming signal may be an uplink signal received from an MT unit of an IAB node, a UE 120, and/or the like. In some aspects, the device transmitting the incoming signal may be unaware of the relay node (e.g., the relaying operations may be transparent to the transmitting device).

The relay node may perform different levels of digital processing to determine information associated with the incoming signal. The level of processing may be based at least in part on a configuration received by the relay node (e.g., from a control node and/or the like). For example, as shown by reference number 652 (which shows Split Option 8), the relay node may process the incoming signal to determine time domain IQ samples associated with the incoming signal. The relay node may generate the outgoing signal by processing the time domain IQ samples and including them in a payload of the outgoing signal (e.g., by fully encoding a transport block indicating the time domain IQ samples). The outgoing signal may be transmitted using a fronthaul link to another wireless node.

As shown by reference number 654 (which shows Split Option 7-1), the relay node may process the incoming signal to determine frequency domain IQ samples associated with the incoming signal. The relay node may generate the outgoing signal by processing the frequency domain IQ samples and including them in a payload of the outgoing signal (e.g., by fully encoding a transport block indicating the frequency domain IQ samples). The outgoing signal may be transmitted using a fronthaul link to another wireless node.

As shown by reference number 656 (which shows Split Option 7-2), the relay node may process the incoming signal to determine symbols per antenna (e.g., IQ symbols of occupied tones) associated with the incoming signal. The relay node may generate the outgoing signal by processing the symbols per antenna (e.g., IQ symbols of occupied tones) and including them in a payload of the outgoing signal (e.g., by fully encoding a transport block indicating the symbols per antenna (e.g., IQ symbols of occupied tones)). The outgoing signal may be transmitted using a fronthaul link to another wireless node.

As shown by reference number 658 (which shows Split Option 7-3), the relay node may process the incoming signal to determine a received codeword (e.g., LLR values and/or the like) associated with the incoming signal. The relay node may generate the outgoing signal by processing the received codeword and including it in a payload of the outgoing signal (e.g., by fully encoding a transport block indicating the received codeword). The outgoing signal may be transmitted using a fronthaul link to another wireless node.

As shown by reference number 660 (which shows Split Option 8), the relay node may process the incoming signal to determine a transport block associated with the incoming signal (e.g., the relay node may fully decode the incoming signal). The relay node may generate the outgoing signal by processing the transport block and including the transport block in a payload of the outgoing signal (e.g., by fully encoding a transport block). The outgoing signal may be transmitted using a fronthaul link to another wireless node.

The level of processing performed on the incoming signal may be configured by a control node or another wireless node. The outgoing signal may include information about and/or from the incoming signal based at least in part on the level of processing performed by the relay node.

The number and arrangement of components shown in FIGS. 6A-6B are provided as an example. In practice, there may be additional components, fewer components, different components, or differently arranged components than those shown in FIGS. 6A-6B. Furthermore, two or more components shown in FIGS. 6A-6B may be implemented within a single component, or a single component shown in FIGS. 6A-6B may be implemented as multiple, distributed components. Additionally, or alternatively, a set of components (e.g., one or more components) shown in FIGS. 6A-6B may perform one or more functions described as being performed by another set of components shown in FIGS. 6A-6B.

Figure 7:
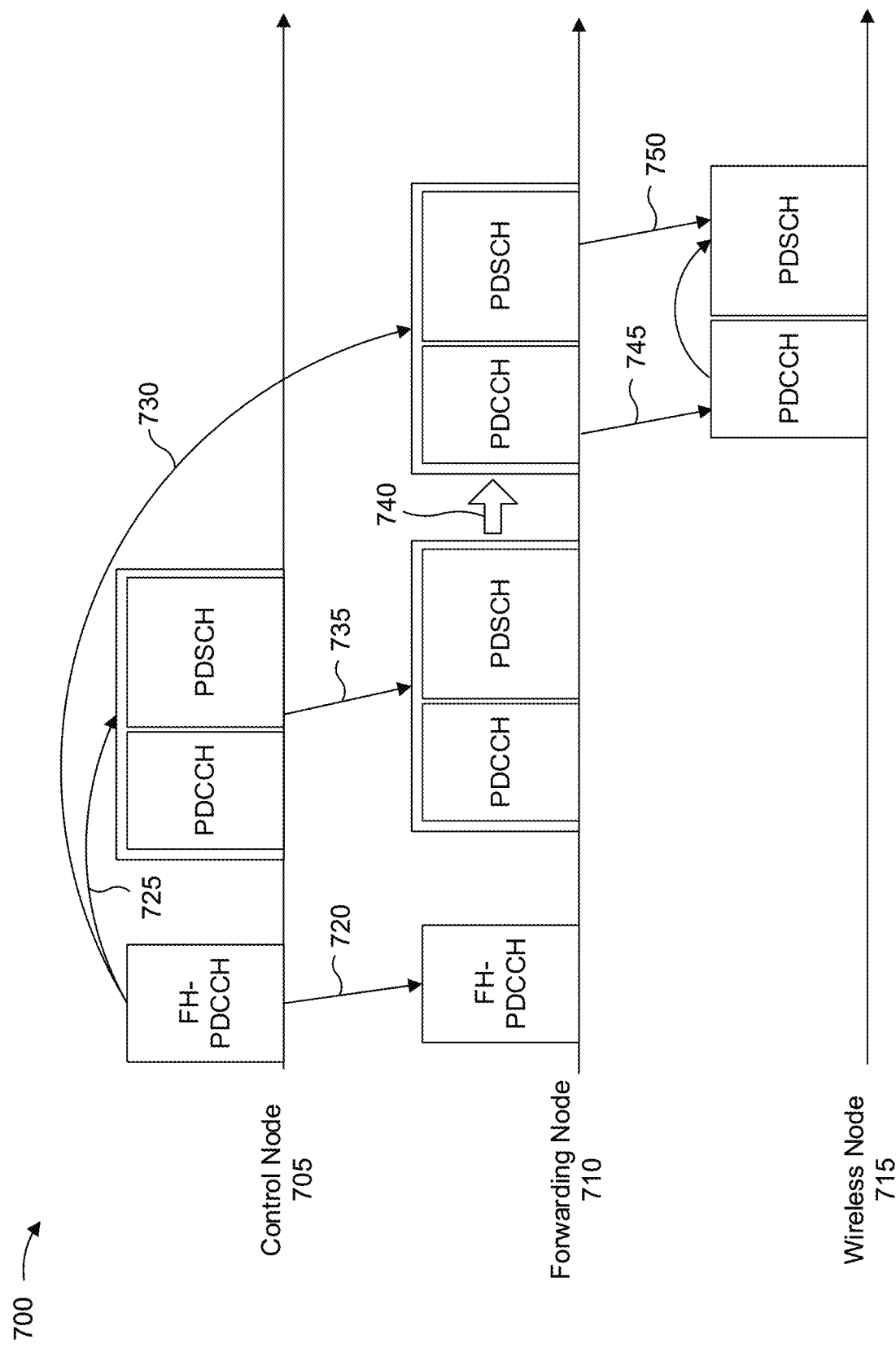
FIG. 7 is a diagram illustrating an example of forwarding a wireless signal using a forwarding node, in accordance with the present disclosure.

FIG. 7 is a diagram illustrating an example 700 of forwarding a wireless signal using a forwarding node 710, in accordance with the present disclosure. In some aspects, the forwarding node 710 may be a repeater node (or repeater unit) configured to receive an incoming signal and to transmit a regenerated version of the incoming signal (e.g., using techniques describe in further detail above with reference to FIG. 5). Additionally, or alternatively, the forwarding node 710 may be a relay node (or relay unit) configured to receive an incoming signal and to transmit an outgoing signal that includes information about and/or from the incoming signal (e.g., using techniques describe in further detail above with reference to FIGS. 6A-6B).

As shown in FIG. 7, the control node 705 may determine that the control node 705 is to send one or more downlink communications (e.g., an SSB, a PDSCH, a PDCCH scheduling transmission of the PDSCH, and/or the like) to the wireless node 715. However, the control node 705 may determine that the wireless node 715 is outside a communication range of the control node 705. Therefore, the control node 705 may utilize the forwarding node 710 to transmit the one or more downlink communications to the wireless node 715.

As shown by reference number 720, the control node 705 may transmit an FH-PDCCH communication to the forwarding node 710. The FH-PDCCH communication may be a control message (e.g., the control message 455 shown in FIG. 4). As shown by reference number 725, the FH-PDCCH communication may schedule a PDSCH communication (e.g., an access link PDSCH communication) and/or a PDCCH communication (e.g., an FH-PDCCH, an access link PDCCH, and/or the like) that is to be transmitted to the forwarding node 710. As shown by reference number 730, the FH-PDCCH communication may include a configuration (e.g., the configuration information 450 shown in FIG. 4) that configures the forwarding node 710 to forward the PDSCH communication and/or the PDCCH communication that is to be transmitted to wireless node 715. In some aspects, more than one FH-PDCCH communication may be used to configure the forwarding node 710.

As shown by reference number 735, the control node 705 may transmit, to the forwarding node 710, the PDSCH communication and/or the PDCCH communication scheduled by the PDCCH communication shown by reference number 720. As shown by reference number 740, the forwarding node 710 may generate a PDCCH communication and/or a PDSCH communication based at least in part on receiving the PDSCH communication from the control node. In some aspects, the forwarding node 710 may generate the PDCCH communication and/or the PDSCH communication based at least in part on a digital processing operation configured by the configuration shown by reference number 730. In some aspects, the generated PDCCH communication may schedule the generated PDSCH communication to be transmitted from the forwarding node 710 to the wireless node 715.

As shown by reference number 745, the forwarding node 710 may transmit the generated PDCCH communication that schedules the generated PDSCH communication to the wireless node 715. As shown by reference number 750, the forwarding node 710 may transmit the generated PDSCH communication to the wireless node 715. The forwarding node 710 may transmit the generated PDCCH communication and the generated PDSCH communication to the wireless node 715 using an access link.

In some aspects, the configuration also may configure, using the FH-PDCCH communication and/or one or more other FH-PDCCH communications, a repeating and/or relaying operation (e.g., a digital processing operation, time domain resources, frequency domain resources, and/or the like) for an ACK/NACK feedback message that may be transmitted by the wireless node 715 and addressed to the control node 705. In some aspects, the configuration may configure one or more repeating and/or relaying operations (e.g., a digital processing operation, time domain resources, frequency domain resources, and/or the like) associated with future uplink transmissions that may be transmitted from the wireless node 715 and addressed to the control node 705. In some aspects, the repeating and/or relaying operation configurations may include configuring semi-static uplink control resources that may be used by the wireless node 715 to transmit control messages, such as scheduling requests.

As indicated above, FIG. 7 is provided as an example. Other examples may differ from what is described with respect to FIG. 7.

Figure 8A:
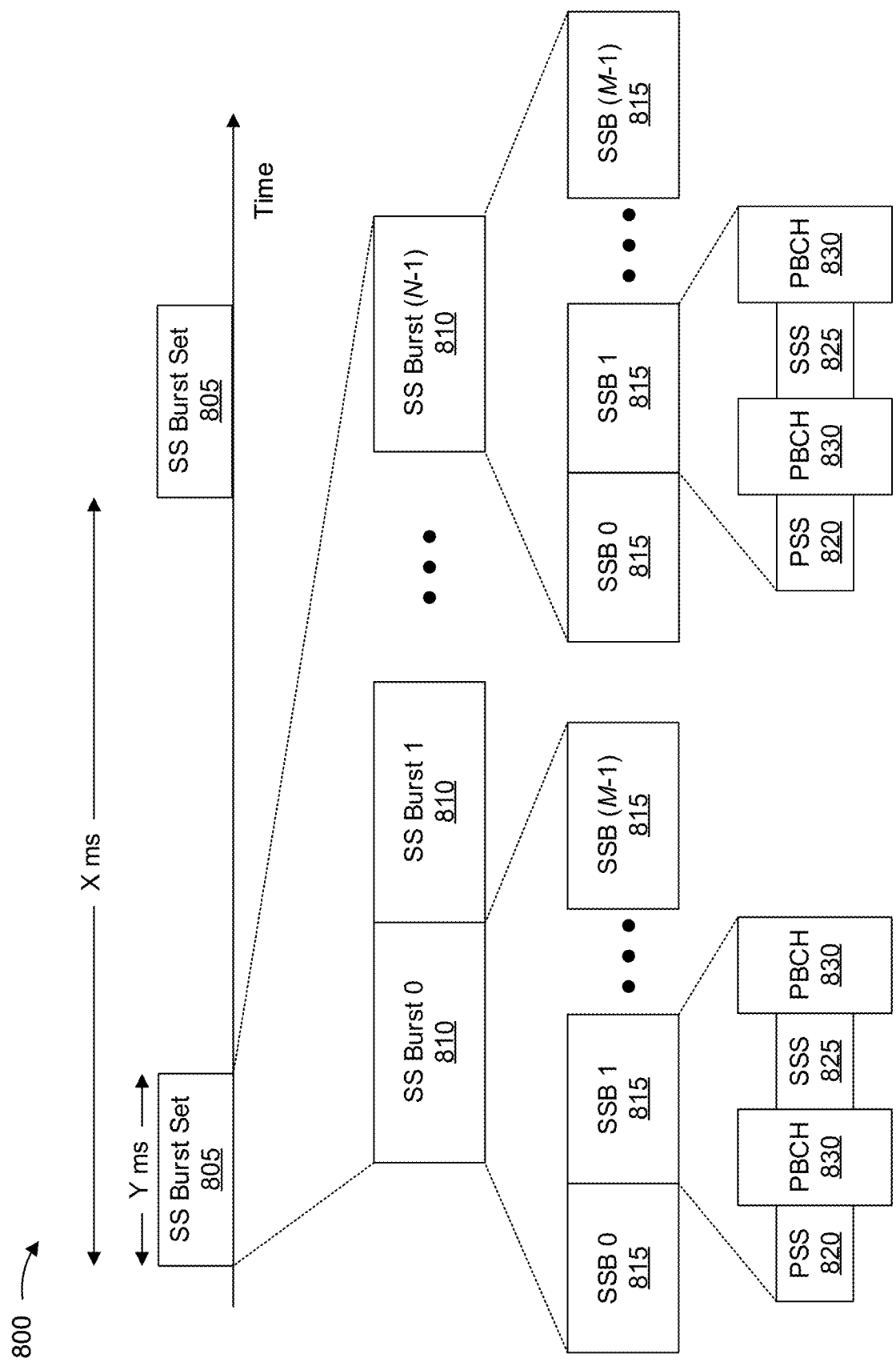
FIG. 8A is a diagram illustrating an example of a synchronization signal hierarchy, in accordance with the present disclosure.

FIG. 8A is a diagram illustrating an example 800 of a synchronization signal (SS) hierarchy, in accordance with the present disclosure. As shown in FIG. 8A, the SS hierarchy may include an SS burst set 805, which may include multiple SS bursts 810, shown as SS burst 0 through SS burst N-1, where N is a maximum number of repetitions of the SS burst 810 that may be transmitted by the base station. As further shown, each SS burst 810 may include one or more SSBs 815, shown as SSB 0 through SSB M-1, where M is a maximum number of SSBs 815 that can be carried by an SS burst 810. In some aspects, different SSBs 815 may be beam-formed differently (e.g., transmitted using different beams), and may be used for cell search, cell acquisition, beam management, beam selection, and/or the like (e.g., as part of an initial network access procedure). An SS burst set 805 may be periodically transmitted by a wireless node (e.g., base station 110), such as every X milliseconds, as shown in FIG. 8A. In some aspects, an SS burst set 805 may have a fixed or dynamic length, shown as Y milliseconds in FIG. 8. In some cases, an SS burst set 805 or an SS burst 810 may be referred to as a discovery reference signal (DRS) transmission window, an SSB measurement time configuration (SMTC) window, and/or the like.

In some aspects, an SSB 815 may include resources that carry a PSS 820, an SSS 825, a physical broadcast channel (PBCH) 830, and/or the like. In some aspects, multiple SSBs 815 are included in an SS burst 810 (e.g., with transmission on different beams), and the PSS 820, the SSS 825, and/or the PBCH 830 may be the same across each SSB 815 of the SS burst 810. In some aspects, a single SSB 815 may be included in an SS burst 810. In some aspects, the SSB 815 may be at least four symbols (e.g., OFDM symbols) in length, where each symbol carries one or more of the PSS 820 (e.g., occupying one symbol), the SSS 825 (e.g., occupying one symbol), and/or the PBCH 830 (e.g., occupying two symbols). In some aspects, an SSB 815 may be referred to as an SS/PBCH block.

In some aspects, the symbols of an SSB 815 are consecutive, as shown in FIG. 8A. In some aspects, the symbols of an SSB 815 are non-consecutive. Similarly, in some aspects, one or more SSBs 815 of the SS burst 810 may be transmitted in consecutive radio resources (e.g., consecutive symbols) during one or more slots. Additionally, or alternatively, one or more SSBs 815 of the SS burst 810 may be transmitted in non-consecutive radio resources.

In some aspects, the SS bursts 810 may have a burst period, and the SSBs 815 of the SS burst 810 may be transmitted by a wireless node (e.g., base station 110) according to the burst period. In this case, the SSBs 815 may be repeated during each SS burst 810. In some aspects, the SS burst set 805 may have a burst set periodicity, whereby the SS bursts 810 of the SS burst set 805 are transmitted by the wireless node according to the fixed burst set periodicity. In other words, the SS bursts 810 may be repeated during each SS burst set 805.

In some aspects, an SSB 815 may include an SSB index, which may correspond to a beam used to carry the SSB 815. A UE 120 may monitor for and/or measure SSBs 815 using different Rx beams during an initial network access procedure and/or a cell search procedure, among other examples. Based at least in part on the monitoring and/or measuring, the UE 120 may indicate one or more SSBs 815 with a best signal parameter (e.g., a reference signal received power (RSRP) parameter and/or the like) to a base station 110. The base station 110 and the UE 120 may use the one or more indicated SSBs 815 to select one or more beams to be used for communication between the base station 110 and the UE 120 (e.g., for a random access channel (RACH) procedure and/or the like). Additionally, or alternatively, the UE 120 may use the SSB 815 and/or the SSB index to determine a cell timing for a cell via which the SSB 815 is received (e.g., a serving cell).

As indicated above, FIG. 8A is provided as an example. Other examples may differ from what is described with regard to FIG. 8A.

Figure 8B:
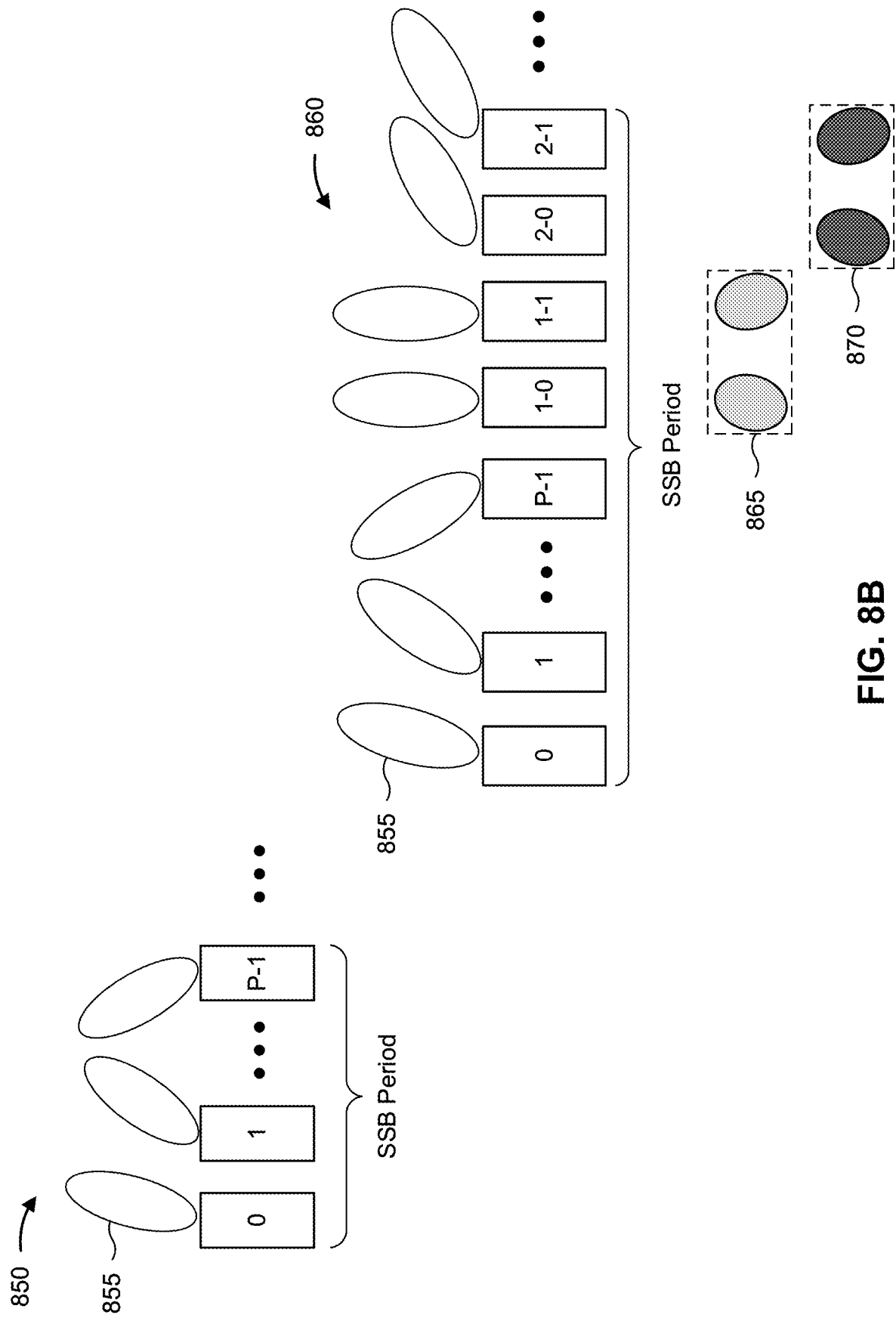
FIG. 8B is a diagram illustrating examples of beam sweeping for an access procedure, in accordance with the present disclosure.

FIG. 8B is a diagram illustrating examples 850 and 860 of beam sweeping for an access procedure, in accordance with the present disclosure. In the example 850, in an access procedure (e.g., an NR initial access procedure), a base station may perform a downlink beam sweep of SSBs (e.g., of an SS burst set, as described above) in an SSB period (e.g., an SS burst set period, as described above). For example, the base station may perform a downlink beam sweep of P SSBs, shown as SSB 0 through SSB P-1. Each SSB of the beam sweep may be transmitted using a respective beam 855 (e.g., in a respective beam direction). For example, a first SSB (SSB 0) may be transmitted using a first beam, a second SSB (SSB 1) may be transmitted using a second beam, and so forth.

As part of the access procedure, the base station may also transmit an RMSI communication. The RMSI communication may be transmitted in a PDSCH scheduled by a PDCCH. The base station may transmit the PDCCH for the RMSI communication in a downlink beam sweep of the beams 855 (and in resources used for transmission of the SSBs of the access procedure).

The RMSI may indicate information used by a UE in performing a RACH procedure. Accordingly, as part of the access procedure, the UE may transmit a RACH communication in one or more RACH occasions in an uplink beam sweep using one or more uplink beams corresponding to the beams 855. A RACH occasion may include the resources associated with an SSB transmission of the access procedure.

In the example 860, in some cases, one or more access procedure communications may be forwarded by one or more analog repeater devices. For example, as shown, SSBs of the access procedure may be forwarded by one or more repeater devices. In the example 860, a base station may perform a downlink beam sweep of SSB 0 through SSB P-1, as described above. In some cases, the base station may transmit one or more SSBs (e.g., in an extended downlink beam sweep) to a repeater device for forwarding to a UE. For example, as shown, the base station may transmit SSBs 1-0 and 1-1 (e.g., one or more SSBs) to a first repeater device using a beam sweep of beams directed at the first repeater device, and the base station may transmit SSBs 2-0 and 2-1 (e.g., one or more SSBs) to a second repeater device using a beam sweep of beams directed at the second repeater device. The first repeater device may receive the SSBs 1-0 and 1-1 and forward the SSBs 1-0 and 1-1 using a downlink beam sweep of beams 865 (e.g., which may use different beam directions than the beams in which the first repeater device received the SSBs from the base station). Similarly, the second repeater device may receive the SSBs 2-0 and 2-1 and forward the SSBs 2-0 and 2-1 using a downlink beam sweep of beams 870.

Furthermore, in some cases, similar forwarding techniques may be applied for RMSI transmissions. For example, the base station may transmit, in a first extended beam sweep, an RMSI PDCCH to schedule an RMSI PDSCH and may transmit, in a second extended beam sweep, the RMSI PDSCH scheduled by the RMSI PDCCH. Accordingly, the first repeater device may receive the RMSI PDCCH and the RMSI PDSCH, which may be forwarded using a downlink beam sweep of beams 865, and the second repeater device may receive the RMSI PDCCH and the RMSI PDSCH, which may be forwarded using a downlink beam sweep of beams 870.

In some cases, the use of analog repeaters for forwarding SSBs and/or RMSI transmissions may result in scalability issues. In particular, an analog repeater cannot store information associated with an SSB, an RMSI PDCCH that schedules an RMSI PDSCH, and/or an RMSI PDSCH that includes system information required for initial network access (e.g., random access parameters). Accordingly, an analog repeater must receive and forward RMSI PDCCH and RMSI PDSCH signals in real time (e.g., in a full duplex mode). For example, if a first repeater and a second repeater are to forward SSBs and/or RMSI transmissions, a base station must transmit multiple SSBs, RMSI PDCCHs, and/or RMSI PDSCHs in a direction of the first repeater, and multiple SSBs, RMSI PDCCHs, and/or RMSI PDSCHs in a direction of the second repeater. In other words, for each repeater that is to forward an SSB, an RMSI PDCCH, or an RMSI PDSCH, the base station must perform multiple transmissions of the SSB and/or RMSI transmission to be forwarded. Furthermore, even though the system information included in the RMSI PDSCH and at least some of the forwarding (e.g., reception and/or transmission) parameters for the RMSI PDCCH change relatively infrequently, the base station has to repeatedly transmit the RMSI PDSCH content and/or information configuring the forwarding parameters for the RMSI PDCCH because analog repeaters perform processing only in an analog domain (e.g., lack capabilities to store information associated with the RMSI PDCCH and/or RMSI PDSCH). This consumes significant network resources and/or consumes significant computing resources of the base station and the repeater(s), among other examples.

Some techniques and apparatuses described herein provide for efficient RMSI transmission in a wireless network. In some aspects, a forwarding node may receive, in advance from a control node, semi-static configuration information indicating one or more parameters for forwarding an RMSI PDCCH. Accordingly, when the forwarding node receives an RMSI PDCCH that schedules an RMSI PDSCH from a transmitter node, the forwarding node may forward the RMSI PDCCH to a receiver node based at least in part on the semi-static configuration information. Furthermore, in some aspects, the forwarding node may store content of the RMSI PDSCH such that the stored content can be received and multiple instances of the RMSI PDSCH can be transmitted without the transmitter node having to repeatedly send a copy of the content of the RMSI PDSCH to the forwarding node. In this way, RMSI transmission by the base station may be reduced, thereby conserving network resources and/or conserving computing resources at the base station, among other examples.

Some techniques and apparatuses described herein further provide for efficient SSB forwarding. In some aspects, a forwarding node may receive, in advance, information associated with SSBs that are to be forwarded by the forwarding node. The forwarding node may store the information for subsequent use. That is, the forwarding node may be capable of converting an analog signal into a digital domain for storage. The forwarding node may transmit the SSBs based at least in part on the stored information. For example, the forwarding node may generate the SSBs based at least in part on the information. In some aspects, the forwarding node may forward the SSBs in parallel with SSBs transmitted by a base station. For example, the forwarding node may forward the SSBs in the same SSB period in which the base station transmits SSBs. In this way, SSB transmission at the base station may be reduced, thereby conserving network resources and/or conserving computing resources at the base station, among other examples.

As indicated above, FIG. 8B is provided as an example. Other examples may differ from what is described with regard to FIG. 8B.

Figure 9:
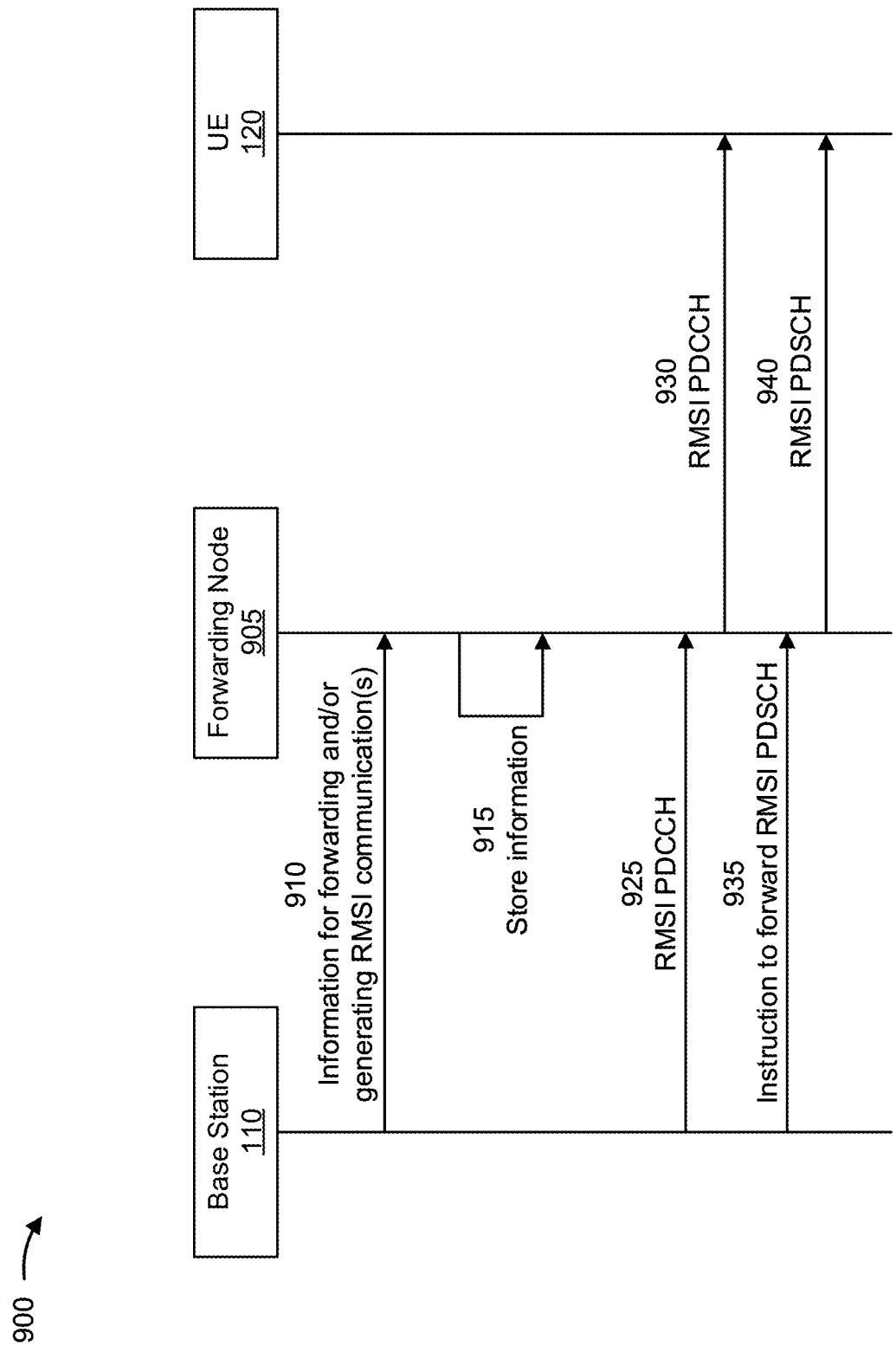
FIG. 9 is a diagram illustrating an example associated with remaining minimum system information (RMSI) transmission by a wireless remote unit, in accordance with the present disclosure.

FIG. 9 is a diagram illustrating an example 900 associated with RMSI transmission by a wireless remote unit, in accordance with the present disclosure. As shown in FIG. 9, example 900 includes communication between a base station 110, a forwarding node 905, and a UE 120. In some aspects, the base station 110, the forwarding node 905, and the UE 120 may be included in a wireless network, such as wireless network 100. In some aspects, the forwarding node 905 (which may be referred to as a repeater unit, a relay unit, and/or a remote unit (RU)) may be a wireless node, a base station, a UE, and/or an IAB node, among other examples. In some aspects, the forwarding node 905 is a repeater node (such as a Layer-1 (L1) repeater node), or a relay node (such as an L1 relay node). For example, the forwarding node 905 may be a digital repeater node or a digital relay node. As described above, a digital RU (e.g., a digital repeater or relay node) may have capabilities to convert an analog signal into a digital domain (e.g., to enable buffering or storage at the digital RU).

In some aspects, the base station 110 may be a wireless node, an IAB donor node, and/or an IAB node, among other examples. In some aspects, the UE 120 may be a wireless node and/or an IAB node, among other examples. In some aspects, the base station 110 may be a parent forwarding node of the forwarding node 905 and/or the UE 120 may be a child forwarding node of the forwarding node 905.

In some aspects, the forwarding node 905 may be configured with one or more of a reception configuration, a buffering configuration, or a forwarding configuration, as described above, for use in receiving information associated with RMSI transmissions and forwarding RMSI transmissions. In some aspects, the forwarding node 905 may be configured with a multiplexing configuration for multiplexing received or generated RMSI transmissions. In some aspects, a configuration for the forwarding node 905 may indicate time and frequency resources, and a beamforming configuration, for reception. In some aspects, a configuration for the forwarding node 905 may indicate time and frequency resources, and a beamforming configuration, for transmission. In some aspects, a configuration for the forwarding node 905 may indicate information and/or parameters for the generation or regeneration of communications (e.g., RMSI transmissions). For example, in some aspects, information and/or parameters for the generation or regeneration of a signal may indicate a level of digital processing operations to be performed on an incoming signal to generate an outgoing signal or to regenerate the incoming signal as an outgoing signal to be forwarded (e.g., whether the forwarding node 905 is to implement Split Option 8, Split Option 7-1, Split Option 7-2, Split Option 7-3, and/or Split Option 6 in FIG. 5, FIG. 6A, and/or FIG. 6B). In some aspects, the base station 110, or another control node, may configure the forwarding node 905 with one or more of the aforementioned configurations.

As shown in FIG. 9, and by reference number 910, the base station 110 may transmit, and the forwarding node 905 may receive, information for use in forwarding and/or generating RMSI communications. For example, in a wireless network, a PBCH master information block (MIB) may carry a first part of system information that the UE 120 needs in order to access the wireless network, and RMSI can carry all remaining system information that the UE 120 needs in order to gain access to the wireless network (e.g., in one or more system information blocks (SIBs)). In general, the RMSI may be transmitted in an RMSI PDSCH, which is scheduled by an RMSI PDCCH, and the RMSI PDCCH and the RMSI PDSCH may be periodically transmitted in one or more downlink beam sweeps to enable initial access. Accordingly, as described herein, the information for use in forwarding and/or generating RMSI communications may indicate one or more parameters for receiving the RMSI PDCCH and the RMSI PDSCH at the forwarding node 905, one or more parameters that the forwarding node 905 is to use to generate an outgoing signal or regenerate an incoming signal based on the received RMSI PDCCH and the received RMSI PDSCH, and/or one or more parameters for transmitting the RMSI PDCCH and the RMSI PDSCH by the forwarding node 905.

In some aspects, at least a portion of the parameters that the forwarding node 905 is to use to forward (e.g., receive and transmit) the RMSI PDCCH may be configured semi-statically. For example, the time and frequency resources on which the RMSI PDCCH is to be transmitted and the beams to be used to transmit the RMSI PDCCH may be known in advance and may be indicated in an MIB transmitted by the base station 110. Accordingly, rather than the base station 110 or another control node dynamically indicating certain parameters for forwarding the RMSI PDCCH that are known in advance using a FH-PDCCH, such parameters for forwarding the RMSI PDCCH may be indicated in semi-static configuration information (e.g., via RRC signaling and/or the like). For example, in some aspects, the semi-static configuration information may indicate one or more resources and a beamforming configuration to be used for a transmission of the RMSI PDCCH by the base station 110 (e.g., a transmission of the RMSI PDCCH to be received by the forwarding node 905) and/or one or more resources and a beamforming configuration to be used for a transmission of the RMSI PDCCH by the forwarding node 905.

Furthermore, in some aspects, the information for use in forwarding and/or generating RMSI communications may include content of an RMSI PDSCH. For example, in some aspects, the base station 110 may semi-statically provide, to the forwarding node 905, a transport block, a codeword, or one or more frequency domain symbols for the RMSI PDSCH. In some aspects, the content of the RMSI PDSCH that is semi-statically provided to the forwarding node 905 may depend on a level of processing that the forwarding node 905 is configured to perform when forwarding the RMSI PDSCH. For example, the base station 110 may semi-statically provide the transport block of the RMSI PDSCH when the forwarding node is to implement Split Option 6 (e.g., fully decoding an incoming signal and/or fully encoding an outgoing signal), may provide the codeword of the RMSI PDSCH when the forwarding node is to implement Split Option 7-3 (e.g., performing modulation, layer mapping, and precoding for an outgoing signal after performing channel estimation, equalization, and demodulation for an incoming signal), or may provide the frequency domain symbols of the RMSI PDSCH when the forwarding node is to implement Split Option 7-2 (e.g., performing RE mapping and digital beamforming for an outgoing signal after performing RE demapping and digital beamforming for an incoming signal). In this way, base station 110 may avoid repetitively transmitting a copy of the RMSI PDSCH, which generally changes infrequently, and the forwarding node 905 may avoid having to perform one or more digital processing operations on incoming RMSI PDSCH signals (e.g., Rx chain operations). In some aspects, the content of the RMSI PDSCH may be transmitted in a broadcast or multicast signal to semi-statically provide the RMSI PDSCH content to multiple forwarding nodes at the same time.

As further shown in FIG. 9, and by reference number 915, the forwarding node 905 may store the information for use in forwarding and/or generating RMSI communications. For example, in some aspects, the forwarding node 905 may store the semi-static configuration information that indicates the parameters (e.g., transmission resources and beam configuration) for the forwarding node 905 to use to receive RMSI PDCCH transmissions from the base station 110 and to forward the RMSI PDCCH to the UE 120 (e.g., by regenerating the RMSI PDCCH as an outgoing signal or generating a new outgoing signal that includes information about or from the RMSI PDCCH).

Furthermore, in some aspects, the forwarding node 905 may store the content of the RMSI PDSCH that is semi-statically provided by the base station 110. In this way, the base station 110 may transmit, and the forwarding node 905 may receive, a single copy of the RMSI PDSCH, and the forwarding node 905 may buffer or otherwise store the content of the RMSI PDSCH to be transmitted in multiple instances (e.g., repetitions) of the RMSI PDSCH.

Alternatively, in cases where the forwarding node 905 is configured to implement Split Option 6 in FIG. 5 and/or FIG. 6A (e.g., fully encoding the transport block of the RMSI PDSCH), the content of the RMSI PDSCH that is stored by the forwarding node 905 may be obtained or otherwise acquired by an MT unit that performs UE functions of the forwarding node 905 (e.g., with a DU performing base station functions of the forwarding node 905). For example, the MT unit may acquire the content of the RMSI PDSCH in order to establish a connection to the base station 110. In this case, the base station 110 may not need to semi-statically provide the transport block, codeword, or frequency domain symbols of the RMSI PDSCH to the forwarding node 905. However, because the RMSI can change from time to time, the base station 110 may implement one or more techniques to ensure that the RMSI stored by the forwarding node 905 is the most current RMSI (e.g., because the RMSI transmitted by the forwarding node 905 is supposed to be the same RMSI as transmitted by the base station 110). In some cases, the base station 110 may indicate the updated RMSI in a paging message, but this approach may lead to a temporary mismatch between the RMSI transmitted by the base station 110 and the forwarding node 905 (e.g., due to a latency of the paging message). Accordingly, in some aspects, any updates to the RMSI may be transmitted to the MT unit of the forwarding node 905 in advance (e.g., in a special paging message to the MT unit of the forwarding node 905, in a unicast signal, or in a broadcast/multicast signal). Additionally, or alternatively, in some aspects, the updates to the RMSI may be indicated in a fronthaul PDSCH (FH-PDSCH) and may include only one or more IEs that are to be updated.

As further shown in FIG. 9, and by reference number 925, the base station 110 may transmit, and the forwarding node 905 may receive, an RMSI PDCCH that schedules transmission of an RMSI PDSCH. For example, the forwarding node 905 may receive the RMSI PDCCH based at least in part on the semi-static configuration information that indicates the resources and beamforming configuration to be used for the transmission of the RMSI PDCCH by the base station 110. Furthermore, as shown by reference number 930, the forwarding node 905 may forward the RMSI PDCCH to the UE 120. For example, the forwarding node 905 may transmit the RMSI PDCCH to the UE 120 based at least in part on the semi-static configuration information that indicates the resources and beamforming configuration to be used for the transmission of the RMSI PDCCH by the forwarding node 905. In this way, one or more parameters for the reception and transmission of the RMSI PDCCH may be semi-statically configured (e.g., to reduce fronthaul signaling overhead by avoiding a need to dynamically configure the RMSI PDCCH forwarding parameters in an FH-PDCCH). Furthermore, content of the RMSI PDCCH may be dynamic, because the RMSI PDCCH may be scheduling different resources or other parameters for the RMSI PDSCH at different times. Accordingly, in some aspects, the forwarding node 905 may perform one or more digital processing operations on the RMSI PDCCH in order to generate or regenerate the RMSI PDCCH to be transmitted using the semi-static configuration information (e.g., one or more digital repeating operations, as shown in FIG. 5, or one or more downlink digital relay operations, as shown in FIG. 6A).

As further shown in FIG. 9, and by reference number 935, the base station 110 may transmit, and the forwarding node 905 may receive, an instruction to forward the RMSI PDSCH to the UE 120. In some aspects, the RMSI PDSCH may include an accompanying DMRS, and the instruction may indicate that the forwarding node 905 is to generate a new DMRS and to forward the RMSI PDSCH with the new DMRS. For example, the DMRS may include a DMRS sequence (sometimes referred to as a DMRS scrambling sequence) that is based at least in part on one or more time resources associated with a time interval in which the DMRS is transmitted. For example, the DMRS sequence may be a function of a symbol and slot index associated with the time interval in which the DMRS is transmitted. Accordingly, when the forwarding node 905 is configured to transmit the RMSI PDSCH multiple times (e.g., in multiple transmission occasions), the forwarding node 905 may be configured to include, in each instance of the RMSI PDSCH, a DMRS scrambling sequence that is based at least in part on one or more time resources (e.g., a slot and symbol index) associated with a transmission occasion in which the respective instance of the RMSI PDSCH is to be transmitted. In other words, content of the RMSI PDSCH may be handled separately from the DMRS, and the forwarding node 905 may be configured to implement one or more digital processing operations to generate the DMRS to be included with the RMSI PDSCH transmission(s). In some aspects, the forwarding node 905 may generate the DMRS to be included with the RMSI PDSCH transmission(s) based on timing information associated with the RMSI PDSCH (e.g., a slot and symbol index associated with a time interval in which the RMSI PDSCH is to be transmitted). Alternatively, in some aspects, the base station 110 may dynamically transmit the DMRS to accompany the RMSI PDSCH to the forwarding node 905, which may perform one or more digital processing operations to generate the new DMRS.

For example, in cases where the forwarding node 905 is a repeater node configured to fully decode an incoming signal (e.g., by implementing Split Option 6 in FIG. 5) or a relay node that always fully decodes an incoming signal (e.g., by implementing any of the various Split Options in FIG. 6A), the forwarding node 905 may obtain a transport block that includes the RMSI associated with the access procedure (e.g., by retrieving the transport block from storage or by decoding a single instance of the RMSI PDSCH), and the forwarding node 905 may insert a new DMRS into a generated channel after encoding the transport block. For example, as described above in connection with FIG. 5 and FIG. 6A, the forwarding node 905 may (e.g., using Rx chain 504 or Rx chain 604) convert an incoming signal from an analog domain to a digital domain to obtain time domain IQ samples, remove a cyclic prefix and perform an FFT on the time domain IQ samples to obtain frequency domain IQ samples, perform digital beamforming and RE demapping to extract tones from the frequency domain IQ samples, perform channel estimation and demodulation (e.g., using a first DMRS sequence included in the incoming signal) to obtain a codeword, and then descramble and decode the codeword to obtain the transport block from the incoming signal. Alternatively, in cases where the transport block is semi-statically provided or acquired by the MT unit of the forwarding node 905, the forwarding node 905 may avoid the Rx digital processing operations and obtain the transport block that includes the RMSI associated with the access procedure from storage. Accordingly, when configured as a relay node or a repeater node that implements Split Option 6, the forwarding node 905 may (e.g., using Tx chain 502 or Tx chain 602) generate a clean outgoing RMSI PDSCH signal by encoding the transport block, scrambling the encoded transport block using a DMRS sequence associated with the time resources to be used to transmit the RMSI PDSCH signal to regenerate the codeword, modulating, performing layer mapping on, and precoding the codeword, performing an RE mapping and digital beamforming to generate frequency domain IQ samples, performing an FFT and adding a CP to generate time domain IQ samples, and converting the time domain IQ samples from a digital domain to an analog domain to generate an analog RMSI PDSCH signal to be forwarded to the UE 120.

In some aspects, however, the forwarding node 905 may be a repeater node that is configured to perform less digital processing to (re-)generate the outgoing signal. For example, the forwarding node 905 may be configured (e.g., by the control node) as a repeater node to implement Split Option 8, Split Option 7-1, Split Option 7-2, Split Option 7-3, and/or the like. In such cases, where the forwarding node 905 does not fully decode an incoming signal and/or fully encode an outgoing signal, the repeater node may be unable to generate multiple instances of the RMSI PDSCH, because the incoming RMSI PDSCH signal (e.g., prior to channel estimation, equalization, demodulation, and/or descrambling using the first DMRS) is impaired by variations in a wireless channel (e.g., a fronthaul) between the base station 110 and the forwarding node 905. Accordingly, if the forwarding node 905 were to remove a first DMRS from the incoming signal that is based on a time interval in which the incoming signal is transmitted, and replace the first DMRS with a second DMRS based on the time resources to be used to forward the RMSI PDSCH to the UE 120, an effective channel on the second DMRS would differ from an effective channel on the RMSI PDSCH. For example, the effective channel on the second DMRS would depend on impairments in a wireless channel between the forwarding node 905 and the UE 120, whereas the effective channel on the RMSI PDSCH would depend on impairments in a wireless channel between the forwarding node 905 and the base station 110. In this case, due to the mismatch between the effective channels, the UE 120 would be unable to use the second DMRS to perform channel estimation and demodulation of the RMSI PDSCH.

Accordingly, in cases where the forwarding node 905 is configured as a repeater node that does not fully decode an incoming signal, the forwarding node 905 may implement a level of digital processing (e.g., Split Option 7-2 and/or Split Option 7-3) to extract, from an incoming RMSI PDSCH signal to be forwarded, one or more tones occupied by a first DMRS associated with a time interval in which the incoming RMSI PDSCH is transmitted. The forwarding node 905 may then further process the one or more tones occupied by the first DMRS to replace the first DMRS with a second DMRS associated with a DMRS sequence that is a function of time resources to be used to transmit the RMSI PDSCH to the UE 120. For example, in some aspects, the forwarding node 905 may extract the tone(s) occupied by the first DMRS (e.g., by performing digital beamforming and RE demapping on frequency domain IQ samples that are obtained from the incoming signal) such that $y=h*x1+w$, where $x1$ is a tone occupied by the first DMRS, $h$ is a wireless channel between the base station 110 and the forwarding node 905, $w$ is additive noise in the incoming signal, and $y$ is the incoming signal that the forwarding node 905 observes on the tone occupied by the first DMRS. In some aspects, the forwarding node 905 may then descramble the tone(s) occupied by the first DMRS by multiplying the occupied tone(s) by a conjugate of the first DMRS and normalizing the product. In this way, the forwarding node 905 may descramble the tone(s) occupied by the first DMRS using the conjugate of the first DMRS such that $y'=conj(x1)/abs(x1)^2*y=h+w'$, where $w'\approx w$. In other words, by multiplying the occupied tone(s) by the conjugate of the first DMRS and normalizing the product based on the absolute value of $x1$ squared, the forwarding node 905 may essentially remove the tone(s) occupied by the first DMRS from the incoming signal observed by the forwarding node 905, leaving only the channel, h, and the additive noise, w'. In some aspects, the forwarding node 905 may then scramble the tone(s) that were descrambled in the original incoming signal with the second DMRS by multiplying the descrambled tone(s) with the second DMRS sequence that is based on the time resources associated with the time interval in which the RMSI PDSCH signal is to be forwarded to the UE 120, such that $y''=y'*x2=h*x2+w''$, where x2 is the second DMRS sequence. In this way, the UE 120 may use the second DMRS sequence, x2, as a pilot to estimate the wireless channel, h.

Accordingly, as further shown in FIG. 9, and by reference number 940, the forwarding node 905 may transmit, and the UE 120 node may receive, the RMSI PDSCH that is scheduled by the RMSI PDCCH and includes the RMSI to enable initial access. Furthermore, as described above, the RMSI PDSCH may be transmitted multiple times in multiple transmission occasions, and each instance of the RMSI PDSCH may include a DMRS sequence associated with one or more time resources (e.g., a slot and symbol index) used to transmit the RMSI PDSCH. In this way, the UE 120 may use the DMRS sequence included in the RMSI PDSCH to perform channel estimation and/or demodulation on the RMSI PDSCH signal received at the UE 120. Furthermore, in some aspects, the UE 120 may also receive a copy of the RMSI PDSCH transmitted by the base station 110, which includes a DMRS sequence associated with the time interval in which the RMSI PDSCH is transmitted by the base station 110. In this case, the UE 120 may process both RMSI PDSCH signals based at least in part on the respective DMRS sequences included in the RMSI PDSCH signals to achieve a signal processing gain.

As indicated above, FIG. 9 is provided as an example. Other examples may differ from what is described with respect to FIG. 8.

Figure 10:
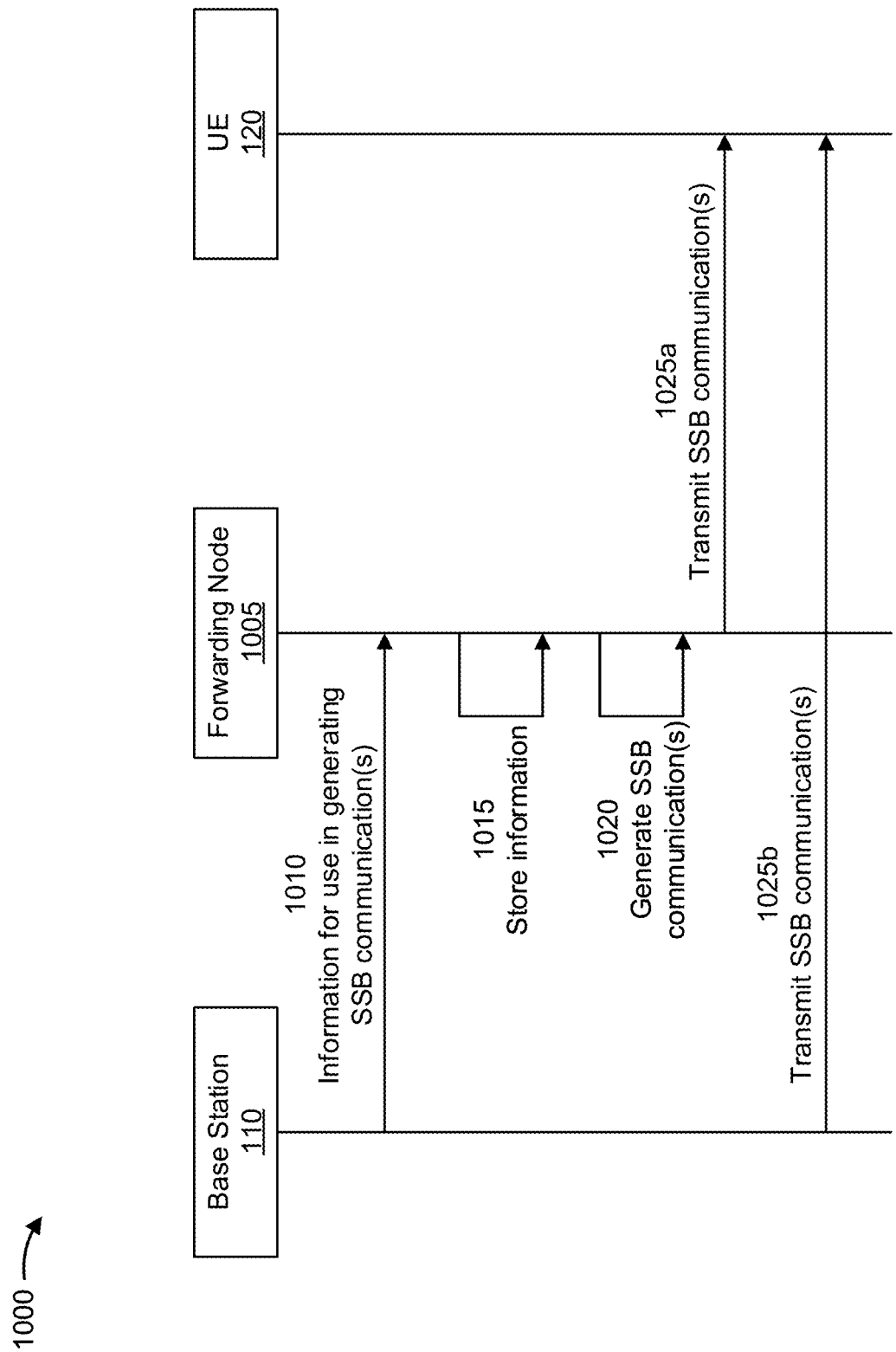
FIG. 10 is a diagram illustrating an example associated with synchronization signal bock (SSB) forwarding, in accordance with the present disclosure.

FIG. 10 is a diagram illustrating an example 1000 associated with SSB forwarding, in accordance with the present disclosure. As shown in FIG. 10, example 1000 includes communication between a base station 110, a forwarding node 1005, and a UE 120. In some aspects, the base station 110, the forwarding node 1005, and the UE 120 may be included in a wireless network, such as wireless network 100. In some aspects, the forwarding node 1005 (which may be referred to as an RU) may be a wireless node, a base station, a UE, and/or an IAB node, among other examples. In some aspects, the forwarding node 1005 is a relay node (e.g., an L1 relay node). For example, the forwarding node 1005 may be a digital relay node. As described above, a digital relay node may be capable of converting an analog signal into a digital domain (e.g., for storage at the digital relay node).

In some aspects, the base station 110 may be a wireless node, an IAB donor node, and/or an IAB node, among other examples. In some aspects, the base station 110 is a control node. In some aspects, the UE 120 may be a wireless node and/or an IAB node, among other examples. In some aspects, the base station 110 may be a parent forwarding node of the forwarding node 1005 and/or the UE 120 may be a child forwarding node of the forwarding node 1005.

In some aspects, the forwarding node 1005 may be configured with one or more of a reception configuration, a buffering configuration, or a forwarding configuration, as described above, for use in receiving information associated with SSB communications and forwarding SSB communications. In some aspects, the forwarding node 1005 may be configured with a multiplexing configuration for multiplexing received or generated SSB communications. In some aspects, a configuration for the forwarding node 1005 may indicate time and frequency resources, and a beamforming configuration, for reception. In some aspects, a configuration for the forwarding node 1005 may indicate time and frequency resources, and a beamforming configuration, for transmission. In some aspects, a configuration for the forwarding node 1005 may indicate information and/or parameters for the generation of communications (e.g., SSB communications). In some aspects, the base station 110, or another control node, may configure the forwarding node 1005 with one or more of the aforementioned configurations.

As shown by reference number 1010, the base station 110 may transmit, and the forwarding node 1005 may receive, information for use by the forwarding node 1005 in generating one or more SSB communications (e.g., an SSB or a part thereof, such as a PSS, an SSS, a PBCH, and/or a DMRS). The base station 110 may transmit the information in an FH-PD SCH. The one or more SSB communications may be for transmission in an SSB period in which the base station 110 is also transmitting SSBs.

In some aspects, the forwarding node 1005 may receive the information in a time interval that is prior to the SSB period in which the forwarding node 1005 is to transmit the one or more SSB communications. For example, the forwarding node 1005 may receive the information in a first time interval (e.g., a mini-slot, a slot, a subframe, or a frame, among other examples), and the one or more SSB communications may be for transmission by the forwarding node 1005 in a second (e.g., subsequent) time interval. As another example, the forwarding node 1005 may receive the information in a previous SSB period that is prior to the SSB period in which the forwarding node 1005 is to transmit the one or more SSB communications.

In some aspects, the information may include information indicating resources in which the forwarding node 1005 is to transmit SSBs. In some aspects, the information may include a content for the one or more SSB communications. Additionally, the information may be associated with a particular amount of digital processing that is to be performed by the forwarding node 1005 (e.g., according to a configuration of the forwarding node 1005). In some aspects, the information may include time domain IQ samples (e.g., if the forwarding node 1005 is to perform Split Option 8 forwarding) or frequency domain IQ samples (e.g., if the forwarding node 1005 is to perform Split Option 7-1 forwarding).

In some aspects, the information may indicate a sequence for a sequence-based signal for the one or more SSB communications (e.g., if the forwarding node 1005 is to perform Split Option 7-2, 7-3, or 6 forwarding). The sequence-based signal may be a PSS, an SSS, or a DMRS. Accordingly, the information may indicate a maximum length sequence (M-sequence), a pseudorandom noise sequence (PN-sequence), a scrambling identifier, and/or a sequence identifier.

In some aspects, the information may include IQ symbols of occupied tones (e.g., symbols per antenna) for a PBCH for the one or more SSB communications (e.g., if the forwarding node 1005 is to perform Split Option 7-2 forwarding). In some aspects, the information may include a codeword for a PBCH for the one or more SSB communications (e.g., if the forwarding node 1005 is to perform Split Option 7-3 forwarding). In some aspects, the information may include an MIB content for a PBCH for the one or more SSB communications (e.g., if the forwarding node 1005 is to perform Split Option 6 forwarding). In this case, the information may also identify one or more scrambling sequences.

As shown by reference number 1015, the forwarding node 1005 may store the information. For example, the forwarding node 1005 may decode (e.g., using Rx chain 604) the information carried in a downlink signal, and store the information prior to processing the information using a Tx chain, as described above.

As shown by reference number 1020, the forwarding node 1005 may generate the one or more SSB communications. In particular, the forwarding node 1005 may generate the one or more SSB communications based at least in part on the information stored by the forwarding node 1005. For example, the forwarding node 1005 may process the information using a Tx chain (e.g., Tx chain 602), as described above. A level of digital processing used by the forwarding node 1005 to generate the one or more SSB communications may depend on the content for the one or more SSB communications (e.g., time domain IQ samples, frequency domain IQ samples, among other examples, as described above) that was included in the information.

In some aspects, the forwarding node 1005 may generate a PSS and/or an SSS for the one or more SSB communications, and may separately generate a PBCH (e.g., a PBCH communication) and/or a DMRS for the one or more SSB communications. For example, the forwarding node 1005 may generate the PSS and/or the SSS based at least in part on first information, and may generate the PBCH and/or the DMRS based at least in part on second information. The first information and the second information may be received together or separately at the forwarding node 1005. Separate generation (e.g., using separate information) of the PSS/SSS and the PBCH/DMRS may be useful because the PSS/SSS has a fixed waveform that does not change according to an SSB index or an SSB period in which the PSS/SSS is transmitted, while the PBCH/DMRS changes according to an SSB index or an SSB period in which the PBCH/DMRS is transmitted.

In some aspects, the first information for generating the PSS and/or the SSS may include a content (e.g., time domain IQ samples) for the PSS and/or the SSS, as described above. For example, the forwarding node 1005 may receive the first information in an FH-PDSCH. In some aspects, the second information for generating the PBCH and/or the DMRS may include a content (e.g., time domain IQ samples) for the PBCH and/or the DMRS, as described above. For example, the forwarding node 1005 may receive the second information in an FH-PDSCH. In such examples, the base station 110 may transmit, and the forwarding node 1005 may receive, the first information less frequently than the second information (e.g., because the PSS/SSS has a fixed waveform).

For example, the forwarding node 1005 may receive (e.g., in an FH-PDSCH) the first information from the base station 110 a single time or relatively infrequently. In contrast, the forwarding node 1005 may receive the second information from the base station 110 relatively frequently. For example, the forwarding node 1005 may receive (e.g., in an FH-PDSCH) the second information once for each SSB period, and the second information may include a content for all the PBCHs (e.g., up to 64) and/or the DMRSs (e.g., up to eight DMRS sequences per physical cell identifier (PCI)) that are to be transmitted by the forwarding node 1005 in an SSB period. In this case, the forwarding node 1005 may receive the second information from the base station 110 in a previous SSB period, or another previous time interval, prior to the SSB period in which the forwarding node is to transmit the PBCHs and/or the DMRSs.

In some aspects, the forwarding node 1005 may store the first information and the second information. In some aspects, the forwarding node 1005 may generate the PSS and/or the SSS based at least in part on the first information. In some aspects, the forwarding node 1005 may generate the PBCH and/or the DMRS based at least in part on the second information.

In some aspects, the forwarding node 1005 may obtain the PSS and/or the SSS that are to be forwarded from an MT of the forwarding node 1005. For example, the forwarding node 1005 may receive SSBs from the base station 110 at the MT of the forwarding node 1005 (e.g., to establish and maintain an access link between the MT of the forwarding node and the base station 110). In some aspects, the forwarding node 1005 may store the SSBs (e.g., information extracted from the SSBs) received at the MT. In some aspects, the forwarding node 1005 may generate the PSS and/or the SSS based at least in part on the SSBs received at the MT.

In some aspects, the forwarding node 1005 may obtain a PCI associated with the base station 110 (e.g., a PCI carried in a PSS or an SSS transmitted by the base station 110). In some aspects, the forwarding node 1005 may store the PCI. In some aspects, the forwarding node 1005 may generate the PSS and/or the SSS based at least in part on the PCI. For example, the forwarding node 1005 may determine a scrambling sequence for the PSS and/or the SSS based at least in part on the PCI.

In some aspects, the forwarding node 1005 may obtain a content, as described above, of an MIB for the PBCH that is to be forwarded. For example, the information (e.g., the second information) received from the base station 110 may include the content of the MIB. Additionally, or alternatively, the forwarding node 1005 may obtain the MIB that is to be forwarded from the MT of the forwarding node 1005. For example, the forwarding node 1005 may receive the PBCH from the base station 110 at the MT of the forwarding node 1005, and decode the PBCH to obtain the content of the MIB. In such examples, the information (e.g., the second information), or another indication or configuration provided to the forwarding node 1005, may indicate a transmission time (e.g., an SSB index and/or an SSB period, among other examples) for the PBCH that is to be forwarded. In some aspects, the forwarding node 1005 may store the content of the MIB and/or the transmission time. In some aspects, the forwarding node 1005 may generate the PBCH and/or the DMRS based at least in part on the content of the MIB and the transmission time. For example, the forwarding node 1005 may determine a scrambling sequence for the PBCH and/or the DMRS based at least in part on the transmission time.

As shown by reference number 1025a, the forwarding node 1005 may transmit (e.g., forward), and the UE 120 may receive, the one or more SSB communications generated by the forwarding node 1005 (e.g., using the information received from the base station 110). The forwarding node 1005 may transmit the one or more SSB communications in a downlink beam sweep, as described above. As shown by reference number 1025b, the base station 110 may transmit, and the UE 120 (and/or the MT of the forwarding node 1005) may receive, one or more SSB communications. The base station 110 may transmit the one or more SSB communications in a downlink beam sweep, as described above. The forwarding node 1005 and the base station 110 may transmit the SSB communications in parallel. That is, the forwarding node 1005 and the base station 110 may transmit the SSB communications in the same SSB period.

The forwarding node 1005 may transmit the one or more SSB communications (referred to hereafter as FN SSBs), and the base station 110 may transmit the one or more SSB communications (referred to hereafter as BS SSBs), according to a joint beam sweeping pattern. In some aspects, the forwarding node 1005 may transmit the FN SSBs in resources in which the MT of the forwarding node 1005 is not scanning for, and receiving, BS SSBs from the base station 110. Thus, the base station 110 may transmit the BS SSBs in resources that are different from the resources used by the forwarding node 1005 for transmitting the FN SSBs (e.g., the base station 110 may transmit the BS SSBs in resources in which the MT of the forwarding node is scanning for, and receiving, BS SSBs). This may be useful when the forwarding node 1005 is not operating in a full-duplex mode and/or when self-interference is relatively high at the forwarding node 1005.

In some aspects, the FN SSBs transmitted by the forwarding node 1005 may be time-division multiplexed with the BS SSBs transmitted by the base station 110 (e.g., the BS SSBs and the FN SSBs may be on orthogonal resources). In this way, the base station 110 (or another control node) may be enabled to differentiate SSBs received at the UE 120, and determine whether the UE 120 is communicating by a direct connection with the base station 110 or an indirect connection (e.g., via the forwarding node 1005) with the base station 110. For example, the base station 110 (or another control node) may determine whether a RACH occasion used by the UE 120 is associated with an SSB that was transmitted from the forwarding node 1005 or the base station 110. In some aspects, the FN SSBs transmitted by the forwarding node 1005 may overlap in time (e.g., using frequency-division multiplexing and/or spatial-division multiplexing) with the BS SSBs transmitted by the base station 110. In this way, network resources may be conserved.

In some aspects, the base station 110 may monitor the FN SSB transmissions and the BS SSB transmissions to identify spatial coverages of the beams used by the base station 110 and the forwarding node 1005, respectively. Based at least in part on identifying the spatial coverages, the base station 110 may determine to multiplex (e.g., on the same SSB location) SSB transmissions of the base station 110 and the forwarding node 1005 that use beams with non-overlapping coverages. Additionally, or alternatively, the base station 110 may determine to multiplex (e.g., on the same SSB location) SSB transmissions of the base station 110 and the forwarding node 1005 that use beams with overlapping coverages (e.g., to improve spatial diversity for the SSB transmissions, such as by introducing combined beams of the base station 110 and the forwarding node 1005). The base station 110 (or another control node) may transmit a configuration to the forwarding node 1005 that enables the multiplexing determined by the base station 110.

As indicated above, FIG. 10 is provided as an example. Other examples may differ from what is described with respect to FIG. 10.

In a wireless network, a transmitted signal typically arrives at a receiver with impairments that depend on variations in a wireless channel between a transmitter and the receiver. For example, wireless channel impairments may include noise, path loss, shadowing, fading, phase drift, and/or the like. Accordingly, the transmitter may transmit a reference signal to the receiver to enable the receiver to perform channel estimation of one or more properties of the wireless channel in order to process the received signal. For example, a DMRS may carry information that a receiver can use to estimate a radio channel in order to demodulate an associated physical channel (e.g., a PDCCH, a PDSCH, a PBCH, a PUCCH, a PUSCH, and/or the like). In general, the design and mapping of a DMRS may be specific to a physical channel for which the DMRS is used for estimation. DMRSs can be beamformed, can be confined in a scheduled resource (e.g., rather than transmitted on a wideband), and can be transmitted only when necessary.

To enable channel estimation using a DMRS, the receiver may need to determine a resource configuration associated with the DMRS. For example, the resource configuration may include information related to a digital MIMO precoder, an analog beamforming filter, a downlink transmit power, and/or other transmission parameters associated with the DMRS. Furthermore, the resource configuration may include a DMRS sequence (sometimes referred to as a DMRS scrambling sequence) that is based at least in part on one or more time resources associated with a time interval in which the DMRS is transmitted. In particular, the DMRS sequence may be a function of a symbol and slot index associated with the time interval in which the DMRS is transmitted. This may create inefficiencies, however, when a forwarding node, such as a digital repeater, is used to forward a transmitted signal that includes a time-dependent DMRS sequence.

For example, a digital repeater typically operates in a half-duplex mode, whereby the digital repeater may either transmit or receive at a particular time (e.g., the digital repeater may not support simultaneous transmit and receive operations). Accordingly, when the digital repeater receives a downlink signal (e.g., a PDCCH or PDSCH) from a base station in a first time interval, the digital repeater may regenerate the downlink signal and forward (e.g., repeat) the regenerated downlink signal toward a UE in a second time interval. Accordingly, because the UE is scheduled and eventually does receive the downlink signal in the second time interval, the original downlink signal and/or the DMRS included in the original downlink signal transmitted from the base station to the repeater node may need to be scrambled based on timing information (e.g., the symbol and slot index) associated with the second time interval. In this way, the downlink signal and/or the DMRS included in the downlink signal that is forwarded to the UE may be scrambled with the correct timing information.

However, in some cases, the UE may be able to receive the original downlink signal directly from the base station (e.g., with a lower signal to interference plus noise ratio (SINR)). In such cases, the UE could realize a gain or other benefit (e.g., diversity) from the original transmission. However, in cases where the base station transmits the original downlink signal with a DMRS scrambling sequence that is based on the time resources of the second time interval, the UE will be unable to successfully receive and process (e.g., decode) the original downlink signal that should be scrambled with a DMRS scrambling sequence based on the time resources of the first time interval to enable channel estimation to properly demodulate the original downlink signal.

Furthermore, in some cases, the downlink signal to be forwarded to the UE may be repetitive, in that the same content (e.g., PDCCH or PDSCH) may be transmitted to the UE multiple times in multiple occasions. For example, a base station may periodically transmit system information (e.g., RMSI) and/or transmit system information in multiple occasions within a period (e.g., using a beam sweep), may transmit paging messages multiple times in multiple different beam directions, may transmit a group common PDCCH in multiple directions using different time and/or frequency resources, and/or the like. Accordingly, in order to enable proper channel estimation and/or other processing, the scrambling sequence of the DMRS that accompanies each PDCCH or PDSCH transmission may need to be changed based on the time resources (e.g., slot and symbol index) that are used for the respective transmission. This may require the base station to repetitively transmit the same content to the repeater node due to the time-dependent DMRS sequence to be regenerated and forwarded by the repeater node, thereby consuming additional fronthaul network resources, additional processing resources at the base station and/or the repeater node, and/or the like.

Some aspects described herein relate to techniques and apparatuses to manage DMRS scrambling sequences at a repeater node that is configured to receive a signal from a transmitter node in a first time interval, regenerate the received signal based on one or more digital processing operations, and forward the regenerated signal to a receiver node in a second time interval. For example, in some aspects, an incoming signal received from the transmitter node may include a first DMRS sequence associated with the first time interval in which the incoming signal is transmitted, and the repeater node may replace the first DMRS sequence with a second DMRS sequence in an outgoing signal that is a regenerated version of the incoming signal. In particular, the second DMRS sequence associated with the outgoing signal may be based on time resources associated with a second time interval in which the outgoing signal is scheduled to be transmitted to a receiver node. Accordingly, the repeater node may forward the outgoing signal that is a regenerated version of the incoming signal to the receiver node in the second time interval. In this way, the receiver node may potentially receive two copies of the signal, including the original signal transmitted in the first time interval and the regenerated signal transmitted in the second time interval. In this way, because the original signal includes a DMRS sequence associated with the first time interval, and the regenerated signal includes a DMRS sequence associated with the second time interval, the receiver node may correctly receive and process (e.g., demodulate) both copies of the signal and achieve a signal processing gain. Furthermore, in cases where the original signal includes content to be transmitted to the receiver node multiple times in multiple occasions, the transmitter node may send a single copy of the signal to the repeater node, and the repeater node may repeat the signal at different time resources using DMRS sequences that are associated with the corresponding time resources.

Figure 11:
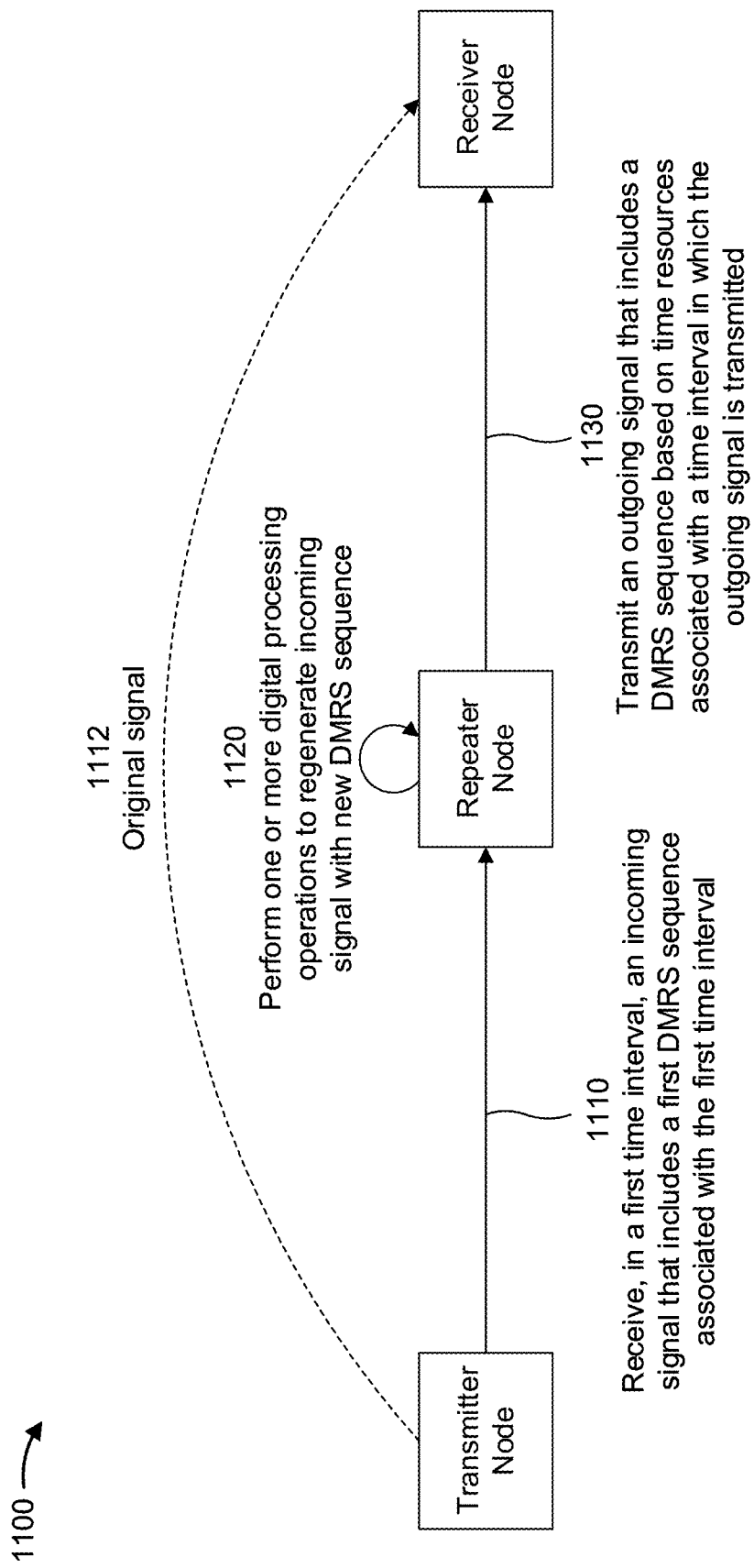
FIG. 11 is a diagram illustrating an example associated with demodulation reference signal (DMRS) management by digital repeaters, in accordance with the present disclosure.

FIG. 11 is a diagram illustrating an example 1100 associated with DMRS management by digital repeaters, in accordance with the present disclosure. As shown in FIG. 11, example 1100 includes communication between a transmitter node, a repeater node, and a receiver node. In some aspects, the transmitter node, the repeater node, and the receiver node may be included in a wireless network, such as wireless network 100. In some aspects, the repeater node may be a wireless node, a base station, a UE, and/or an IAB node, among other examples. In some aspects, the repeater node is an L1 repeater node. For example, the repeater node may be a digital repeater node that can convert an incoming signal from an analog domain into a digital domain (e.g., for storage and/or further processing at the digital repeater node). In some aspects, the transmitter node may be a base station 110, a DU of an IAB node, and/or the like, the receiver node may be a UE 120, an MT unit of an IAB node, and/or the like, and the repeater node may be configured to perform DMRS management for downlink signals to be forwarded from the transmitter node to the receiver node. Additionally, or alternatively, the transmitter node may be a first UE 120, the receiver node may be a second UE 120, and the repeater node may be configured to perform DMRS management for sidelink signals to be forwarded from the transmitter node to the receiver node.

In some aspects, the repeater node may be configured with a reception configuration, a buffering configuration, and/or a forwarding configuration, as described above, for use in receiving, regenerating, and forwarding signals from the transmitter node to the receiver node. In some aspects, the repeater node may be configured with a multiplexing configuration for multiplexing received or generated signals. In some aspects, a configuration for the repeater node may indicate time and frequency resources and a beamforming configuration for reception, time and frequency resources and a beamforming configuration for transmission, and/or the like. In some aspects, a configuration for the repeater node may indicate information and/or parameters for the generation or regeneration of a signal. For example, in some aspects, information and/or parameters for the generation or regeneration of a signal may indicate a level of digital processing operations to be performed on an incoming signal to regenerate the incoming signal as an outgoing signal to be forwarded (e.g., whether the repeater node is to implement Split Option 8, Split Option 7-1, Split Option 7-2, Split Option 7-3, and/or Split Option 6). In some aspects, a control node may configure the repeater node with one or more of the aforementioned configurations, and the control node may correspond to the transmitter node or a different node in the wireless network.

In some aspects, the repeater node may indicate, to the control node, that the repeater node has capabilities to receive a signal from a transmitter node in a first time interval, regenerate the received signal based on one or more digital processing operations, and forward the regenerated signal to a receiver node in a second time interval. For example, the repeater node may indicate, to the control node, whether the repeater node has capabilities to implement Split Option 8, Split Option 7-1, Split Option 7-2, Split Option 7-3, and/or Split Option 6, as described above with reference to FIG. 5. Accordingly, the control node may indicate the level of digital processing that the repeater node is to perform on incoming signals based at least in part on whether the repeater node has capabilities to implement Split Option 8, Split Option 7-1, Split Option 7-2, Split Option 7-3, and/or Split Option 6.

Furthermore, in some aspects, the repeater node may indicate, to the control node, that the repeater node capabilities to replace a time-dependent DMRS sequence included in the incoming signal with a new DMRS sequence that is based on a time interval in which the regenerated signal is to be forwarded. Accordingly, in such cases, the control node may provide the repeater node with configuration information to enable the repeater node to change the DMRS sequence in the regenerated signal. For example, in some aspects, the configuration information may indicate resources (e.g., a symbol and slot index) and a scrambling identifier associated with the first DMRS sequence (e.g., to enable the repeater node to demodulate, perform channel estimation, or otherwise process the incoming signal), and the configuration information may further indicate a scrambling identifier to be used to generate the second DMRS sequence. Alternatively, in some cases, the configuration information may indicate only the resources and scrambling identifier associated with the first DMRS sequence, and the repeater node may autonomously determine the scrambling identifier for the second DMRS sequence according to the configuration of the first DMRS sequence and the time resources (e.g., symbol and slot index) in which the regenerated signal is to be forwarded.

As shown in FIG. 11, and by reference number 1110, the transmitter node may transmit, and the receiver node may receive, an incoming signal in a first time interval. The incoming signal may include a first DMRS sequence that is based at least in part on one or more time resources associated with the first time interval. For example, as described above, the first DMRS sequence may be a function of a symbol and slot index associated with the time interval in which the incoming signal is transmitted. As further shown in FIG. 11, and by reference number 1112, the original signal transmitted by the transmitter node may be received by the receiver node. Accordingly, because the first DMRS sequence included in the signal transmitted by the transmitter node is based on the time interval in which the incoming signal is transmitted, the UE may have an opportunity to receive and process the original signal, which may result in a signal processing gain relative to receiving only the regenerated signal from the repeater node.

As shown in FIG. 11, and by reference number 1120, the repeater node may perform one or more digital processing operations on the incoming signal in order to regenerate the incoming signal with a new DMRS sequence associated with a time interval in which the regenerated signal is to be forwarded to the receiver node. For example, in cases where the repeater node is configured to fully decode the incoming signal (e.g., by implementing Split Option 6), the repeater node may decode the incoming signal to obtain a transport block from the incoming signal, and may insert a new DMRS into a generated channel after encoding the transport block. For example, as described above in connection with FIG. 5, the repeater node may (e.g., using Rx chain 504) decode the incoming signal by converting the incoming signal from an analog domain to a digital domain to obtain time domain IQ samples, removing a cyclic prefix and performing an FFT on the time domain IQ samples to obtain frequency domain IQ samples, performing digital beamforming and RE demapping to extract tones from the frequency domain IQ samples, may perform channel estimation and demodulation (e.g., using the first DMRS sequence included in the incoming signal) to obtain a codeword, and may then descramble and decode the codeword to obtain the transport block from the incoming signal. Accordingly, the repeater node may then (e.g., using Tx chain 502) generate a fresh/clean outgoing signal by encoding the transport block, scrambling the encoded transport block using the second DMRS sequence to regenerate the codeword, and further processing the codeword to generate the outgoing signal to be forwarded to the receiver node.

In some aspects, however, the repeater node may be configured to perform less digital processing to regenerate the incoming signal. For example, the repeater node may be configured (e.g., by the control node) to implement Split Option 8, Split Option 7-1, Split Option 7-2, Split Option 7-3, and/or the like. In such cases, where the repeater node does not fully decode the incoming signal, the repeater node may be unable to regenerate the incoming signal because the signal (e.g., prior to channel estimation, equalization, demodulation, and/or descrambling using the first DMRS) is impaired by variations in a wireless channel (e.g., a fronthaul) between the transmitter node and the receiver node. Accordingly, if the repeater node were to remove the first DMRS from the incoming signal and replace the first DMRS with a second DMRS based on the time resources to be used to forward the signal to the receiver without fully decoding the incoming signal, an effective channel on the second DMRS would differ from an effective channel on the PDCCH, PDSCH, PSCCH, and/or PSSCH. For example, the effective channel on the second DMRS would depend on impairments in a wireless channel between the repeater node and the receiver node, whereas the effective channel on the PDCCH, PDSCH, PSCCH, and/or PSSCH would depend on impairments in a wireless channel between the repeater node and the transmitter node. In this case, due to the mismatch between the effective channels, the receiver would be unable to use the second DMRS to perform channel estimation and demodulation of the PDCCH, PDSCH, PSCCH, and/or PSSCH.

Accordingly, in some aspects, the repeater node may be configured to implement a level of digital processing (e.g., Split Option 7-2 and/or Split Option 7-3) to extract, from the incoming signal, one or more tones occupied by the first DMRS. The repeater node may then further process the one or more tones occupied by the first DMRS to replace the first DMRS with a second DMRS associated with a DMRS sequence that is a function of time resources to be used to forward the outgoing signal to the receiver. For example, in some aspects, the repeater node may extract the tone(s) occupied by the first DMRS (e.g., by performing digital beamforming and RE demapping on frequency domain IQ samples that are obtained from the incoming signal) such that $y=h*x1+w$, where x1 is a tone occupied by the first DMRS, h is a wireless channel between the transmitter node and the receiver node, w is additive noise in the incoming signal, and y is the incoming signal that the repeater node observes on the tone occupied by the first DMRS. In some aspects, the repeater node may then descramble the tone(s) occupied by the first DMRS by multiplying the occupied tone(s) by a conjugate of the first DMRS and normalizing the product. In this way, the repeater node may descramble the tone(s) occupied by the first DMRS using the conjugate of the first DMRS such that $y'=conj(x1)/abs(x1)^2*y=h+w'$, where $w' \approx w$. In other words, by multiplying the occupied tone(s) by the conjugate of the first DMRS and normalizing the product based on the absolute value of x1 squared, the repeater node may essentially remove the tone(s) occupied by the first DMRS from the incoming signal observed by the repeater node, leaving only the channel, h, and the additive noise, w'. In some aspects, the repeater node may then scramble the tone(s) that were descrambled in the original incoming signal with the second DMRS by multiplying the descrambled tone(s) with the second DMRS sequence that is based on the time resources associated with the time interval in which the signal is to be forwarded to the receiver such that $y''=y'*x2=h*x2+w''$, where x2 is the second DMRS sequence. In this way, the receiver may use the second DMRS sequence, x2, as a pilot to estimate the wireless channel, h.

As further shown in FIG. 11, and by reference number 1130, the repeater node may transmit, and the receiver node may receive, an outgoing signal that is a regenerated version of the incoming signal received at the repeater node. Furthermore, as described herein, the outgoing signal that is transmitted from the repeater node to the receiver node may include a DMRS sequence that is based at least in part on time resources associated with the time interval in which the outgoing signal is transmitted. In this way, the receiver node may use the DMRS sequence included in the signal received from the receiver node to perform channel estimation and/or demodulation on the signal received at the receiver node, whereby the repeating operations performed by the repeater node may be transparent to the receiver node. Furthermore, as described above, the receiver node may also receive a copy of the original signal from the transmitter node, which includes a DMRS sequence associated with the time interval in which the original signal is transmitted. In this case, the receiver node may process both signals based at least in part on the respective DMRS sequences included in the signals to achieve a signal processing gain. Additionally, or alternatively, in cases where the original signal includes repetitive content (e.g., RMSI that is periodically transmitted, a paging message transmitted in multiple beam directions in multiple occasions, a group common control signal transmitted in multiple beam directions in multiple occasions, and/or the like), the repeater node may perform similar digital processing operations as described above to regenerate multiple instances of the incoming signal that each include a DMRS sequence associated with the time interval in which the respective instance of the incoming signal is to be transmitted.

As indicated above, FIG. 11 is provided as an example. Other examples may differ from what is described with respect to FIG. 11.

Figure 12:
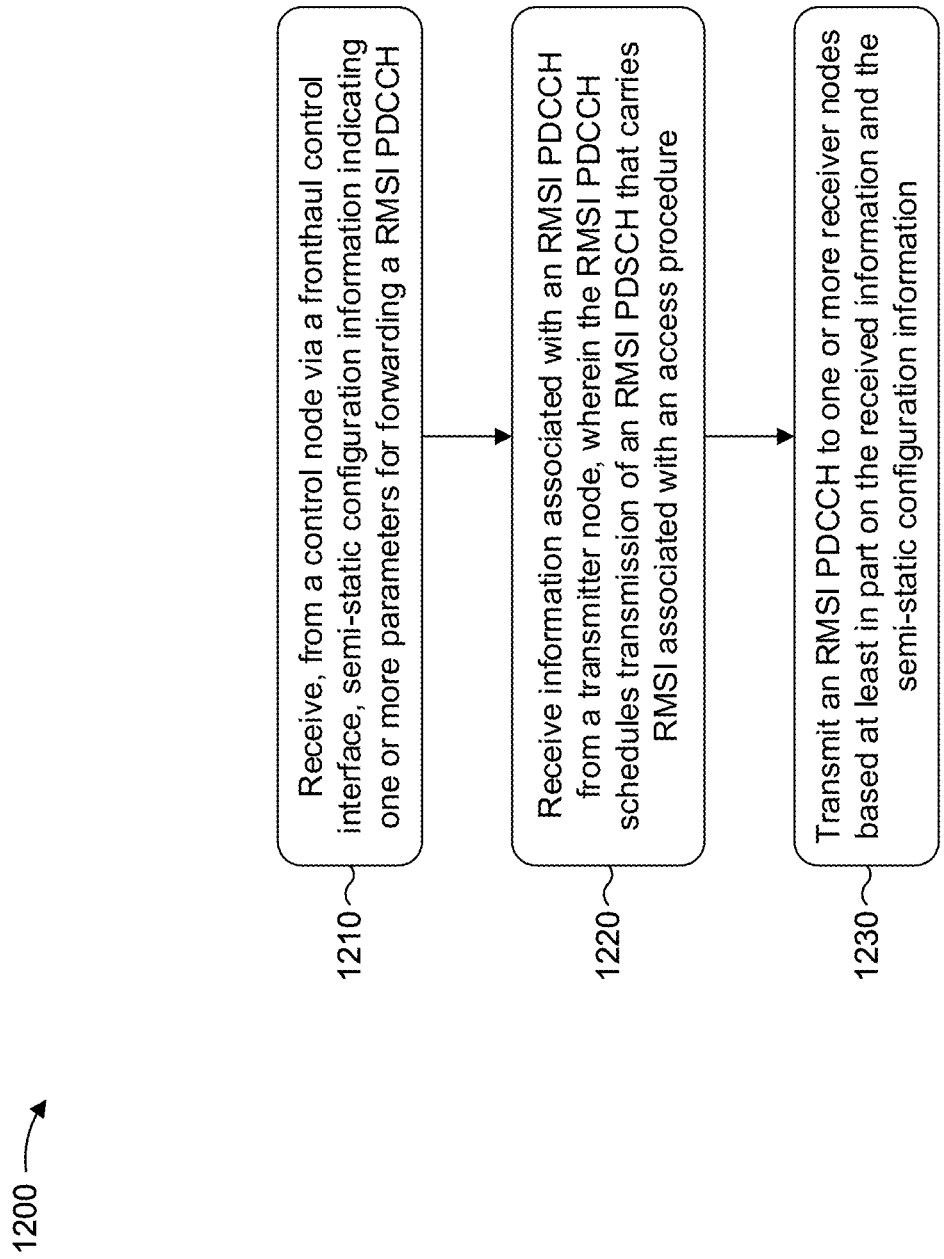
FIG. 12 is a diagram illustrating an example process associated with RMSI transmission by a wireless remote unit, in accordance with the present disclosure.

FIG. 12 is a diagram illustrating an example process 1200 performed, for example, by a wireless forwarding node, in accordance with the present disclosure. Example process 1200 is an example where the wireless forwarding node (e.g., forwarding node 310, forwarding node 405, forwarding node 710, forwarding node 905, and/or the like) performs operations associated with RMSI transmission.

As shown in FIG. 12, in some aspects, process 1200 may include receiving, from a control node via a fronthaul control interface, semi-static configuration information indicating one or more parameters for forwarding an RMSI PDCCH (block 1210). For example, the wireless forwarding node (e.g., using reception component 1702, depicted in FIG. 17) may receive, from a control node via a fronthaul control interface, semi-static configuration information indicating one or more parameters for forwarding an RMSI PDCCH, as described above.

As further shown in FIG. 12, in some aspects, process 1200 may include receiving information associated with an RMSI PDCCH from a transmitter node, wherein the RMSI PDCCH schedules transmission of an RMSI PDSCH that carries RMSI associated with an access procedure (block 1220). For example, the wireless forwarding node (e.g., using reception component 1702, depicted in FIG. 17) may receive information associated with an RMSI PDCCH from a transmitter node, wherein the RMSI PDCCH schedules transmission of an RMSI PDSCH that carries RMSI associated with an access procedure, as described above.

As further shown in FIG. 12, in some aspects, process 1200 may include transmitting an RMSI PDCCH to one or more receiver nodes based at least in part on the received information and the semi-static configuration information (block 1230). For example, the wireless forwarding node (e.g., using storage component 1708, digital processing component 1710, and/or transmission component 1704, depicted in FIG. 17) may transmit an RMSI PDCCH to one or more receiver nodes based at least in part on the received information and the semi-static configuration information, as described above.

Process 1200 may include additional aspects, such as any single aspect or any combination of aspects described below and/or in connection with one or more other processes described elsewhere herein.

In a first aspect, the one or more parameters indicated in the semi-static configuration information include one or more resources and a beamforming configuration used to transmit the RMSI PDCCH.

In a second aspect, alone or in combination with the first aspect, the received information associated with the RMSI PDCCH includes a copy of the RMSI PDCCH received as an incoming signal, and the RMSI PDCCH transmitted to the one or more receiver nodes is a regenerated version of the RMSI PDCCH that is transmitted as an outgoing signal, based at least in part on the wireless forwarding node having a wireless repeater configuration.

In a third aspect, alone or in combination with one or more of the first and second aspects, the received information associated with the RMSI PDCCH includes an incoming signal having a payload that includes information to generate the RMSI PDCCH as an outgoing signal, based at least in part on the wireless forwarding node having a wireless relay configuration.

In a fourth aspect, alone or in combination with one or more of the first through third aspects, process 1200 includes storing (e.g., using storage component 1708, depicted in FIG. 17) content of the RMSI associated with the access procedure, and transmitting (e.g., using transmission component 1704, depicted in FIG. 17), to the one or more receiver nodes, in multiple transmission occasions associated with the access procedure, the content of the RMSI associated with the access procedure in multiple instances of the RMSI PDSCH.

In a fifth aspect, alone or in combination with one or more of the first through fourth aspects, each instance of the RMSI PDSCH includes a DMRS associated with a DMRS scrambling sequence that is based at least in part on one or more time resources associated with a transmission occasion in which the respective RMSI PDSCH is transmitted.

In a sixth aspect, alone or in combination with one or more of the first through fifth aspects, process 1200 includes (e.g., using digital processing component 1710, depicted in FIG. 17) decoding a single received instance of the RMSI PDSCH, based at least in part on a first DMRS sequence associated with the RMSI PDSCH, to obtain a transport block that includes the RMSI associated with the access procedure, encoding the transport block to generate a codeword of the multiple instances of the RMSI PDSCH that are transmitted in the multiple transmission occasions, and inserting the codeword and a new DMRS sequence into each instance of the RMSI PDSCH based at least in part on the one or more time resources associated with the transmission occasion in which the respective RMSI PDSCH is transmitted.

In a seventh aspect, alone or in combination with one or more of the first through sixth aspects, process 1200 includes (e.g., using digital processing component 1710, depicted in FIG. 17) extracting one or more tones in a single received instance of the RMSI PDSCH that are occupied by a first DMRS sequence associated with the RMSI PDSCH, descrambling the one or more tones extracted from the single received instance of the RMSI PDSCH, based at least in part on a conjugate of the first DMRS sequence, to obtain one or more tones associated with the multiple instances of the RMSI PDSCH that are transmitted in the multiple transmission occasions, and scrambling, for each instance of the RMSI PDSCH, the one or more tones with a new DMRS sequence, based at least in part on the one or more time resources associated with the transmission occasion in which the instance of the RMSI PDSCH is transmitted.

In an eighth aspect, alone or in combination with one or more of the first through seventh aspects, process 1200 includes (e.g., using digital processing component 1710, depicted in FIG. 17) obtaining a payload that includes the RMSI associated with the access procedure, and inserting the payload and a new DMRS sequence into each instance of the RMSI PDSCH based at least in part on the one or more time resources associated with the transmission occasion in which the instance of the RMSI PDSCH is transmitted.

In a ninth aspect, alone or in combination with one or more of the first through eighth aspects, the content of the RMSI includes a transport block, a codeword, or one or more frequency domain symbols.

In a tenth aspect, alone or in combination with one or more of the first through ninth aspects, the content of the RMSI is received from the transmitter node in a broadcast or multicast signal.

In an eleventh aspect, alone or in combination with one or more of the first through seventh aspects, the content of the RMSI is acquired by an MT unit associated with the wireless forwarding node from an MIB or one or more Ms transmitted by the transmitter node, and process 1200 includes receiving (e.g., using reception component 1702, depicted in FIG. 17), at the MT unit associated with the wireless forwarding node, information updating the content of the RMSI in a fronthaul PDSCH.

In a twelfth aspect, alone or in combination with one or more of the first through eleventh aspects, a payload of the fronthaul PDSCH includes one or more updated information elements updating the content of the RMSI.

In a thirteenth aspect, alone or in combination with one or more of the first through twelfth aspects, the wireless forwarding node is a repeater node configured to receive an incoming signal and perform one or more digital processing operations to regenerate the incoming signal as an outgoing signal.

In a fourteenth aspect, alone or in combination with one or more of the first through thirteenth aspects, the wireless forwarding node is a relay node configured to receive an incoming signal and perform one or more digital processing operations to generate an outgoing signal that includes information associated with the incoming signal based at least in part on a payload of the incoming signal.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
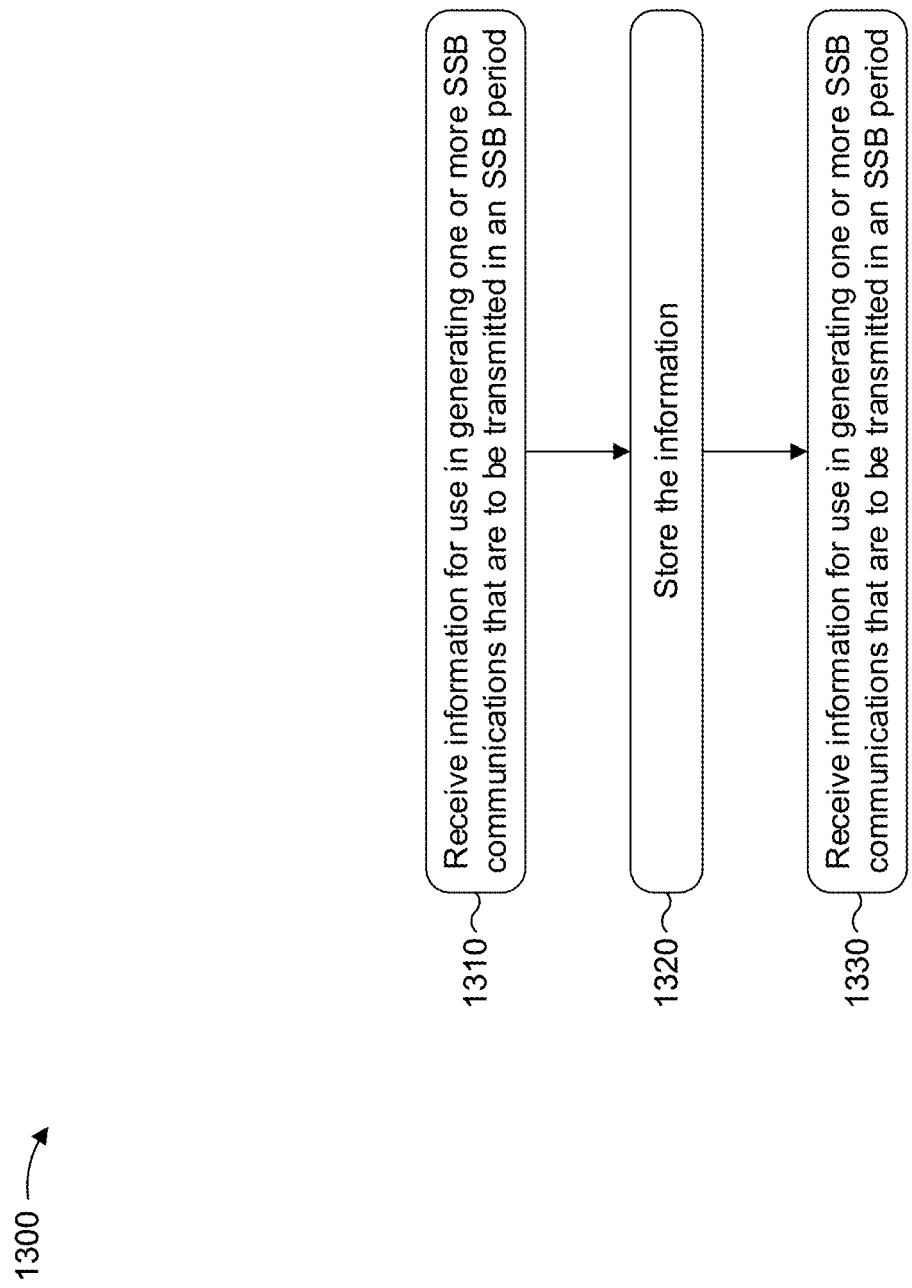
FIGS. 13-14 are diagrams illustrating example processes associated with SSB forwarding, in accordance with the present disclosure.

FIG. 13 is a diagram illustrating an example process 1300 performed, for example, by a forwarding node, in accordance with the present disclosure. Example process 1300 is an example where the forwarding node (e.g., forwarding node 905, a UE 180, a base station 110, a wireless node, and/or an IAB node, among other examples) performs operations associated with SSB forwarding.

As shown in FIG. 13, in some aspects, process 1300 may include receiving information for use in generating one or more SSB communications that are to be transmitted in an SSB period (block 1310). For example, the forwarding node (e.g., using reception component 1802, depicted in FIG. 18) may receive information for use in generating one or more SSB communications that are to be transmitted in an SSB period, as described above.

As further shown in FIG. 13, in some aspects, process 1300 may include storing the information (block 1320). For example, the forwarding node (e.g., using storage component 1808, depicted in FIG. 18) may store the information, as described above.

As further shown in FIG. 13, in some aspects, process 1300 may include transmitting the one or more SSB communications, based at least in part on the information, in the SSB period (block 1330). For example, the forwarding node (e.g., using transmission component 1804, depicted in FIG. 18) may transmit the one or more SSB communications, based at least in part on the information, in the SSB period, as described above.

Process 1300 may include additional aspects, such as any single aspect or any combination of aspects described below and/or in connection with one or more other processes described elsewhere herein.

In a first aspect, the one or more SSB communications are transmitted in resources that are different from resources used by a mobile termination of the forwarding node for receiving SSBs from a base station.

In a second aspect, alone or in combination with the first aspect, the one or more SSB communications and one or more additional SSB communications transmitted by a base station are time-division multiplexed.

In a third aspect, alone or in combination with one or more of the first and second aspects, the one or more SSB communications and one or more additional SSB communications transmitted by a base station overlap in time.

In a fourth aspect, alone or in combination with one or more of the first through third aspects, the information is received in a time interval that is prior to the SSB period.

In a fifth aspect, alone or in combination with one or more of the first through fourth aspects, the information is received in a physical downlink shared channel via a fronthaul interface.

In a sixth aspect, alone or in combination with one or more of the first through fifth aspects, the information includes a content for the one or more SSB communications and includes at least one of time-domain IQ samples, frequency-domain IQ samples, information that indicates a sequence for a sequence-based signal, IQ symbols of occupied tones, a codeword, a MIB content, or information indicating resources for transmitting the one or more SSB communications.

In a seventh aspect, alone or in combination with one or more of the first through sixth aspects, the information is for use in generating a primary synchronization signal or a secondary synchronization signal for the one or more SSB communications, and process 1300 further includes receiving additional information for use in generating a physical broadcast channel or a demodulation reference signal for the one or more SSB communications.

In an eighth aspect, alone or in combination with one or more of the first through seventh aspects, the information is received less frequently than the additional information.

In a ninth aspect, alone or in combination with one or more of the first through eighth aspects, process 1300 includes generating a primary synchronization signal or a secondary synchronization signal based at least in part on SSBs received at a mobile termination of the forwarding node.

In a tenth aspect, alone or in combination with one or more of the first through ninth aspects, process 1300 includes generating a primary synchronization signal or a secondary synchronization signal based at least in part on a physical cell identifier associated with a base station.

In an eleventh aspect, alone or in combination with one or more of the first through tenth aspects, process 1300 includes generating a physical broadcast channel based at least in part on a content of a MIB and a transmission time for the MIB.

In a twelfth aspect, alone or in combination with one or more of the first through eleventh aspects, process 1300 includes generating the one or more SSB communications based at least in part on the information.

In a thirteenth aspect, alone or in combination with one or more of the first through twelfth aspects, transmitting the one or more SSB communications includes transmitting the one or more SSB communications in the SSB period with one or more additional SSB communications transmitted by a base station.

In a fourteenth aspect, alone or in combination with one or more of the first through thirteenth aspects, the forwarding node is a relay node.

In a fifteenth aspect, alone or in combination with one or more of the first through fourteenth aspects, process 1300 includes performing digital processing of the information.

In a sixteenth aspect, alone or in combination with one or more of the first through fifteenth aspects, process 1300 includes forwarding one or more non-SSB communications between a first wireless node and a second wireless node.

In a seventeenth aspect, alone or in combination with one or more of the first through sixteenth aspects, the information is received from a control node.

In an eighteenth aspect, alone or in combination with one or more of the first through seventeenth aspects, the control node is a base station.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
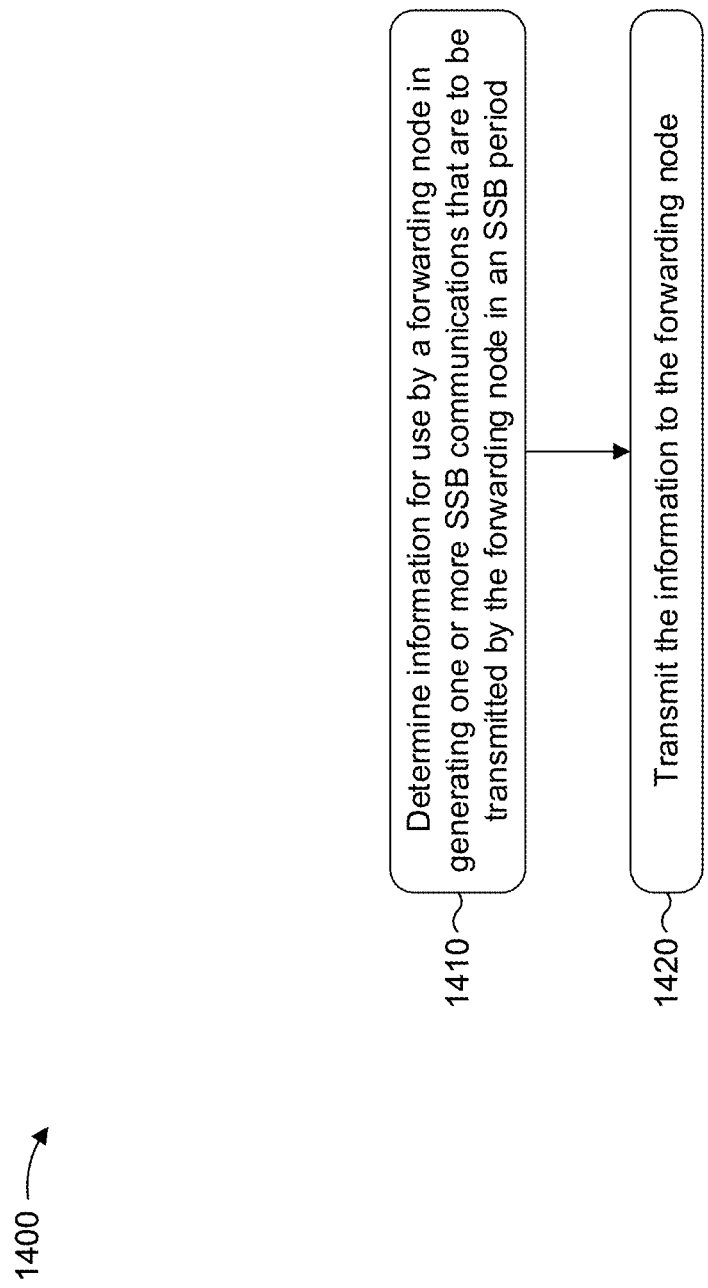

FIG. 14 is a diagram illustrating an example process 1400 performed, for example, by a control node, in accordance with the present disclosure. Example process 1400 is an example where the control node (e.g., base station 140, a wireless node, an IAB node, an IAB donor) performs operations associated with SSB forwarding.

As shown in FIG. 14, in some aspects, process 1400 may include determining information for use by a forwarding node in generating one or more SSB communications that are to be transmitted by the forwarding node in an SSB period (block 1410). For example, the control node (e.g., using determination component 1908, depicted in FIG. 19) may determine information for use by a forwarding node in generating one or more SSB communications that are to be transmitted by the forwarding node in an SSB period, as described above.

As further shown in FIG. 14, in some aspects, process 1400 may include transmitting the information to the forwarding node (block 1420). For example, the control node (e.g., using transmission component 1904, depicted in FIG. 19) may transmit the information to the forwarding node, as described above.

Process 1400 may include additional aspects, such as any single aspect or any combination of aspects described below and/or in connection with one or more other processes described elsewhere herein.

In a first aspect, the one or more SSB communications are to be transmitted in resources that are different from resources used by a base station for transmitting one or more additional SSB communications.

In a second aspect, alone or in combination with the first aspect, the one or more SSB communications and one or more additional SSB communications transmitted by a base station are time-division multiplexed.

In a third aspect, alone or in combination with one or more of the first and second aspects, the one or more SSB communications and one or more additional SSB communications transmitted by a base station overlap in time.

In a fourth aspect, alone or in combination with one or more of the first through third aspects, the information is transmitted in a time interval that is prior to the SSB period.

In a fifth aspect, alone or in combination with one or more of the first through fourth aspects, the information is transmitted in a physical downlink shared channel via a fronthaul interface.

In a sixth aspect, alone or in combination with one or more of the first through fifth aspects, the information includes a content for the one or more SSB communications and includes at least one of time-domain IQ samples, frequency-domain IQ samples, information that indicates a sequence for a sequence-based signal, IQ symbols of occupied tones, a codeword, a MIB content, or information indicating resources for transmitting the one or more SSB communications.

In a seventh aspect, alone or in combination with one or more of the first through sixth aspects, the information is for use in generating a primary synchronization signal or a secondary synchronization signal for the one or more SSB communications, and process 1400 further includes transmitting additional information for use in generating a physical broadcast channel or a demodulation reference signal for the one or more SSB communications.

In an eighth aspect, alone or in combination with one or more of the first through seventh aspects, the information is transmitted less frequently than the additional information.

In a ninth aspect, alone or in combination with one or more of the first through eighth aspects, process 1400 includes transmitting SSBs to a mobile termination of the forwarding node.

In a tenth aspect, alone or in combination with one or more of the first through ninth aspects, process 1400 includes transmitting one or more additional SSB communications in the SSB period with the one or more SSB communications.

In an eleventh aspect, alone or in combination with one or more of the first through tenth aspects, the forwarding node is a relay node.

In a twelfth aspect, alone or in combination with one or more of the first through eleventh aspects, the control node is a base station.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
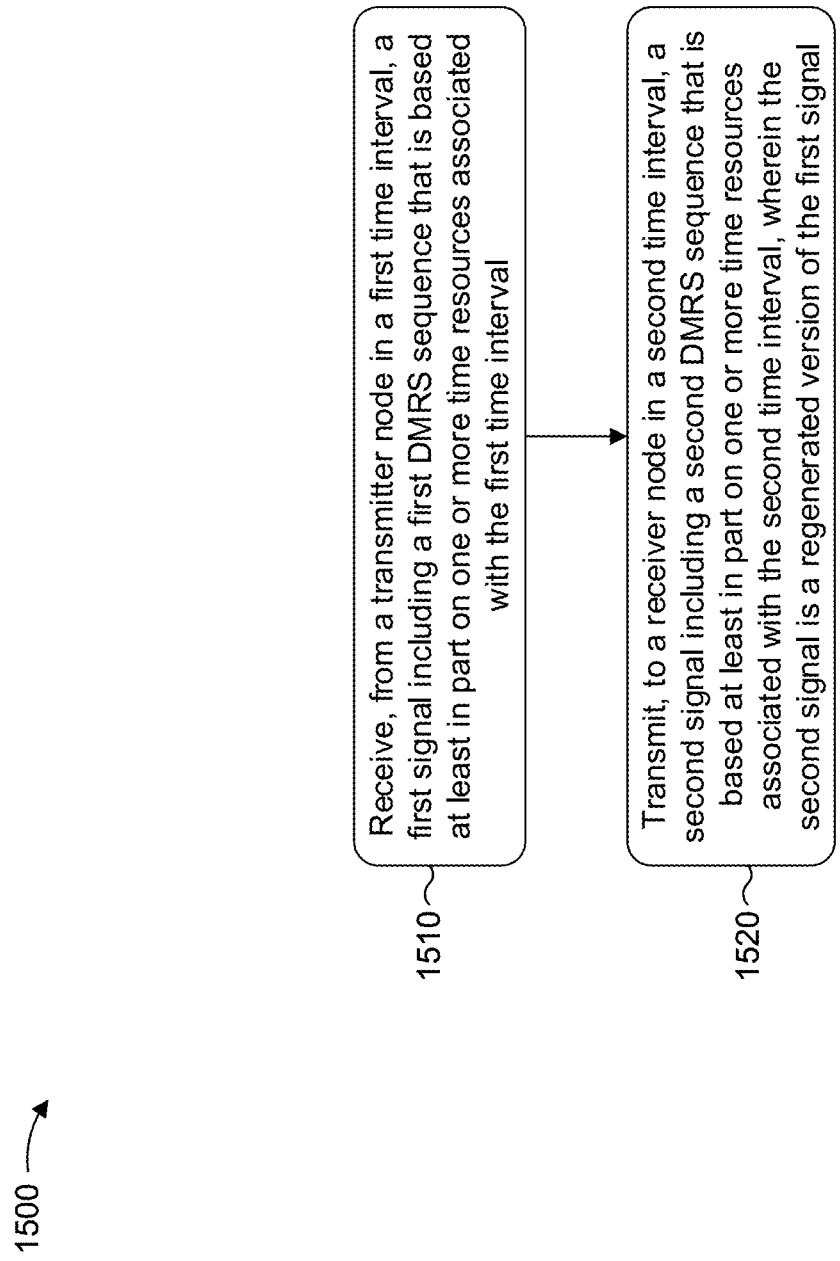
FIGS. 15-16 are diagrams illustrating example processes associated with DMRS management by digital repeaters, in accordance with the present disclosure.

FIG. 15 is a diagram illustrating an example process 1500 performed, for example, by a repeater node, in accordance with the present disclosure. Example process 1500 is an example where the repeater node (e.g., forwarding node 310, forwarding node 405, forwarding node 710, and/or the like) performs operations associated with DMRS management by digital repeaters.

As shown in FIG. 15, in some aspects, process 1500 may include receiving, from a transmitter node in a first time interval, a first signal including a first DMRS sequence that is based at least in part on one or more time resources associated with the first time interval (block 1510). For example, the repeater node (e.g., using reception component 2002, depicted in FIG. 20) may receive, from a transmitter node in a first time interval, a first signal including a first DMRS sequence that is based at least in part on one or more time resources associated with the first time interval, as described above.

As further shown in FIG. 15, in some aspects, process 1500 may include transmitting, to a receiver node in a second time interval, a second signal including a second DMRS sequence that is based at least in part on one or more time resources associated with the second time interval, wherein the second signal is a regenerated version of the first signal (block 1520). For example, the repeater node (e.g., using transmission component 2004, depicted in FIG. 20) may transmit, to a receiver node in a second time interval, a second signal including a second DMRS sequence that is based at least in part on one or more time resources associated with the second time interval, as described above. In some aspects, the second signal is a regenerated version of the first signal.

Process 1500 may include additional aspects, such as any single aspect or any combination of aspects described below and/or in connection with one or more other processes described elsewhere herein.

In a first aspect, process 1500 includes performing (e.g., using digital processing component 2008, depicted in FIG. 20) one or more digital processing operations on the first signal to generate the second signal.

Figure 20:
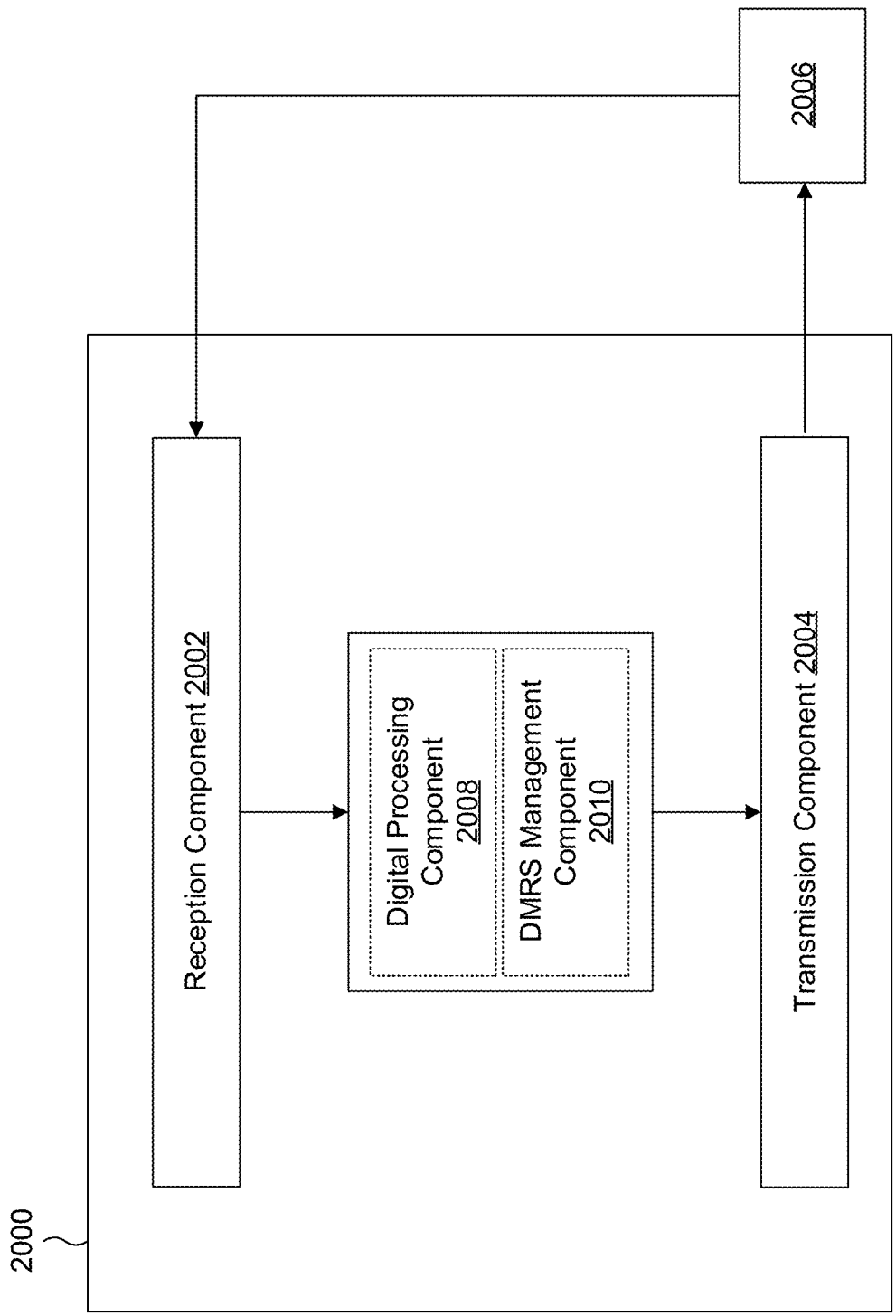

In a second aspect, alone or in combination with the first aspect, performing the one or more digital processing operations on the first signal includes (e.g., using digital processing component 2008 and/or DMRS management component 2010, depicted in FIG. 20) decoding the first signal based at least in part on the first DMRS sequence to obtain a transport block from the first signal, encoding the transport block to generate a codeword of the second signal, and inserting the second DMRS sequence into a channel of the second signal.

In a third aspect, alone or in combination with one or more of the first and second aspects, performing the one or more digital processing operations on the first signal includes (e.g., using digital processing component 2008 and/or DMRS management component 2010, depicted in FIG. 20) extracting one or more tones in the first signal that are occupied by the first DMRS sequence, descrambling the one or more tones extracted from the first signal based at least in part on a conjugate of the first DMRS sequence to obtain one or more tones of the second signal, and scrambling the one or more tones of the second signal based at least in part on the second DMRS sequence.

In a fourth aspect, alone or in combination with one or more of the first through third aspects, process 1500 includes transmitting (e.g., using transmission component 2004, depicted in FIG. 20) one or more repetitions of the second signal to the receiver node in one or more time intervals subsequent to the second time interval, wherein the one or more repetitions of the second signal each include a DMRS sequence associated with a time interval in which the respective repetition is transmitted.

In a fifth aspect, alone or in combination with one or more of the first through fourth aspects, process 1500 includes receiving (e.g., using reception component 2002, depicted in FIG. 20), from a control node, configuration information enabling the repeater node to regenerate the first signal as the second signal with the second DMRS sequence replacing the first DMRS sequence.

In a sixth aspect, alone or in combination with one or more of the first through fifth aspects, the configuration information indicates the one or more time resources associated with the first DMRS sequence and a scrambling identifier associated with the first DMRS sequence.

In a seventh aspect, alone or in combination with one or more of the first through sixth aspects, the configuration information further indicates a scrambling identifier associated with the second DMRS sequence.

In an eighth aspect, alone or in combination with one or more of the first through seventh aspects, process 1500 includes determining (e.g., using DMRS management component 2010, depicted in FIG. 20) a scrambling identifier associated with the second DMRS sequence based at least in part on the scrambling identifier of the first DMRS sequence and the one or more time resources associated with the second DMRS sequence.

In a ninth aspect, alone or in combination with one or more of the first through eighth aspects, process 1500 includes transmitting (e.g., using transmission component 2004, depicted in FIG. 20), to the control node, information indicating that the repeater node has a capability to regenerate the first signal as the second signal with the second DMRS sequence replacing the first DMRS sequence In a tenth aspect, alone or in combination with one or more of the first through eighth aspects, the control node corresponds to one of the transmitter node or the receiver node.

In an eleventh aspect, alone or in combination with one or more of the first through tenth aspects, the first DMRS sequence and the second DMRS sequence are based at least in part on respective symbol and slot indexes associated with the first time interval and the second time interval.

In a twelfth aspect, alone or in combination with one or more of the first through eleventh aspects, the second signal is transmitted using a beamforming configuration.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
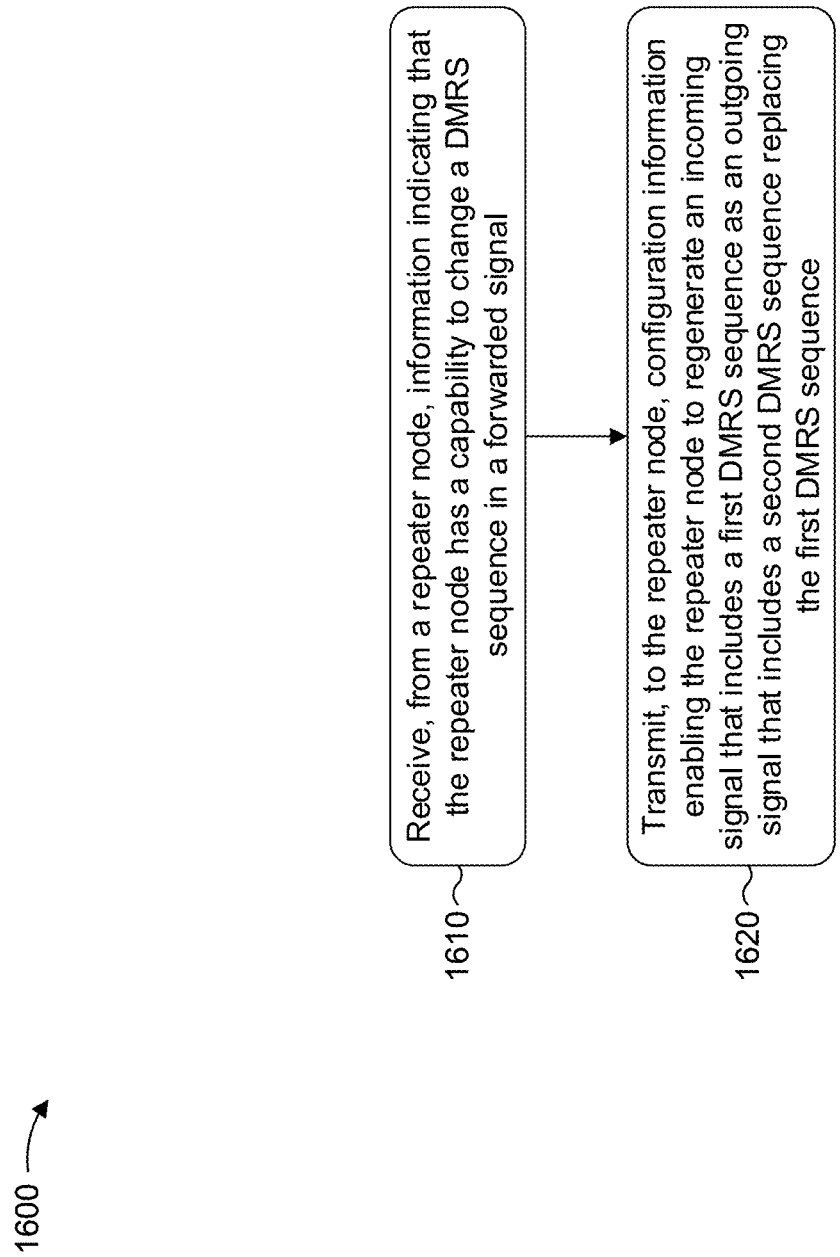

FIG. 16 is a diagram illustrating an example process 1600 performed, for example, by a control node, in accordance with the present disclosure. Example process 1600 is an example where the control node (e.g., control node 410, control node 705, and/or the like) performs operations associated with DMRS management by digital repeaters.

As shown in FIG. 16, in some aspects, process 1600 may include receiving, from a repeater node, information indicating that the repeater node has a capability to change a DMRS sequence in a forwarded signal (block 1610). For example, the control node (e.g., using reception component 2102, depicted in FIG. 21) may receive, from a repeater node, information indicating that the repeater node has a capability to change a DMRS sequence in a forwarded signal, as described above.

As further shown in FIG. 16, in some aspects, process 1600 may include transmitting, to the repeater node, configuration information enabling the repeater node to regenerate an incoming signal that includes a first DMRS sequence as an outgoing signal that includes a second DMRS sequence replacing the first DMRS sequence (block 1620). For example, the control node (e.g., using transmission component 2104, depicted in FIG. 21) may transmit, to the repeater node, configuration information enabling the repeater node to regenerate an incoming signal that includes a first DMRS sequence as an outgoing signal that includes a second DMRS sequence replacing the first DMRS sequence, as described above.

Process 1600 may include additional aspects, such as any single aspect or any combination of aspects described below and/or in connection with one or more other processes described elsewhere herein.

In a first aspect, the first DMRS sequence is based at least in part on one or more time resources associated with a first time interval in which the incoming signal is transmitted to the repeater node, and wherein the second DMRS sequence is based at least in part on one or more time resources associated with a second time interval in which the repeater node transmits the outgoing signal to a receiver node.

In a second aspect, alone or in combination with the first aspect, the configuration information indicates the one or more time resources associated with the first DMRS sequence and a scrambling identifier associated with the first DMRS sequence.

In a third aspect, alone or in combination with one or more of the first and second aspects, the configuration information further indicates a scrambling identifier associated with the second DMRS sequence.

In a fourth aspect, alone or in combination with one or more of the first through third aspects, the control node corresponds to one of the transmitter node or the receiver node.

In a fifth aspect, alone or in combination with one or more of the first through fourth aspects, the first DMRS sequence and the second DMRS sequence are based at least in part on respective symbol and slot indexes associated with the first time interval and the second time interval.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
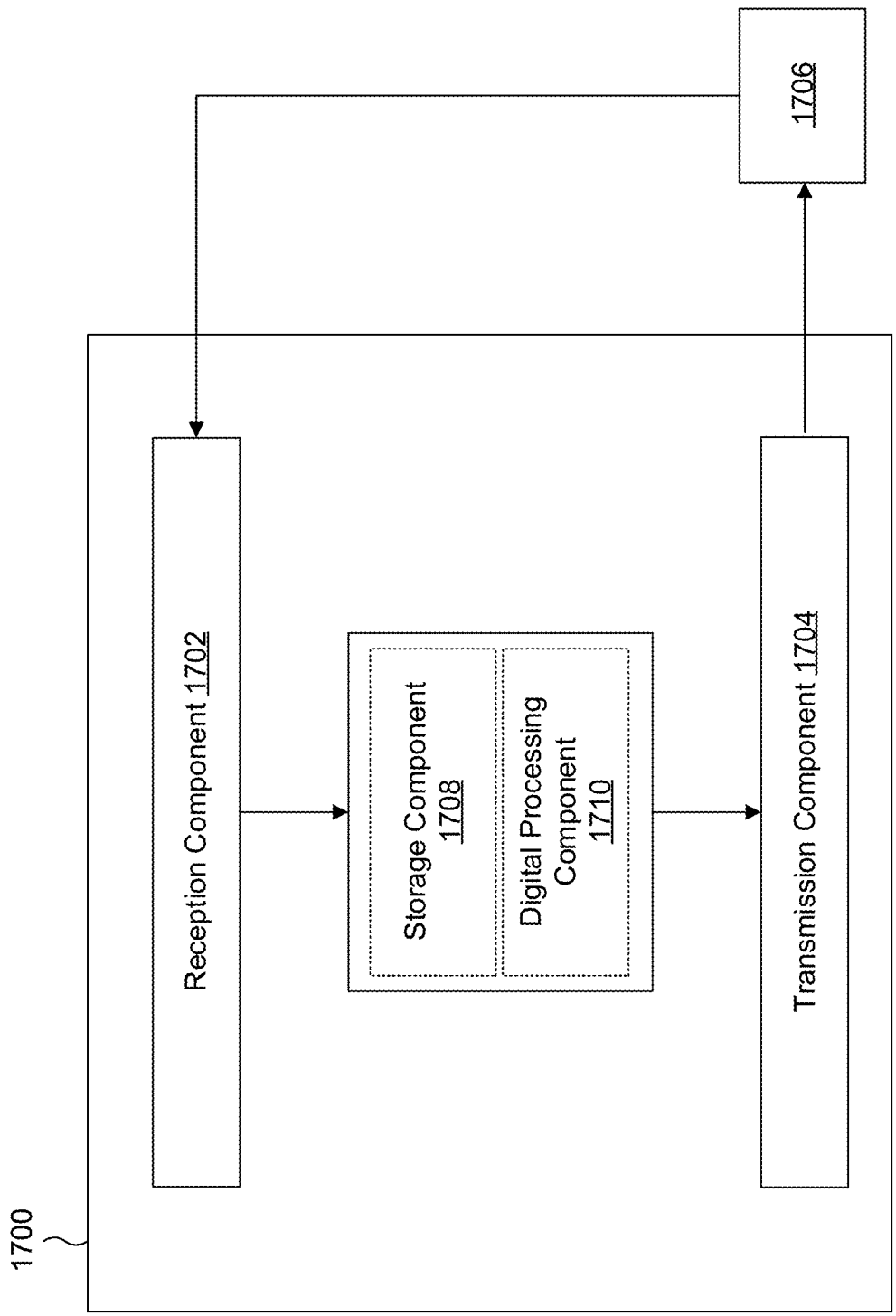
FIGS. 17-21 are block diagrams of example apparatuses for wireless communication, in accordance with the present disclosure.

FIG. 17 is a block diagram of an example apparatus 1700 for wireless communication. The apparatus 1700 may be a wireless node, such as a forwarding node, a repeater node, a relay node, and/or the like, or a wireless node may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, or another wireless communication device) using the reception component 1702 and the transmission component 1704. As further shown, the apparatus 1700 may include one or more of a storage component 1708 or a digital processing component 1710, among other examples.

In some aspects, the apparatus 1700 may be configured to perform one or more operations described herein in connection with FIG. 9. Additionally or alternatively, the apparatus 1700 may be configured to perform one or more processes described herein, such as process 1200 of FIG. 12. In some aspects, the apparatus 1700 and/or one or more components shown in FIG. 17 may include one or more components of the UE and/or base station described above in connection with FIG. 2. Additionally, or alternatively, one or more components shown in FIG. 17 may be implemented within one or more components described above in connection with FIG. 2, FIG. 4, FIG. 5, FIG. 6A, and/or FIG. 6B. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1706. In some aspects, the reception component 1702 may include one or more antennas, a demodulator, a MIMO detector, a receive processor, a controller/processor, a memory, an Rx chain, or a combination thereof, of the wireless node described above in connection with FIG. 2, FIG. 5, and FIGS. 6A-6B.

The transmission component 1704 may transmit communications, such as reference signals, control information, data communications, or a combination thereof, to the apparatus 1706. In some aspects, one or more other components of the apparatus 1706 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modulator, a transmit MIMO processor, a transmit processor, a controller/processor, a memory, a Tx chain, or a combination thereof, of the wireless node described above in connection with FIG. 2, FIG. 5, and FIGS. 6A-6B. In some aspects, the transmission component 1704 may be co-located with the reception component 1702 in a transceiver.

The reception component 1702 may receive, from a control node via a fronthaul control interface, semi-static configuration information indicating one or more parameters for forwarding an RMSI PDCCH. The reception component 1702 may receive information associated with an RMSI PDCCH from a transmitter node, wherein the RMSI PDCCH schedules transmission of an RMSI PDSCH that carries RMSI associated with an access procedure. The transmission component 1704 may transmit an RMSI PDCCH to one or more receiver nodes based at least in part on the received information and the semi-static configuration information.

The storage component 1708 may store content of the RMSI associated with the access procedure. In some aspects, the storage component 1708 may include one or more antennas, a demodulator, a MIMO detector, a receive processor, a controller/processor, a memory, or a combination thereof, of the wireless node described above in connection with FIG. 2, FIG. 5, and FIGS. 6A-6B.

The transmission component 1704 may transmit, to the one or more receiver nodes, in multiple transmission occasions associated with the access procedure, the content of the RMSI associated with the access procedure in multiple instances of the RMSI PDSCH.

The digital processing component 1710 may decode a single received instance of the RMSI PDSCH, based at least in part on a first DMRS sequence associated with the RMSI PDSCH, to obtain a transport block that includes the RMSI associated with the access procedure. The digital processing component 1710 may encode the transport block to generate a codeword of the multiple instances of the RMSI PDSCH that are transmitted in the multiple transmission occasions. The digital processing component 1710 may insert the codeword and a new DMRS sequence into each instance of the RMSI PDSCH based at least in part on the one or more time resources associated with the transmission occasion in which the respective RMSI PDSCH is transmitted. In some aspects, the digital processing component 1710 may include one or more antennas, a demodulator, a MIMO detector, a receive processor, a modulator, a transmit MIMO processor, a transmit processor, a controller/processor, a memory, an Rx chain, a Tx chain, or a combination thereof, of the wireless node described above in connection with FIG. 2, FIG. 5, and FIGS. 6A-6B.

The digital processing component 1710 may extract one or more tones in a single received instance of the RMSI PDSCH that are occupied by a first DMRS sequence associated with the RMSI PDSCH. The digital processing component 1710 may descramble the one or more tones extracted from the single received instance of the RMSI PDSCH, based at least in part on a conjugate of the first DMRS sequence, to obtain one or more tones associated with the multiple instances of the RMSI PDSCH that are transmitted in the multiple transmission occasions. The digital processing component 1710 may scramble, for each instance of the RMSI PDSCH, the one or more tones with a new DMRS sequence, based at least in part on the one or more time resources associated with the transmission occasion in which the instance of the RMSI PDSCH is transmitted.

The digital processing component 1710 may obtain a payload that includes the RMSI associated with the access procedure. The digital processing component 1710 may insert the payload and a new DMRS sequence into each instance of the RMSI PDSCH based at least in part on the one or more time resources associated with the transmission occasion in which the instance of the RMSI PDSCH is transmitted.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally or alternatively, a set of (one or more) components shown in FIG. 17 may perform one or more functions described as being performed by another set of components shown in FIG. 17.

Figure 18:
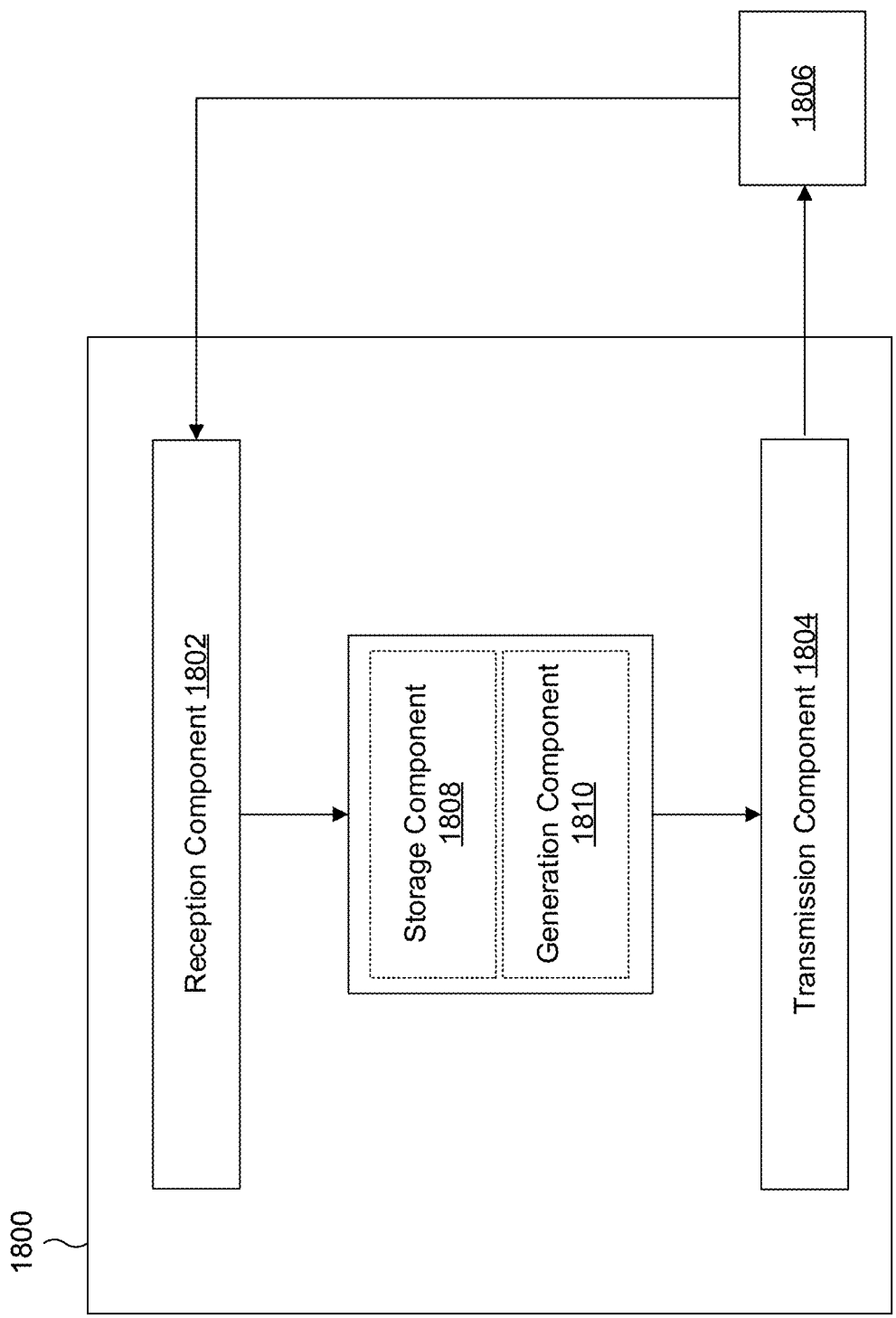

FIG. 18 is a block diagram of an example apparatus 1800 for wireless communication. The apparatus 1800 may be a forwarding node, or a forwarding node may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, another forwarding node, or another wireless communication device) using the reception component 1802 and the transmission component 1804. As further shown, the apparatus 1800 may include one or more of a storage component 1808 or a generation component 1810, among other examples.

In some aspects, the apparatus 1800 may be configured to perform one or more operations described herein in connection with FIG. 9. Additionally or alternatively, the apparatus 1800 may be configured to perform one or more processes described herein, such as process 1900 of FIG. 19, or a combination thereof. In some aspects, the apparatus 1800 and/or one or more components shown in FIG. 18 may include one or more components of the forwarding node described above in connection with FIG. 2. Additionally, or alternatively, one or more components shown in FIG. 18 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may perform digital processing on the received communications, as described above. In some aspects, the reception component 1802 may include one or more antennas, a demodulator, a MIMO detector, a receive processor, a controller/processor, a memory, or a combination thereof, of the forwarding node described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may perform digital processing on the generated communications, as described above. In some aspects, the transmission component 1804 may include one or more antennas, a modulator, a transmit MIMO processor, a transmit processor, a controller/processor, a memory, or a combination thereof, of the forwarding node described above in connection with FIG. 2. In some aspects, the transmission component 1804 may be collocated with the reception component 1802 in a transceiver.

The reception component 1802 may receive information for use in generating one or more SSB communications that are to be transmitted in an SSB period. The storage component 1808 may store the information. In some aspects, the storage component 1808 may include a controller/processor, a memory, or a combination thereof, of the forwarding node described above in connection with FIG. 2. The transmission component 1804 may transmit the one or more SSB communications, based at least in part on the information, in the SSB period.

The generation component 1810 may generate a primary synchronization signal or a secondary synchronization signal based at least in part on SSBs received at a mobile termination of the forwarding node. The generation component 1810 may generate a primary synchronization signal or a secondary synchronization signal based at least in part on a physical cell identifier associated with a base station. The generation component 1810 may generate a physical broadcast channel based at least in part on a content of a master information block and a transmission time for the master information block. The generation component 1810 may generate the one or more SSB communications based at least in part on the information. In some aspects, the generation component 1810 may include a modulator, a transmit MIMO processor, a transmit processor, a controller/processor, a memory, or a combination thereof, of the forwarding node described above in connection with FIG. 2.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally or alternatively, a set of (one or more) components shown in FIG. 18 may perform one or more functions described as being performed by another set of components shown in FIG. 18.

Figure 19:
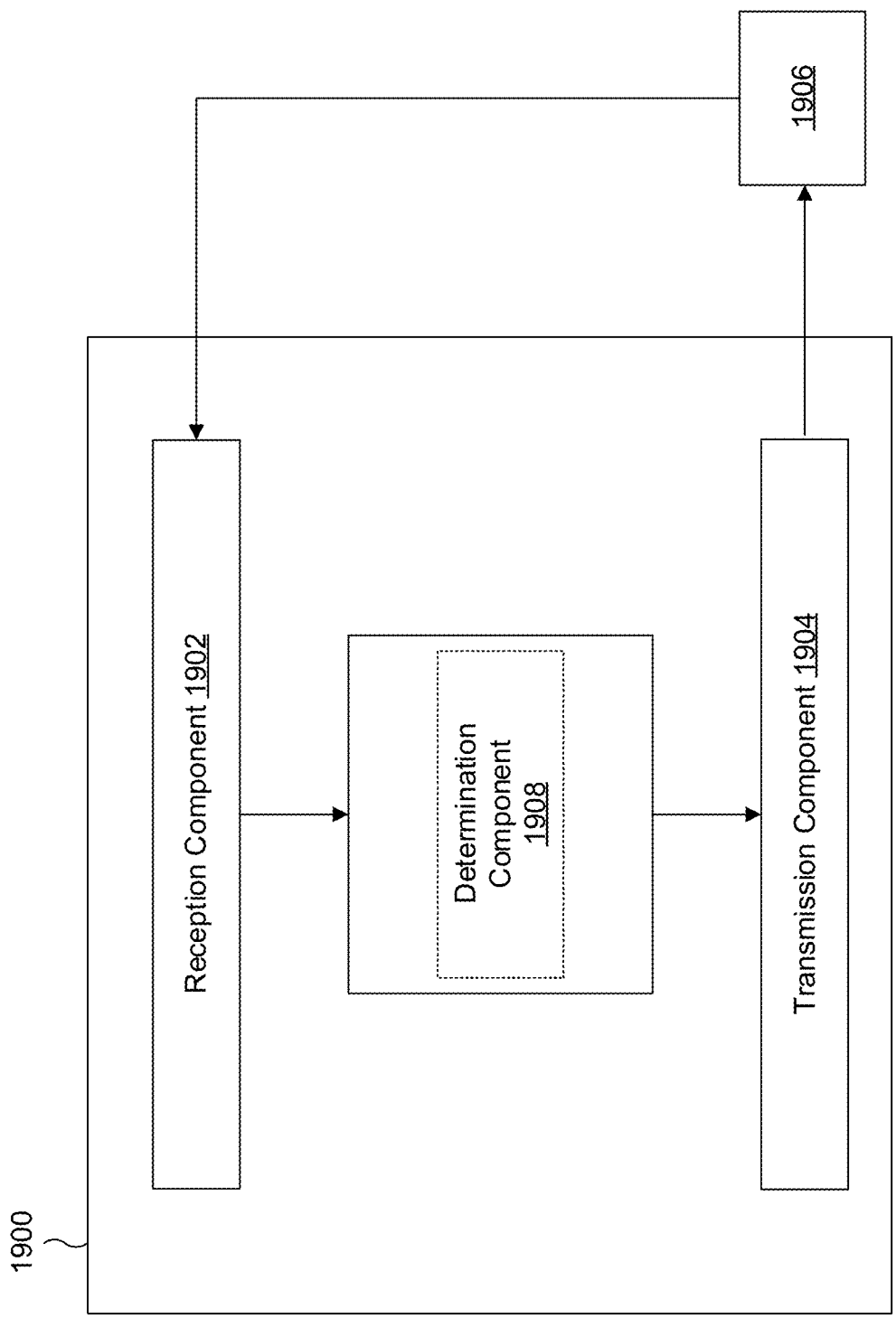

FIG. 19 is a block diagram of an example apparatus 1900 for wireless communication. The apparatus 1900 may be a control node (e.g., a base station), or a control node may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, a forwarding node, or another wireless communication device) using the reception component 1902 and the transmission component 1904. As further shown, the apparatus 1900 may include a determination component 1908, among other examples.

In some aspects, the apparatus 1900 may be configured to perform one or more operations described herein in connection with FIG. 9. Additionally or alternatively, the apparatus 1900 may be configured to perform one or more processes described herein, such as process 1400 of FIG. 14, or a combination thereof. In some aspects, the apparatus 1900 and/or one or more components shown in FIG. 19 may include one or more components of the base station described above in connection with FIG. 2. Additionally, or alternatively, one or more components shown in FIG. 19 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the base station described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the base station described above in connection with FIG. 2. In some aspects, the transmission component 1904 may be collocated with the reception component 1902 in a transceiver.

The determination component 1908 may determine information for use by a forwarding node in generating one or more SSB communications that are to be transmitted by the forwarding node in an SSB period. In some aspects, the determination component 1908 may include a controller/processor, a memory, or a combination thereof, of the base station described above in connection with FIG. 2. The transmission component 1904 may transmit the information to the forwarding node. The transmission component 1904 may transmit one or more additional SSB communications in the SSB period with the one or more SSB communications transmitted by the forwarding node. The transmission component 1904 may transmit SSBs to a mobile termination of the forwarding node.

The determination component 1908 may determine a configuration for the apparatus 1906. The determination component 1908 may determine a joint beam sweeping pattern. The determination component 1908 may determine to multiplex SSB transmissions.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally or alternatively, a set of (one or more) components shown in FIG. 19 may perform one or more functions described as being performed by another set of components shown in FIG. 19.

FIG. 20 is a block diagram of an example apparatus 2000 for wireless communication. The apparatus 2000 may be a repeater node, or a repeater node may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, a control node, or another wireless communication device) using the reception component 2002 and the transmission component 2004. As further shown, the apparatus 2000 may include one or more of a digital processing component 2008 or a DMRS management component 2010, among other examples.

In some aspects, the apparatus 2000 may be configured to perform one or more operations described herein in connection with FIG. 20. Additionally or alternatively, the apparatus 2000 may be configured to perform one or more processes described herein, such as process 1400 of FIG. 14. In some aspects, the apparatus 2000 and/or one or more components shown in FIG. 20 may include one or more components of the UE and/or base station described above in connection with FIG. 2. Additionally, or alternatively, one or more components shown in FIG. 20 may be implemented within one or more components described above in connection with FIG. 2, FIG. 4, FIG. 5, FIG. 6A, and/or FIG. 6B. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2006. In some aspects, the reception component 2002 may include one or more antennas, a demodulator, a MIMO detector, a receive processor, a controller/processor, a memory, an Rx chain, or a combination thereof, as described above in connection with FIG. 2, FIG. 5, and FIGS. 6A-6B.

The transmission component 2004 may transmit communications, such as reference signals, control information, data communications, or a combination thereof, to the apparatus 2006. In some aspects, one or more other components of the apparatus 2006 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modulator, a transmit MIMO processor, a transmit processor, a controller/processor, a memory, a Tx chain, or a combination thereof, as described above in connection with FIG. 2, FIG. 5, and FIGS. 6A-6B. In some aspects, the transmission component 2004 may be co-located with the reception component 2002 in a transceiver.

The reception component 2002 may receive, from a transmitter node in a first time interval, a first signal including a first DMRS sequence that is based at least in part on one or more time resources associated with the first time interval. The transmission component 2004 may transmit, to a receiver node in a second time interval, a second signal including a second DMRS sequence that is based at least in part on one or more time resources associated with the second time interval, wherein the second signal is a regenerated version of the first signal.

The digital processing component 2008 may perform one or more digital processing operations on the first signal to generate the second signal. In some aspects, the digital processing component 2008 may include one or more antennas, a demodulator, a MIMO detector, a receive processor, a modulator, a transmit MIMO processor, a transmit processor, a controller/processor, a memory, an Rx chain, a Tx chain, or a combination thereof, as described above in connection with FIG. 2, FIG. 5, and FIGS. 6A-6B.

The digital processing component 2008 may decode the first signal based at least in part on the first DMRS sequence to obtain a transport block from the first signal, and the digital processing component 2008 may encode the transport block to generate a codeword of the second signal. The DMRS management component 2010 may insert the second DMRS sequence into a channel of the second signal. In some aspects, the DMRS management component 2010 may include a demodulator, a MIMO detector, a receive processor, a modulator, a transmit MIMO processor, a transmit processor, a controller/processor, a memory, an Rx chain, a Tx chain, or a combination thereof, as described above in connection with FIG. 2, FIG. 5, and FIGS. 6A-6B.

The digital processing component 2008 may extract one or more tones in the first signal that are occupied by the first DMRS sequence and descramble the one or more tones extracted from the first signal based at least in part on a conjugate of the first DMRS sequence to obtain one or more tones of the second signal. The digital processing component and/or the DMRS management component 2010 may scramble the one or more tones of the second signal based at least in part on the second DMRS sequence.

The transmission component 2004 may transmit one or more repetitions of the second signal to the receiver node in one or more time intervals subsequent to the second time interval. The DMRS management component 2010 may associate each of the one or more repetitions of the second signal with a DMRS sequence that is associated with a time interval in which the respective repetition is transmitted.

The reception component 2002 may receive, from a control node, configuration information enabling the repeater node to regenerate the first signal as the second signal with the second DMRS sequence replacing the first DMRS sequence.

The DMRS management component 2010 may determine a scrambling identifier associated with the second DMRS sequence based at least in part on the scrambling identifier of the first DMRS sequence and the one or more time resources associated with the second DMRS sequence.

The transmission component 2004 may transmit, to the control node, information indicating that the repeater node has a capability to regenerate the first signal as the second signal with the second DMRS sequence replacing the first DMRS sequence.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally or alternatively, a set of (one or more) components shown in FIG. 20 may perform one or more functions described as being performed by another set of components shown in FIG. 20.

Figure 21:
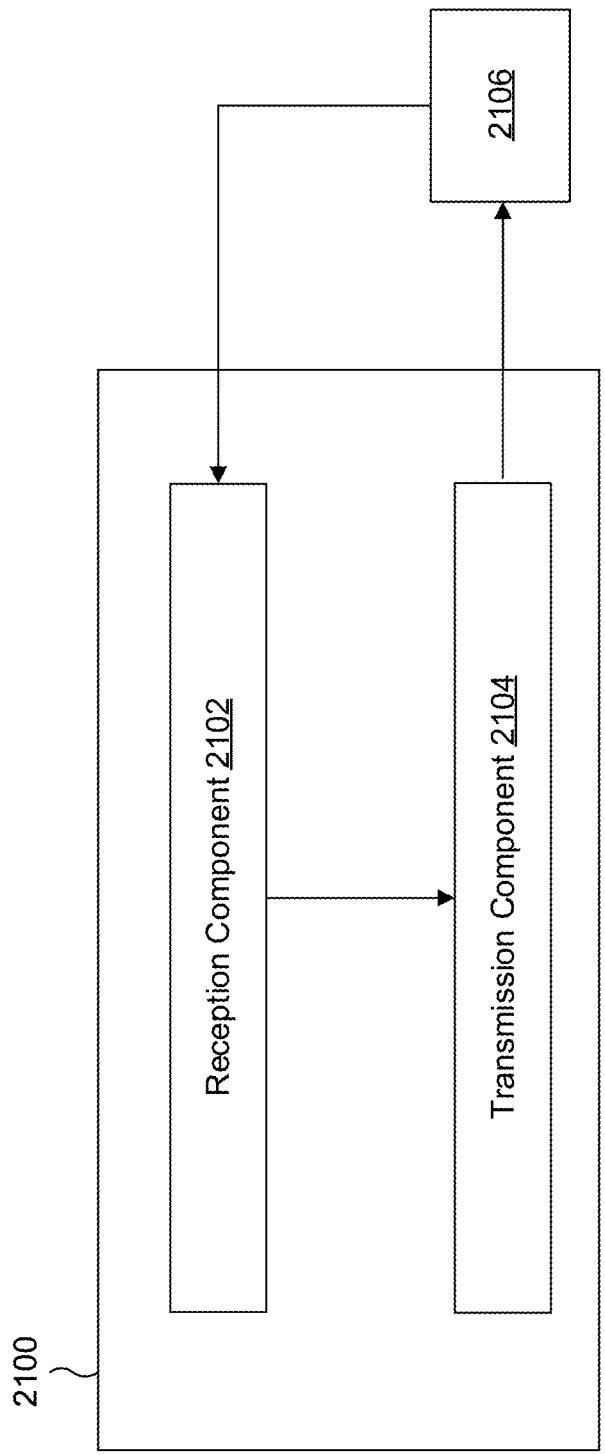

FIG. 21 is a block diagram of an example apparatus 2100 for wireless communication. The apparatus 2100 may be a control node, or a control node may include the apparatus 2100. In some aspects, the apparatus 2100 includes a reception component 2102 and a transmission component 2104, which may be in communication with one another (for example, via one or more buses and/or one or more other components). As shown, the apparatus 2100 may communicate with another apparatus 2106 (such as a UE, a base station, a forwarding node, a repeater node, a relay node, or another wireless communication device) using the reception component 2102 and the transmission component 2104.

In some aspects, the apparatus 2100 may be configured to perform one or more operations described herein in connection with FIG. 11. Additionally or alternatively, the apparatus 2100 may be configured to perform one or more processes described herein, such as process 1600 of FIG. 16. In some aspects, the apparatus 2100 and/or one or more components shown in FIG. 21 may include one or more components of the control node described above in connection with FIG. 2. Additionally, or alternatively, one or more components shown in FIG. 21 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2102 may receive communications, such as reference signals, control information, data communications, or a combination thereof, from the apparatus 2106. The reception component 2102 may provide received communications to one or more other components of the apparatus 2100. In some aspects, the reception component 2102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2106. In some aspects, the reception component 2102 may include one or more antennas, a demodulator, a MIMO detector, a receive processor, a controller/processor, a memory, or a combination thereof, of the control node described above in connection with FIG. 2.

The transmission component 2104 may transmit communications, such as reference signals, control information, data communications, or a combination thereof, to the apparatus 2106. In some aspects, one or more other components of the apparatus 2106 may generate communications and may provide the generated communications to the transmission component 2104 for transmission to the apparatus 2106. In some aspects, the transmission component 2104 may perform signal processing on the generated communications (such as filtering, amplification, modulation, digital-to-analog conversion, multiplexing, interleaving, mapping, or encoding, among other examples), and may transmit the processed signals to the apparatus 2106. In some aspects, the transmission component 2104 may include one or more antennas, a modulator, a transmit MIMO processor, a transmit processor, a controller/processor, a memory, or a combination thereof, of the control node described above in connection with FIG. 2. In some aspects, the transmission component 2104 may be co-located with the reception component 2102 in a transceiver.

The reception component 2102 may receive, from a repeater node, information indicating that the repeater node has a capability to change a DMRS sequence in a forwarded signal. The transmission component 2104 may transmit, to the repeater node, configuration information enabling the repeater node to regenerate an incoming signal that includes a first DMRS sequence as an outgoing signal that includes a second DMRS sequence replacing the first DMRS sequence.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally or alternatively, a set of (one or more) components shown in FIG. 21 may perform one or more functions described as being performed by another set of components shown in FIG. 21.

The following provides an overview of some Aspects of the present disclosure:

Aspect 1: A method of wireless communication performed by a wireless forwarding node, comprising: receiving, from a control node via a fronthaul control interface, semi-static configuration information indicating one or more parameters for forwarding an RMSI PDCCH; receiving information associated with an RMSI PDCCH from a transmitter node, wherein the RMSI PDCCH schedules transmission of an RMSI PDSCH that carries RMSI associated with an access procedure; and transmitting an RMSI PDCCH to one or more receiver nodes based at least in part on the received information and the semi-static configuration information.

Aspect 2: The method of Aspect 1, wherein the one or more parameters indicated in the semi-static configuration information include one or more resources and a beamforming configuration used to transmit the RMSI PDCCH.

Aspect 3: The method of any of Aspects 1-2, wherein the received information associated with the RMSI PDCCH includes a copy of the RMSI PDCCH received as an incoming signal, and the RMSI PDCCH transmitted to the one or more receiver nodes is a regenerated version of the RMSI PDCCH that is transmitted as an outgoing signal, based at least in part on the wireless forwarding node having a wireless repeater configuration.

Aspect 4: The method of any of Aspects 1-3, wherein the received information associated with the RMSI PDCCH includes an incoming signal having a payload that includes information to generate the RMSI PDCCH as an outgoing signal, based at least in part on the wireless forwarding node having a wireless relay configuration.

Aspect 5: The method of any of Aspects 1-4, further comprising: storing content of the RMSI associated with the access procedure; and transmitting, to the one or more receiver nodes, in multiple transmission occasions associated with the access procedure, the content of the RMSI associated with the access procedure in multiple instances of the RMSI PDSCH.

Aspect 6: The method of Aspect 5, wherein each instance of the RMSI PDSCH includes a DMRS associated with a DMRS scrambling sequence that is based at least in part on one or more time resources associated with a transmission occasion in which the respective RMSI PDSCH is transmitted.

Aspect 7: The method of Aspect 6, further comprising: decoding a single received instance of the RMSI PDSCH, based at least in part on a first DMRS sequence associated with the RMSI PDSCH, to obtain a transport block that includes the RMSI associated with the access procedure; encoding the transport block to generate a codeword of the multiple instances of the RMSI PDSCH that are transmitted in the multiple transmission occasions; and inserting the codeword and a new DMRS sequence into each instance of the RMSI PDSCH based at least in part on the one or more time resources associated with the transmission occasion in which the respective RMSI PDSCH is transmitted.

Aspect 8: The method of Aspect 6, further comprising: extracting one or more tones in a single received instance of the RMSI PDSCH that are occupied by a first DMRS sequence associated with the RMSI PDSCH; descrambling the one or more tones extracted from the single received instance of the RMSI PDSCH, based at least in part on a conjugate of the first DMRS sequence, to obtain one or more tones associated with the multiple instances of the RMSI PDSCH that are transmitted in the multiple transmission occasions; and scrambling, for each instance of the RMSI PDSCH, the one or more tones with a new DMRS sequence, based at least in part on the one or more time resources associated with the transmission occasion in which the instance of the RMSI PDSCH is transmitted.

Aspect 9: The method of Aspect 6, further comprising: obtaining a payload that includes the RMSI associated with the access procedure; and inserting the payload and a new DMRS sequence into each instance of the RMSI PDSCH based at least in part on the one or more time resources associated with the transmission occasion in which the instance of the RMSI PDSCH is transmitted.

Aspect 10: The method of any of Aspects 5-9, wherein the content of the RMSI includes a transport block, a codeword, or one or more frequency domain symbols.

Aspect 11: The method of any of Aspects 5-10, wherein the content of the RMSI is received from the transmitter node in a broadcast or multicast signal.

Aspect 12: The method of any of Aspects 5-11, wherein the content of the RMSI is acquired by an MT unit associated with the wireless forwarding node from a MIB or one or more SIBs transmitted by the transmitter node, and wherein the method further comprises: receiving, at the MT unit associated with the wireless forwarding node, information updating the content of the RMSI in a fronthaul PDSCH.

Aspect 13: The method of Aspect 12, wherein a payload of the fronthaul PDSCH includes one or more updated information elements updating the content of the RMSI.

Aspect 14: The method of any of Aspects 1-13, wherein the wireless forwarding node is a repeater node configured to receive an incoming signal and perform one or more digital processing operations to regenerate the incoming signal as an outgoing signal.

Aspect 15: The method of any of Aspects 1-13, wherein the wireless forwarding node is a relay node configured to receive an incoming signal and perform one or more digital processing operations to generate an outgoing signal that includes information associated with the incoming signal based at least in part on a payload of the incoming signal.

Aspect 16: A method of wireless communication performed by a forwarding node, comprising: receiving information for use in generating one or more SSB communications that are to be transmitted in an SSB period; storing the information; and transmitting the one or more SSB communications, based at least in part on the information, in the SSB period.

Aspect 17: The method of Aspect 16, wherein the one or more SSB communications are transmitted in resources that are different from resources used by an MT of the forwarding node for receiving SSBs from a base station.

Aspect 18: The method of any of Aspects 16-17, wherein the one or more SSB communications and one or more additional SSB communications transmitted by a base station are time-division multiplexed.

Aspect 19: The method of any of Aspects 16-17, wherein the one or more SSB communications and one or more additional SSB communications transmitted by a base station overlap in time.

Aspect 20: The method of any of Aspects 16-19, wherein the information is received in a time interval that is prior to the SSB period.

Aspect 21: The method of any of Aspects 16-20, wherein the information is received in a PDSCH via a fronthaul interface.

Aspect 22: The method of any of Aspects 16-21, wherein the information includes a content for the one or more SSB communications and comprises at least one of: time-domain IQ samples, frequency-domain IQ samples, information that indicates a sequence for a sequence-based signal, IQ symbols of occupied tones, a codeword, a MIB block content, or information indicating resources for transmitting the one or more SSB communications.

Aspect 23: The method of any of Aspects 16-22, wherein the information is for use in generating a PSS or an SSS for the one or more SSB communications, and wherein the method further comprises: receiving additional information for use in generating a PBCH or a DMRS for the one or more SSB communications.

Aspect 24: The method of Aspect 23, wherein the information is received less frequently than the additional information.

Aspect 25: The method of any of Aspects 16-24, further comprising: generating a PSS or an SSS based at least in part on SSBs received at an MT of the forwarding node.

Aspect 26: The method of any of Aspects 16-25, further comprising: generating a PSS or an SSS based at least in part on a PCI associated with a base station.

Aspect 27: The method of any of Aspects 16-26, further comprising: generating a PBCH based at least in part on a content of a MIB and a transmission time for the MIB.

Aspect 28: The method of any of Aspects 16-27, further comprising: generating the one or more SSB communications based at least in part on the information.

Aspect 29: The method of any of Aspects 16-28, wherein transmitting the one or more SSB communications comprises: transmitting the one or more SSB communications in the SSB period with one or more additional SSB communications transmitted by a base station.

Aspect 30: The method of any of Aspects 16-29, wherein the forwarding node is a relay node.

Aspect 31: The method of any of Aspects 16-30, further comprising: performing digital processing of the information.

Aspect 32: The method of any of Aspects 16-31, further comprising: forwarding one or more non-SSB communications between a first wireless node and a second wireless node.

Aspect 33: The method of any of Aspects 16-32, wherein the information is received from a control node.

Aspect 34: The method of Aspect 33, wherein the control node is a base station.

Aspect 35: A method of wireless communication performed by a control node, comprising: determining information for use by a forwarding node in generating one or more SSB communications that are to be transmitted by the forwarding node in an SSB period; and transmitting the information to the forwarding node.

Aspect 36: The method of Aspect 35, wherein the one or more SSB communications are to be transmitted in resources that are different from resources used by a base station for transmitting one or more additional SSB communications.

Aspect 37: The method of any of Aspects 35-36, wherein the one or more SSB communications and one or more additional SSB communications transmitted by a base station are time-division multiplexed.

Aspect 38: The method of any of Aspects 35-36, wherein the one or more SSB communications and one or more additional SSB communications transmitted by a base station overlap in time.

Aspect 39: The method of any of Aspects 35-38, wherein the information is transmitted in a time interval that is prior to the SSB period.

Aspect 40: The method of any of Aspects 35-39, wherein the information is transmitted in a PDSCH via a fronthaul interface.

Aspect 41: The method of any of Aspects 35-40, wherein the information includes a content for the one or more SSB communications and includes at least one of: time-domain IQ samples, frequency-domain IQ samples, information that indicates a sequence for a sequence-based signal, IQ symbols of occupied tones, a codeword, a MIB content, or information indicating resources for transmitting the one or more SSB communications.

Aspect 42: The method of any of Aspects 35-41, wherein the information is for use in generating a PSS or an SSS for the one or more SSB communications, and wherein the method further comprises: transmitting additional information for use in generating a PBCH or a DMRS for the one or more SSB communications.

Aspect 43: The method of Aspect 42, wherein the information is transmitted less frequently than the additional information.

Aspect 44: The method of any of Aspects 35-43, further comprising: transmitting SSBs to an MT of the forwarding node.

Aspect 45: The method of any of Aspects 35-44, further comprising: transmitting one or more additional SSB communications in the SSB period with the one or more SSB communications.

Aspect 46: The method of any of Aspects 35-45, wherein the forwarding node is a relay node.

Aspect 47: The method of any of Aspects 35-46, wherein the control node is a base station.

Aspect 48: A method of wireless communication performed by a repeater node, comprising: receiving, from a transmitter node in a first time interval, a first signal including a first DMRS sequence that is based at least in part on one or more time resources associated with the first time interval; and transmitting, to a receiver node in a second time interval, a second signal including a second DMRS sequence that is based at least in part on one or more time resources associated with the second time interval, wherein the second signal is a regenerated version of the first signal.

Aspect 49: The method of Aspect 48, further comprising: performing one or more digital processing operations on the first signal to generate the second signal.

Aspect 50: The method of Aspect 49, wherein performing the one or more digital processing operations on the first signal includes: decoding the first signal based at least in part on the first DMRS sequence to obtain a transport block from the first signal; encoding the transport block to generate a codeword of the second signal; and inserting the second DMRS sequence into a channel of the second signal.

Aspect 51: The method of any of Aspects 49-50, wherein performing the one or more digital processing operations on the first signal includes: extracting one or more tones in the first signal that are occupied by the first DMRS sequence; descrambling the one or more tones extracted from the first signal based at least in part on a conjugate of the first DMRS sequence to obtain one or more tones of the second signal; and scrambling the one or more tones of the second signal based at least in part on the second DMRS sequence.

Aspect 52: The method of any of Aspects 48-51, further comprising: transmitting one or more repetitions of the second signal to the receiver node in one or more time intervals subsequent to the second time interval, wherein the one or more repetitions of the second signal each include a DMRS sequence associated with a time interval in which the respective repetition is transmitted.

Aspect 53: The method of any of Aspects 48-52, further comprising: receiving, from a control node, configuration information enabling the repeater node to regenerate the first signal as the second signal with the second DMRS sequence replacing the first DMRS sequence.

Aspect 54: The method of Aspect 53, wherein the configuration information indicates the one or more time resources associated with the first DMRS sequence and a scrambling identifier associated with the first DMRS sequence.

Aspect 55: The method of Aspect 54, wherein the configuration information further indicates a scrambling identifier associated with the second DMRS sequence.

Aspect 56: The method of Aspect 54, further comprising: determining a scrambling identifier associated with the second DMRS sequence based at least in part on the scrambling identifier of the first DMRS sequence and the one or more time resources associated with the second DMRS sequence.

Aspect 57: The method of any of Aspects 53-56, further comprising: transmitting, to the control node, information indicating that the repeater node has a capability to regenerate the first signal as the second signal with the second DMRS sequence replacing the first DMRS sequence.

Aspect 58: The method of any of Aspects 53-57, wherein the control node corresponds to one of the transmitter node or the receiver node.

Aspect 59: The method of any of Aspects 48-58, wherein the first DMRS sequence and the second DMRS sequence are based at least in part on respective symbol and slot indexes associated with the first time interval and the second time interval.

Aspect 60: The method of any of Aspects 48-59, wherein the second signal is transmitted using a beamforming configuration.

Aspect 61: A method of wireless communication performed by a control node, comprising: receiving, from a repeater node, information indicating that the repeater node has a capability to change a DMRS sequence in a forwarded signal; and transmitting, to the repeater node, configuration information enabling the repeater node to regenerate an incoming signal that includes a first DMRS sequence as an outgoing signal that includes a second DMRS sequence replacing the first DMRS sequence.

Aspect 62: The method of Aspect 61, wherein the first DMRS sequence is based at least in part on one or more time resources associated with a first time interval in which the incoming signal is transmitted to the repeater node, and wherein the second DMRS sequence is based at least in part on one or more time resources associated with a second time interval in which the repeater node transmits the outgoing signal to a receiver node.

Aspect 63: The method of Aspect 62, wherein the configuration information indicates the one or more time resources associated with the first DMRS sequence and a scrambling identifier associated with the first DMRS sequence.

Aspect 64: The method of Aspect 63, wherein the configuration information further indicates a scrambling identifier associated with the second DMRS sequence.

Aspect 65: The method of any of Aspects 62-64, wherein the control node corresponds to one of the transmitter node or the receiver node.

Aspect 66: The method of any of Aspects 61-65, wherein the first DMRS sequence and the second DMRS sequence are based at least in part on respective symbol and slot indexes associated with the first time interval and the second time interval.

Aspect 67: An apparatus for wireless communication at a device, comprising a processor; memory coupled with the processor; and instructions stored in the memory and executable by the processor to cause the apparatus to perform the method of one or more of Aspects 1-15.

Aspect 68: A device for wireless communication, comprising a memory and one or more processors coupled to the memory, the one or more processors configured to perform the method of one or more of Aspects 1-15.

Aspect 69: An apparatus for wireless communication, comprising at least one means for performing the method of one or more of Aspects 1-15.

Aspect 70: A non-transitory computer-readable medium storing code for wireless communication, the code comprising instructions executable by a processor to perform the method of one or more of Aspects 1-15.

Aspect 71: A non-transitory computer-readable medium storing a set of instructions for wireless communication, the set of instructions comprising one or more instructions that, when executed by one or more processors of a device, cause the device to perform the method of one or more of Aspects 1-15.

Aspect 72: An apparatus for wireless communication at a device, comprising a processor; memory coupled with the processor; and instructions stored in the memory and executable by the processor to cause the apparatus to perform the method of one or more of Aspects 16-34.

Aspect 73: A device for wireless communication, comprising a memory and one or more processors coupled to the memory, the one or more processors configured to perform the method of one or more of Aspects 16-34.

Aspect 74: An apparatus for wireless communication, comprising at least one means for performing the method of one or more of Aspects 16-34.

Aspect 75: A non-transitory computer-readable medium storing code for wireless communication, the code comprising instructions executable by a processor to perform the method of one or more of Aspects 16-34.

Aspect 76: A non-transitory computer-readable medium storing a set of instructions for wireless communication, the set of instructions comprising one or more instructions that, when executed by one or more processors of a device, cause the device to perform the method of one or more of Aspects 16-34.

Aspect 77: An apparatus for wireless communication at a device, comprising a processor; memory coupled with the processor; and instructions stored in the memory and executable by the processor to cause the apparatus to perform the method of one or more of Aspects 35-47.

Aspect 78: A device for wireless communication, comprising a memory and one or more processors coupled to the memory, the one or more processors configured to perform the method of one or more of Aspects 35-47.

Aspect 79: An apparatus for wireless communication, comprising at least one means for performing the method of one or more of Aspects 35-47.

Aspect 80: A non-transitory computer-readable medium storing code for wireless communication, the code comprising instructions executable by a processor to perform the method of one or more of Aspects 35-47.

Aspect 81: A non-transitory computer-readable medium storing a set of instructions for wireless communication, the set of instructions comprising one or more instructions that, when executed by one or more processors of a device, cause the device to perform the method of one or more of Aspects 35-47.

Aspect 82: An apparatus for wireless communication at a device, comprising a processor; memory coupled with the processor; and instructions stored in the memory and executable by the processor to cause the apparatus to perform the method of one or more of Aspects 48-61.

Aspect 83: A device for wireless communication, comprising a memory and one or more processors coupled to the memory, the one or more processors configured to perform the method of one or more of Aspects 48-61.

Aspect 84: An apparatus for wireless communication, comprising at least one means for performing the method of one or more of Aspects 48-61.

Aspect 85: A non-transitory computer-readable medium storing code for wireless communication, the code comprising instructions executable by a processor to perform the method of one or more of Aspects 48-61.

Aspect 86: A non-transitory computer-readable medium storing a set of instructions for wireless communication, the set of instructions comprising one or more instructions that, when executed by one or more processors of a device, cause the device to perform the method of one or more of Aspects 48-61.

Aspect 87: An apparatus for wireless communication at a device, comprising a processor; memory coupled with the processor; and instructions stored in the memory and executable by the processor to cause the apparatus to perform the method of one or more of Aspects 62-66.

Aspect 88: A device for wireless communication, comprising a memory and one or more processors coupled to the memory, the one or more processors configured to perform the method of one or more of Aspects 62-66.

Aspect 89: An apparatus for wireless communication, comprising at least one means for performing the method of one or more of Aspects 62-66.

Aspect 90: A non-transitory computer-readable medium storing code for wireless communication, the code comprising instructions executable by a processor to perform the method of one or more of Aspects 62-66.

Aspect 91: A non-transitory computer-readable medium storing a set of instructions for wireless communication, the set of instructions comprising one or more instructions that, when executed by one or more processors of a device, cause the device to perform the method of one or more of Aspects 62-66.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless forwarding node, comprising:
    receiving, by the wireless forwarding node and from a control node that is separate from the wireless forwarding node, semi-static configuration information indicating one or more parameters for forwarding a remaining minimum system information (RMSI) physical downlink control channel (PDCCH);
    receiving information associated with an RMSI PDCCH from a transmitter node, wherein the RMSI PDCCH schedules transmission of an RMSI physical downlink shared channel (PDSCH) that carries RMSI associated with an access procedure, and wherein the received information associated with the RMSI PDCCH includes one of:
        a copy of the RMSI PDCCH received as an incoming signal, or
        an incoming signal having a payload that includes information to generate the RMSI PDCCH; and
    transmitting the RMSI PDCCH to one or more receiver nodes based at least in part on the received information and the semi-static configuration information, wherein the RMSI PDCCH transmitted to the one or more receiver nodes is one of:
        a regenerated version of the RMSI PDCCH that is transmitted as an outgoing signal, or
        a generated version of the RMSI PDCCH.

2. The method of claim 1,
    wherein the received information associated with the RMSI PDCCH includes the copy of the RMSI PDCCH received as the incoming signal, and
    wherein the RMSI PDCCH transmitted to the one or more receiver nodes is the regenerated version of the RMSI PDCCH that is transmitted as the outgoing signal based at least in part on the wireless forwarding node having a wireless repeater configuration.

3. The method of claim 1, wherein the received information associated with the RMSI PDCCH includes the incoming signal having the payload that includes information to generate the RMSI PDCCH based at least in part on the wireless forwarding node having a wireless relay configuration, and wherein the RMSI PDCCH transmitted to the one or more receiver nodes is the generated version of the RMSI PDCCH.

4. The method of claim 1, further comprising:
storing content of the RMSI associated with the access procedure; and
transmitting, to the one or more receiver nodes, in multiple transmission occasions associated with the access procedure, the content of the RMSI associated with the access procedure in multiple instances of the RMSI PDSCH.

5. The method of claim 4, wherein each instance of the RMSI PDSCH includes a demodulation reference signal (DMRS) associated with a DMRS scrambling sequence that is based at least in part on one or more time resources associated with a transmission occasion, of the multiple transmission occasions, in which the respective RMSI PDSCH is transmitted.

6. The method of claim 5, further comprising:
decoding a single received instance of the RMSI PDSCH, based at least in part on a first DMRS sequence associated with the RMSI PDSCH, to obtain a transport block that includes the RMSI associated with the access procedure;
encoding the transport block to generate a codeword of the multiple instances of the RMSI PDSCH that are transmitted in the multiple transmission occasions; and
inserting the codeword and a new DMRS sequence into each instance of the RMSI PDSCH based at least in part on the one or more time resources associated with the transmission occasion in which the respective RMSI PDSCH is transmitted.

7. The method of claim 5, further comprising:
extracting one or more tones in a single received instance of the RMSI PDSCH that are occupied by a first DMRS sequence associated with the RMSI PDSCH;
descrambling the one or more tones extracted from the single received instance of the RMSI PDSCH, based at least in part on a conjugate of the first DMRS sequence, to obtain one or more tones associated with the multiple instances of the RMSI PDSCH that are transmitted in the multiple transmission occasions; and
scrambling, for each instance of the RMSI PDSCH, the one or more tones with a new DMRS sequence, based at least in part on the one or more time resources associated with the transmission occasion in which the instance of the RMSI PDSCH is transmitted.

8. The method of claim 5, further comprising:
obtaining the RMSI associated with the access procedure; and
inserting the RMSI and a new DMRS sequence into each instance of the RMSI PDSCH based at least in part on the one or more time resources associated with the transmission occasion in which the instance of the RMSI PDSCH is transmitted.

9. The method of claim 4, wherein the content of the RMSI is acquired by a mobile termination (MT) unit associated with the wireless forwarding node from a master information block or one or more system information blocks transmitted by the transmitter node, and wherein the method further comprises:
receiving, at the MT unit associated with the wireless forwarding node, information updating the content of the RMSI in a fronthaul PDSCH.

10. The method of claim 9, wherein a payload of the fronthaul PDSCH includes one or more updated information elements updating the content of the RMSI.

11. A method of wireless communication performed by a repeater node, comprising:
receiving, from a transmitter node in a first time interval, a first signal including a first demodulation reference signal (DMRS) sequence that is based at least in part on one or more time resources associated with the first time interval;
transmitting, to a receiver node in a second time interval, a second signal including a second DMRS sequence that is based at least in part on the one or more time resources associated with the second time interval, wherein the second signal is a regenerated version of the first signal; and
transmitting one or more repetitions of the second signal to the receiver node in one or more time intervals subsequent to the second time interval, wherein the one or more repetitions of the second signal each include a DMRS sequence associated with a time interval in which the respective repetition is transmitted.

12. The method of claim 11, further comprising:
performing one or more digital processing operations on the first signal to generate the second signal.

13. The method of claim 12, wherein performing the one or more digital processing operations on the first signal includes:
decoding the first signal based at least in part on the first DMRS sequence to obtain a transport block from the first signal;
encoding the transport block to generate a codeword of the second signal; and
inserting the second DMRS sequence into a channel of the second signal.

14. The method of claim 12, wherein performing the one or more digital processing operations on the first signal includes:
extracting one or more tones in the first signal that are occupied by the first DMRS sequence;
descrambling the one or more tones extracted from the first signal based at least in part on a conjugate of the first DMRS sequence to obtain one or more tones of the second signal; and
scrambling the one or more tones of the second signal based at least in part on the second DMRS sequence.

15. The method of claim 11, further comprising:
receiving, from a control node, configuration information enabling the repeater node to regenerate the first signal as the second signal with the second DMRS sequence replacing the first DMRS sequence.

16. The method of claim 15, wherein the configuration information indicates the one or more time resources associated with the first DMRS sequence and a scrambling identifier associated with the first DMRS sequence.

17. The method of claim 15, further comprising:
transmitting, to the control node, information indicating that the repeater node has a capability to regenerate the first signal as the second signal with the second DMRS sequence replacing the first DMRS sequence.

18. The method of claim 11, wherein the first DMRS sequence and the second DMRS sequence are based at least in part on respective symbol and slot indexes associated with the first time interval and the second time interval.

19. A wireless forwarding node for wireless communication, comprising:
one or more memories; and
one or more processors, coupled to the one or more memories, configured to cause the wireless forwarding node to:
receive, from a control node that is separate from the wireless forwarding node, semi-static configuration information indicating one or more parameters for forwarding a remaining minimum system information (RMSI) physical downlink control channel (PDCCH);
receive information associated with an RMSI PDCCH from a transmitter node, wherein the RMSI PDCCH schedules transmission of an RMSI physical downlink shared channel (PDSCH) that carries RMSI associated with an access procedure, and wherein the received information associated with the RMSI PDCCH includes one of:
a copy of the RMSI PDCCH received as an incoming signal, or
an incoming signal having a payload that includes information to generate the RMSI PDCCH; and
transmit the RMSI PDCCH to one or more receiver nodes based at least in part on the received information and the semi-static configuration information, wherein the RMSI PDCCH transmitted to the one or more receiver nodes is one of:
a regenerated version of the RMSI PDCCH that is transmitted as an outgoing signal, or
a generated version of the RMSI PDCCH.

20. The wireless forwarding node of claim 19,
wherein the received information associated with the RMSI PDCCH includes the copy of the RMSI PDCCH received as the incoming signal, and
wherein the RMSI PDCCH transmitted to the one or more receiver nodes is the regenerated version of the RMSI PDCCH that is transmitted as the outgoing signal based at least in part on the wireless forwarding node having a wireless repeater configuration.

21. The wireless forwarding node of claim 19,
wherein the received information associated with the RMSI PDCCH includes the incoming signal having the payload that includes information to generate the RMSI PDCCH based at least in part on the wireless forwarding node having a wireless relay configuration, and
wherein the RMSI PDCCH transmitted to the one or more receiver nodes is the generated version of the RMSI PDCCH.

22. The wireless forwarding node of claim 19, wherein the one or more processors are further configured to cause the wireless forwarding node to:
store content of the RMSI associated with the access procedure; and
transmit, to the one or more receiver nodes, in multiple transmission occasions associated with the access procedure, the content of the RMSI associated with the access procedure in multiple instances of the RMSI PDSCH.

23. The wireless forwarding node of claim 22, wherein each instance of the RMSI PDSCH includes a demodulation reference signal (DMRS) associated with a DMRS scrambling sequence that is based at least in part on one or more time resources associated with a transmission occasion, of the multiple transmission occasions, in which the respective RMSI PDSCH is transmitted.

24. The wireless forwarding node of claim 22,
wherein the content of the RMSI is acquired by a mobile termination (MT) unit associated with the wireless forwarding node from a master information block or one or more system information blocks transmitted by the transmitter node, and
wherein the one or more processors are further configured to cause the wireless forwarding node to:
receive, at the MT unit associated with the wireless forwarding node, information updating the content of the RMSI in a fronthaul PDSCH.

25. A repeater node for wireless communication, comprising:
one or more memories; and
one or more processors, coupled to the one or more memories, configured to cause the repeater node to:
receive, from a transmitter node in a first time interval, a first signal including a first demodulation reference signal (DMRS) sequence that is based at least in part on one or more time resources associated with the first time interval;
transmit, to a receiver node in a second time interval, a second signal including a second DMRS sequence that is based at least in part on the one or more time resources associated with the second time interval, wherein the second signal is a regenerated version of the first signal; and
transmit one or more repetitions of the second signal to the receiver node in one or more time intervals subsequent to the second time interval, wherein the one or more repetitions of the second signal each include a DMRS sequence associated with a time interval in which the respective repetition is transmitted.

26. The repeater node of claim 25, wherein the one or more processors are further configured to cause the repeater node to:
perform one or more digital processing operations on the first signal to generate the second signal.

27. The repeater node of claim 26, wherein the one or more processors, to cause the repeater node to perform the one or more digital processing operations on the first signal, are configured to cause the repeater node to:
decode the first signal based at least in part on the first DMRS sequence to obtain a transport block from the first signal;
encode the transport block to generate a codeword of the second signal; and
insert the second DMRS sequence into a channel of the second signal.

28. The repeater node of claim 26, wherein the one or more processors, to cause the repeater node to perform the one or more digital processing operations on the first signal, are configured to cause the repeater node to:
extract one or more tones in the first signal that are occupied by the first DMRS sequence;
descramble the one or more tones extracted from the first signal based at least in part on a conjugate of the first DMRS sequence to obtain one or more tones of the second signal; and
scramble the one or more tones of the second signal based at least in part on the second DMRS sequence.

29. The repeater node of claim 26, wherein the one or more processors are further configured to cause the repeater node to:

receive, from a control node, configuration information enabling the repeater node to regenerate the first signal as the second signal with the second DMRS sequence replacing the first DMRS sequence.

30. The repeater node of claim 29, wherein the configuration information indicates the one or more time resources associated with the first DMRS sequence and a scrambling identifier associated with the first DMRS sequence.

* * * * *